United States Patent [19]
Chuah

[11] Patent Number: 6,115,390
[45] Date of Patent: Sep. 5, 2000

[54] BANDWIDTH RESERVATION AND COLLISION RESOLUTION METHOD FOR MULTIPLE ACCESS COMMUNICATION NETWORKS WHERE REMOTE HOSTS SEND RESERVATION REQUESTS TO A BASE STATION FOR RANDOMLY CHOSEN MINISLOTS

[75] Inventor: Mooi Choo Chuah, Eatontown, N.J.

[73] Assignee: Lucent Technologies, Inc., Murray Hill, N.J.

[21] Appl. No.: 09/083,677

[22] Filed: May 22, 1998

Related U.S. Application Data

[60] Provisional application No. 60/061,790, Oct. 14, 1997, and provisional application No. 60/077,741, Mar. 12, 1998.

[51] Int. Cl.[7] .................................................. H04B 7/212
[52] U.S. Cl. ............................................ 370/443; 370/348
[58] Field of Search .................................... 370/322, 329, 370/346–348, 442, 449, 336

[56] References Cited

U.S. PATENT DOCUMENTS

| 4,352,183 | 9/1982 | Davis et al. . |
| 4,612,637 | 9/1986 | Davis et al. . |
| 4,907,224 | 3/1990 | Scoles et al. . |

(List continued on next page.)

FOREIGN PATENT DOCUMENTS

| 0 687 078 | 12/1995 | European Pat. Off. . |
| WO 97/15165 | 4/1997 | WIPO . |

OTHER PUBLICATIONS

Dail, J., et al., "Adaptive Digital Access Protocol: A MAC Protocol for Multiservice Broadband Access Networks," IEEE Communications, vol. 34, No. 3, pp. 104–112, Mar. 1996.

(List continued on next page.)

*Primary Examiner*—Zarni Maung
*Assistant Examiner*—Andrew Caldwell
*Attorney, Agent, or Firm*—Morgan & Finnegan, LLP

[57] ABSTRACT

In a method for conflict resolution among remote hosts in a wireless network where remotes make bandwidth requests to the base station via uplink frames partitioned into one or more reservation minislots, a collision occurs where two or more remotes have transmitted a request in the same minislot. Each remote is characterized by a stack level, and only remotes with a stack level equal to 0 are permitted to transmit access request packets. Newly active remotes are allowed to join in with those remotes already having stack level 0 during any particular conflict resolution period by setting their stack levels to 0 and entering the request state. If the stack level of a remote is 0, the remote randomly picks a minislot for transmission of an access request. If the outcome is SUCCESS, and the queue at the remote is empty, the remote transmits the current packet after receiving a transmit permit and exits the request state. If the queue is not empty, then, after receiving a permit, the current packet is transmitted with a piggybacked reservation request for transmission of the next packet in the queue, continuing until the queue is empty. If the outcome of the reservation request was not SUCCESS, the remote participates in a random draw to determine whether to increment its stack level by 1 or leave it at 0. If the stack level of any remote is not 0, then in one embodiment if the outcome of the previous reservation request was COLLIDED, the remote increments its stack level by 1, otherwise decrementing it by 1. In an alternate embodiment, if the outcome of all the reservation requests during the previous cycle was COLLIDED for greater than or equal to some threshold, the remote increments its stack level by 1, otherwise decrementing it by 1. The number of reservation minislots available in any particular uplink frame may be dynamically changed based on the percentage of idle minislots and the total uplink queue length.

10 Claims, 34 Drawing Sheets

U.S. PATENT DOCUMENTS

| | | | |
|---|---|---|---|
| 5,012,469 | 4/1991 | Sardana | 370/322 |
| 5,185,737 | 2/1993 | Nassehi et al. | 370/449 |
| 5,295,140 | 3/1994 | Crisler et al. | 370/443 |
| 5,363,428 | 11/1994 | Nagashima . | |
| 5,384,777 | 1/1995 | Ahmadi et al. | 370/347 |
| 5,636,223 | 6/1997 | Reardon et al. . | |
| 5,751,708 | 5/1998 | Eng et al. | 370/389 |
| 5,896,385 | 4/1999 | Achilleoudis | 370/443 |
| 5,917,813 | 6/1999 | Van Driel et al. | 370/348 |
| 5,949,768 | 9/1999 | Citta et al. | 370/322 |
| 5,953,321 | 9/1999 | Berrada et al. | 370/322 |
| 5,953,344 | 9/1999 | Dail et al. | 370/443 |
| 5,956,325 | 9/1999 | Citta et al. | 370/252 |
| 5,960,000 | 9/1999 | Ruszczyk et al. | 370/447 |
| 5,963,557 | 10/1999 | Eng | 370/432 |
| 5,978,382 | 11/1999 | Citta et al. | 370/443 |

OTHER PUBLICATIONS

Qing Guo et al., "Sliding Frame R–Aloha (SFRA) Protocol For Microcellular Systems", Gateway To The Future–Technology In Motion, 41st Vehicular Technology Conference, May 19–22, 1991, pp. 351–356.

European Search Report, Apr. 1, 1999, 5 pages.

Lu et al., Fair Scheduling in Wireless Packet Networks, Sigcom '97.

Kautz, R., A Distributed Self–Clocked Fair Queueing Architecture for Wireless ATM Networks, (1996).

Kautz and Leon–Garcia, A Distributed Self–Clocked Fair Queueing Architecuture for Wireless ATM Networks, Int'l Symposium on Personal Indoor and Mobile Radio Communications (1997).

Karol et al., Distributed–Queueing Request Update Multiple Access (DORUMA) for Wireless Packet (ATM) Networks, pp. 1224–1229 (1995).

Karol et al., An efficient demand–assignment multiple access protocol for wireless packet (ATM) networks, Wireless Networks 1:267–279 (1995).

Doshi et al., A Broadband Multiple Access Protocol for STM, ATM, and Variable Length Data Services on Hybrid Fiber–Coax Networks, Bell Labs Technical Journal. pp. 36–65 (Summer, 1996).

Golestani, S. J., A Self–Clocked Fair Queueing Scheme for Broadband Applications, IEEE INFOCOM '94: Proceedings: Conference on Computer Commun., Toronto, Ontario, Jun. 12–16, 1994, pp. 636–646.

CDMA Access Channel Power Control, International Standard IS95, pp. 6–106–6–112.

Zhang, L., VirtualClock: A New Traffic Control Algorithm for Packet–Switched Networks, ACM Transactions on Computer Systems 9:101–124 (1991).

Rege, K., Equivalent Bandwidth and Related Admission Criteria for ATM Systems—A Performance Study, Int'l J. of Commun. Systems 7:181–197 (1994).

Parekh and Gallager, A Generalized Processor Sharing Approach to Flow Control in Integrates Services Networks: The Single–Node Case, IEEE/ACM Transactions on Networking 1:344–357 (1993).

Sriram and Magill, Enhanced Throughput Efficiency by Use of Dynamically Variable Request Mini–Slots in MAC Protocols for HEC and Wireless Access Networks, submitted to INFOCOM '98.

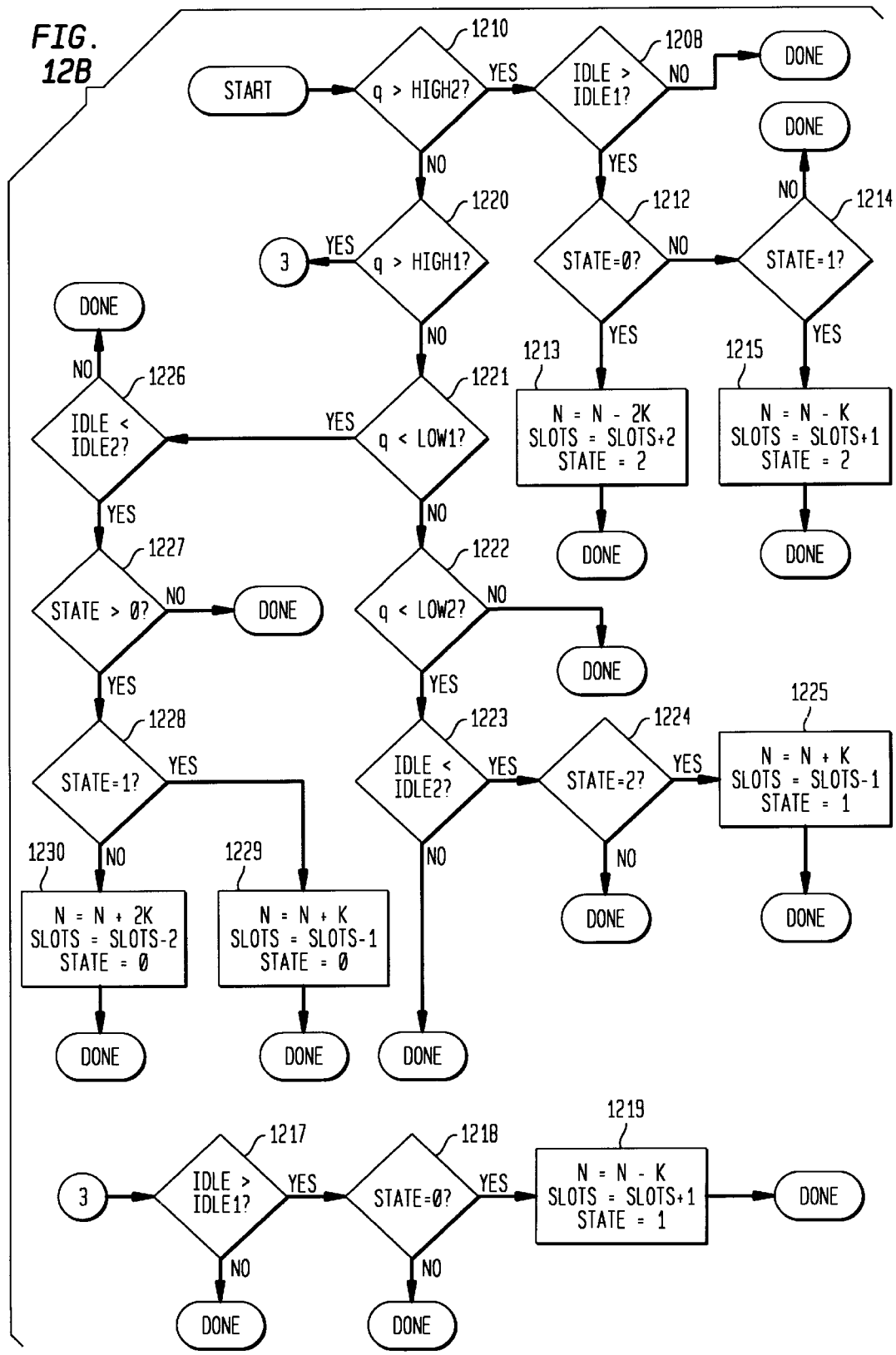

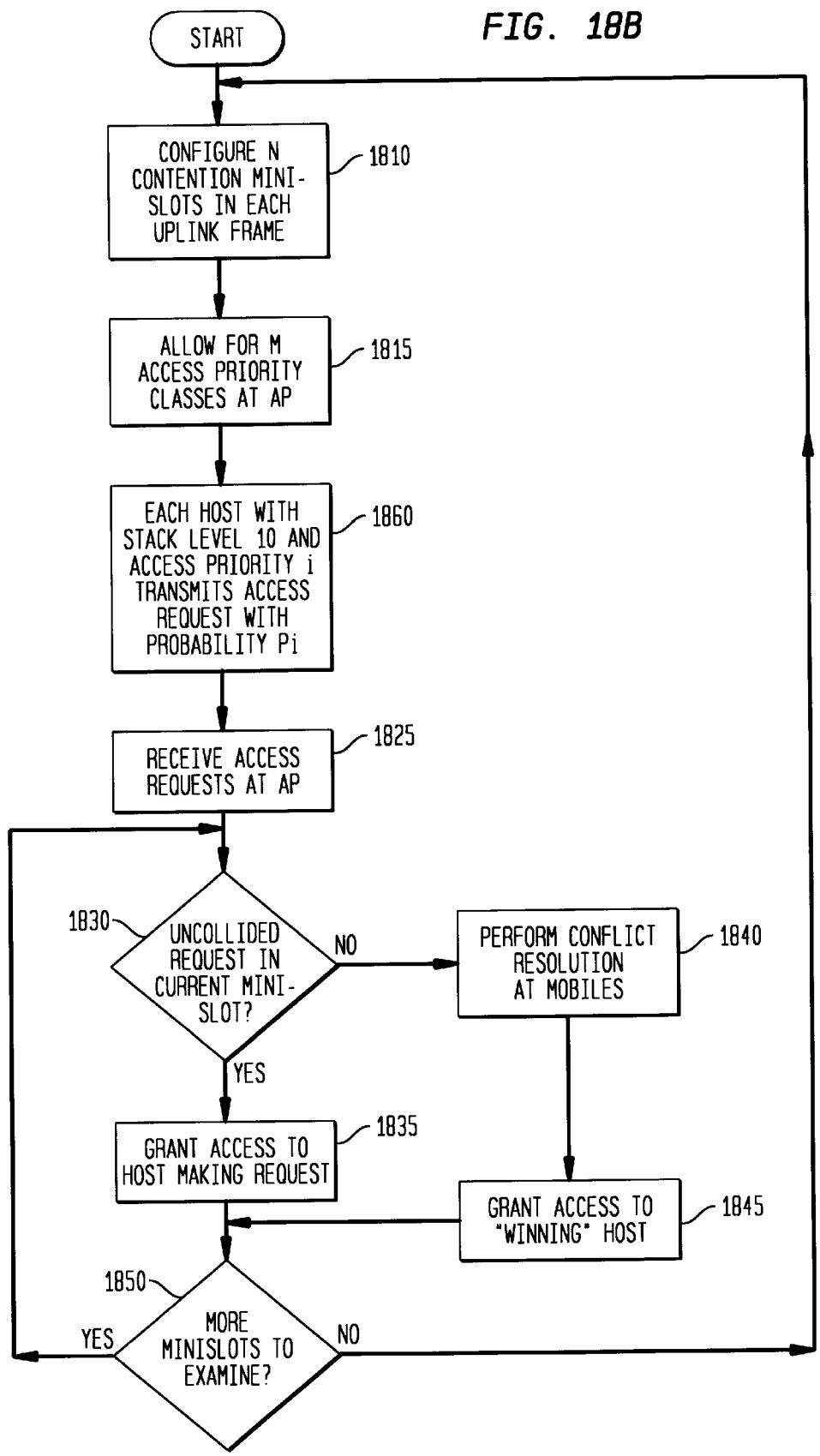

BANDWIDTH RESERVATION AND COLLISION RESOLUTION METHOD FOR MULTIPLE ACCESS COMMUNICATION NETWORKS WHERE REMOTE HOSTS SEND RESERVATION REQUESTS TO A BASE STATION FOR RANDOMLY CHOSEN MINISLOTS

This application claims priority under Title 35, United States Code §120 from Provisional Application Serial No. 60/061,790, filed Oct. 14, 1997, and Provisional Application Serial No. 60/077,741, filed Mar. 12, 1998. This application is one of seven applications having the same Detailed Description and assignee that were filed on the same date, the seven related applications being application Ser. Nos.: 09/083,675, 09/083,677, 09/084,072, 09/083,792, 09/083,762 and 09/083,759.

FIELD OF THE INVENTION

The present invention relates to a medium access control (MAC) protocol, known as an "on-demand multiple access fair queuing" system, for application in a wireless communications network system. In particular, the invention relates to a method for conflict resolution among remote hosts competing for transmission bandwidth in time and frequency division half- and full-duplex multiple access wireless networks.

BACKGROUND OF THE INVENTION

Wireless services, such as cellular voice and data and wireless LANs, are expected to enjoy rapid growth in the years to come. Third generation wireless networks designed to carry multimedia traffic are currently under intensive research, with the major goals being to provide seamless communications, high bandwidth availability, and guaranteed Quality of Service (QoS) without any location or mobility constraints.

FIG. 1 depicts a prior art wired network for data exchange. Shown are the three existing business entities whose equipment, working in concert, is typically utilized today to provide remote internet access through modems to user computers. User computers 2 and user modems 4 constitute end systems. The first business entity shown in FIG. 1 is the telephone company (telco) that owns and operates the dial-up plain old telephone system (POTS) or integrated services data network (ISDN). The telco provides a transmission medium in the form a of public switched telephone network (PSTN) 6 over which bits or packets can flow between users and the other two business entities.

The second business entity shown in FIG. 1 is the internet service provider (ISP). The ISP deploys and manages one or more points of presence (POPs) 8 in its service area, to which end users connect for network service. An ISP typically establishes a POP in each major local calling area in which the ISP expects to have subscribers. The POP 8 converts message traffic from the PSTN 6 into a digital form to be carried over intranet backbone 10, which is either owned by the ISP or leased from an intranet backbone provider such as MCI, Inc. An ISP typically leases fractional or full T1 or T3 lines from the telco for connectivity to the PSTN. The POPs 8 and the ISP's media data center 14 are connected together over the intranet backbone 10 through router 12A. The data center 14 houses the ISP's web servers, mail servers, accounting, and registration servers, enabling the ISP to provide web content, e-mail, and web hosting services to end users. Future value-added services may be added by deploying additional types of servers in the data center 14. The ISP maintains router 12A in order to connect to public internet backbone 20. In the existing model for remote access, end users typically have service relationships with both their telco and their ISP, usually getting separate bills from each. End users access the ISP and, through the ISP, public internet 20, by dialing the nearest POP and running a communication protocol known as the Internet Engineering Task Force (IETF) point-to-point (PPP) protocol.

The third business entity shown in FIG. 1 is a private corporation which owns and operates its own private intranet 18, accessed through router 12B. Corporate employees may remotely access corporate network 18 (e.g., from home or while on the road) by making POTS/ISDN calls to corporate remote access server 16 and running the IETF PPP protocol. For corporate access, end users pay only for the cost of connecting to corporate remote access server 16. The ISP is not involved. The private corporation maintains router 12B in order to connect an end user to either corporate intranet 18 or public internet 20.

End users currently pay the telco for both the cost of making phone calls and the cost of a phone line into their home. End users also must pay the ISP for access to the ISP's network and services. Today, internet service providers offer internet access services, web content services, e-mail services, content-hosting services, and roaming to end users. Because of low margins and lack of market segmentation based on features and price, ISPs are looking for value-added services to improve margins. In the short term, equipment vendors want to be able to offer solutions to ISPs that enable them to offer faster access, virtual private networking (the ability to use public networks securely as private networks and connect to intranets), roaming consortiums, push technologies, and specific Quality of Service. In the longer term, it is desired to offer voice over internet and mobility. ISPs will then be able to use these value-added services to escape from the low margin straitjacket. Many of these value-added services fall into the category of network services and can be offered only through the network infrastructure equipment. Other value-added services fall into the category of application services which require support from the network infrastructure, while still others do not require any support from the network infrastructure. In particular, services like faster access, virtual private networking, roaming, mobility, voice, Quality of Service, and QoS-based accounting all need enhanced network infrastructure.

Wireless communications networks have the advantage of being able to extend the reach of wired networks. However, achievable bandwidths in wireless networks frequently lag behind those available in wired networks. Wired broadband systems like asynchronous transfer mode (ATM) are capable of providing services with different QoS (e.g., constant bit rate (CBR), variable bit rate (VBR), and available bit rate (ABR)) for enhanced support of multimedia applications. It is desired to extend such services to wireless networks. Research on merging ATM and wireless networks is therefore currently underway in many institutions and research laboratories. Many fundamental issues, affecting everything from the access layer to the transport layer, are being studied. Besides use of ATM as a transmission format at the air interface of a wireless network, ATM is also being considered for the wired infrastructure of cellular systems. Such a wired ATM infrastructure would be capable of supporting multiple access air interface technologies (e.g., CDMA, TDMA, etc.).

In a wireless network that supports multimedia traffic, an efficient channel access protocol needs to be maximize the utilization of the limited wireless spectrum while still supporting the quality of service requirements of all traffic. Several well-known channel access protocols are currently used in wireless data systems, such as Slotted Aloha, PRMA, etc. Slotted Aloha is a simple protocol but, because it does not attempt to avoid or resolve collisions between data users, its theoretical capacity is just 0.37. In addition, Slotted Aloha is unsuitable for efficient transmission of variable-length packets.

Reservation-based protocols attempt to avoid and resolve collisions by dynamically reserving channel bandwidth for users needing to send packets. Typically, in such protocols a channel is divided into slots which are grouped into frames of N slots. A slot can be further subdivided into k minislots. Normally, $N_1$ of the slots will be used for reservation purposes while the remaining $N-N_1$ slots are data slots. The users that need to send packets send a reservation request packet in one of the $M=N_1*k$ minislots. If the reservation request packet is successful, then the user will be allocated a certain number of data slots until the user or the base station releases the reservation. If the reservation request packet is not successful, the user will use a conflict resolution method to retransmit the reservation request until it is successfully transmitted.

A multiple access protocol for hybrid fiber-coax networks has been proposed by Doshi et al. in "A Broadband Multiple Access Protocol for STM, ATM, and Variable Length Data Services on Hybrid Fiber-Coax Networks," Bell Labs Technical Journal, Summer 1996, pp. 36–65. While sharing many issues with the wireless environment, this protocol does not completely address the unique problems encountered in the design of a wireless access scheme, such dealing with retransmissions over an error-prone wireless link and establishment of the transission power level needed to ensure proper packet delivery. While this scheme does propose the idea of contention reservation slots, it does not provide a flexible scheme wherein the number of contention slots can be varied dynamically based on queue size information.

Karol et al have proposed a "Distributed-Queuing Request Update Multiple Access" scheme (DQRUMA) [Karol et al, "An efficient demand-assignment multiple access protocol for wireless packet (ATM) networks," Wireless Networks 1, pp. 267–279, 1995]. This wireless access scheme does not allow new users to contend for bandwidth during the conflict resolution period or utilize the reservation slot contention success rate during the previous round to adjust backoff time. This scheme also does not utilize a fair queuing technique, and hence does not make use of service tags to fairly allocate bandwidth between competing sources.

An important topic in designing a channel access protocol is selection of the scheduling techniques used to set the transmission order of uplink and downlink packets. A number of schedulers which are all variations on fair queuing have been proposed for wired networks [See, e.g., S. J., Golestani, "A Self-Clocked Fair Queuing Scheme For Broadband Applications", *Proceedings of IEEE Infocom,* 1994; Parekh and Gallagher, "A Generalized Processor Sharing Approach To Flow Control In Integrated Services Networks: The Single Node Case", *IEEE/ACM Transactions On Networking,* 1(3):344–357, June 1993; L. Zhang, "Virtual Clock Algorithm", *Proceedings of ACM Symposium,* pp 1224–1231, 1992]. These all have the effect of providing access to a share of bandwidth as if each service class has its own server at its given rate.

The Weighted Fair Queuing scheme of Parekh and Gallagher is difficult to implement, so the Self-Clocked Fair Queuing (SCFQ) scheme was proposed by Golestani. For SCFQ, the service tag is computed as;

$$F_k^i = \frac{L_k^i}{r_k} + \max(F_k^{i-1}, \hat{u}(a_k^i)) \qquad (1)$$

where û(t) is the service tag of the packet in service at time t, $F^i_k$ is the service tag for the $i^{th}$ packet from class k with $F^0_k=0$ for all k, $L^i_k$ is the length of the $i^{th}$ packet of class k, $r_k$ is the relative weight assigned to class k, and $a^i_k$ is the arrival time of the $i^{th}$1 packet of class k. Packets are then served in the order of these tag values. The algorithm of Golestani is designed for wired networks, however, and must be modified if it is to function in a wireless environment. In particular the algorithm of Golestani does not address either how to handle transmission scheduling when the server (base station) does not have complete information about the size of the queues because they are remotely located or how to handle retransmission of lost packets.

Lu et al (University of Illinois) have proposed an "Idealized Weighted Fair Queuing" algorithm [Lu et al, "Fair Scheduling in Wireless Packet Networks," Sigcom '97] that is designed to accommodate the special needs of wireless networks. This scheme requires full knowledge of the channel state (i.e. whether it is good or bad), something that is not generally available in a real network. It also does not change the service tags of packets that do not transmit successfully, leading to a complicated retransmission process, and drops packets from lagging flow, rather than only when there is a buffer overflow.

Another wireless access scheme, proposed by R. Kautz in "A Distributed Self-Clocked Fair Queuing Architecture For Wireless ATM Networks", 1997 International Symposium on Personal Indoor and Mobile Radio Communications, utilizes a polling system instead of a reservation and piggybacked reservation approach. Polling schemes generally have poorer performance in terms of delay and bandwidth usage as compared to reservation access schemes. In addition, the scheme of Kautz changes service tag values only for those packets transmitted in error, causing the QoS at all remotes to suffer because the packets of all the remotes are delayed by retransmission of the lost packet.

SUMMARY

The present invention is an aspect of an on-demand multiple access (ODMA) method with a fair queuing (FQ) service discipline (referred to as ODMAFQ) for efficient utilization of the limited bandwidth available in wireless communications networks. In this method, a bursty source sends a channel access packet to reserve bandwidths for future transmissions whenever a packet has arrived at an empty queue, while a constant bit rate source is made to undergo contention only once, during connection set-up. A distributed self-clocked fair queuing service discipline is used to determine the transmission order of various uplink sources, allowing diverse QoS to be provided.

In one aspect of the invention, remote hosts make bandwidth requests to the base station (AP) via uplink access request messages. These messages are partitioned into one or more reservation minislots in which remote hosts make their access requests. The number of reservation minislots available in any particular uplink message may be dynamically changed based on the percentage of idle minislots and the total uplink queue length.

A collision occurs for any access request where two or more remote hosts have transmitted a request in the same reservation minislot. The status of a minislot is also declared to be a collision if interference causes corruption of data in the slot. At the AP, the RF energy in a reservation minislot is estimated. If there is no energy present, then the minislot status is declared IDLE. The status of a minislot is SUCCESS if RF energy has been detected in the slot, a preamble in that slot is not corrupted, and a frame check sequence (FCS) in the slot indicates no errors. The status of a contention slot is declared to be COLLIDED if RF energy has been detected in the slot, and either the preamble in that slot is corrupted or a frame check sequence (FCS) in the slot indicates error.

Two new conflict resolution methods are disclosed. In these methods, the AP broadcasts the outcome of each contention cycle in each reservation minislot to all wireless nodes via a downlink broadcast message. Each wireless node is characterized by a stack level, and only wireless nodes with a stack level equal to zero are permitted to transmit access request packets. Nodes with a stack level greater than zero are regarded as backlogged. At the end of a time slot, each wireless node changes stack level based on the outcome of a transmission in that time slot. These methods allow newly active wireless nodes to join in with those wireless nodes already having stack level 0 during any particular conflict resolution period.

In both methods, a wireless node waiting to access the AP or send new data sets its stack level to 0 and enters the request state. If the stack level of the node is 0, the node randomly picks a reservation minislot for transmission of an access request and transmits the access request. If the outcome of the request is SUCCESS, and the queue at the node is empty, the node transmits the current packet and exits the request state, returning to the waiting state. If the queue at the node is not empty, then, after receiving a transmit permit from the AP, the node transmits the current packet along with a piggybacked reservation request for transmission of the next packet in its queue, continuing to transmit packets with piggybacked reservation requests after receiving transmit permits until the queue is empty, at which point it transmits the remaining packet, exits the request state, and returns to the waiting state. If the outcome of the reservation request was not SUCCESS, the node participates in a random draw to learn whether to increment its stack level by 1 or leave its stack level at 0. If the stack level remains at 0, the node again randomly picks a reservation minislot for transmission of an access request and transmits the access request. If the stack level is incremented, the stack level will not be 0.

In one of the new conflict resolution methods, if the stack level of any wireless node is not 0, then if the outcome of the previous reservation request was COLLIDED, the node increments its stack level by 1. If the outcome for the previous reservation request was not COLLIDED, the node decrements its stack level by 1. It can be seen from this that a node that loses the random draw is forced to wait out at least three contention slot opportunities before it can make a new access request.

The other new conflict resolution method is a modification of the first. In this method, the modem in each wireless node is again characterized by a stack level, and only wireless nodes with a stack level equal to zero are permitted to transmit access request packets. Modems with stack level greater than zero are regarded as backlogged. If the stack level of any wireless node is not 0, then if the outcome of all the reservation requests during the previous cycle was COLLIDED for greater than or equal to some threshold, the node increments its stack level by 1. If the outcome for the previous reservation request was not COLLIDED, the node decrements its stack level by 1.

It is a general object of the present invention to provide a remote host with bandwidth on demand in a wireless network. It is a further general object of the present invention to provide a method to efficiently resolve conflicts between remote hosts competing for the limited bandwidth available in a wireless network.

BRIEF DESCRIPTION OF THE DRAWINGS

The invention is described in detail in the following description of preferred embodiments with reference to the following figures, wherein:

FIGS. 12A–12D are flowcharts depicting different methods that may be utilized to dynamically change the number of reservation minislots according to one embodiment of the present invention;

FIG. 18B is a flowchart illustrating an alternate embodiment of a method for access control according to the present invention;

DETAILED DESCRIPTION OF PREFERRED EMBODIMENTS

As previously discussed, it is an object of the present invention to provide a wireless packet-switched data network for end users that avoids the public switched telephone network and provides end users of the wireless network with remote roaming capability. These and other objects are achieved in a wireless data network that includes a home mobility switching center, a foreign mobility switching center, a base station (access point) and an end user. The home mobility switching center includes a home registration server and a home inter-working function. The foreign mobility switching center includes a serving registration server and a serving inter-working function. The base station includes a proxy registration agent. The end user modem includes a user registration agent. The user registration agent is coupled to the proxy registration agent, the proxy registration agent is coupled to the serving registration server, and the serving registration server is coupled to the home registration server.

The proxy registration agent includes a module for sending an advertisement containing a care-of-address upon receipt of a solicitation from the user registration agent. The user registration agent includes a module for incorporating user identity information and the care-of-address into a registration request upon receipt of the advertisement, as well as a module for sending this registration request to the proxy registration agent. The proxy registration agent further includes a module for forwarding to the serving registration server any registration request received from any user.

The serving registration server includes a foreign directory module for determining a home registration server address, a module for encapsulating the registration request and incorporating serving registration server identity information and the encapsulated registration request into a radius access request when the home registration server address is determined, and a module for sending the radius access request to the home registration server. The home registration server includes a home directory module for authenticating the serving registration server identity information, a module for forming an inter-working function (IWF) request from the radius access request when the serving registration server identity information is authenticated, and a module for sending the inter-working request to the home inter-working function.

Figure 1:
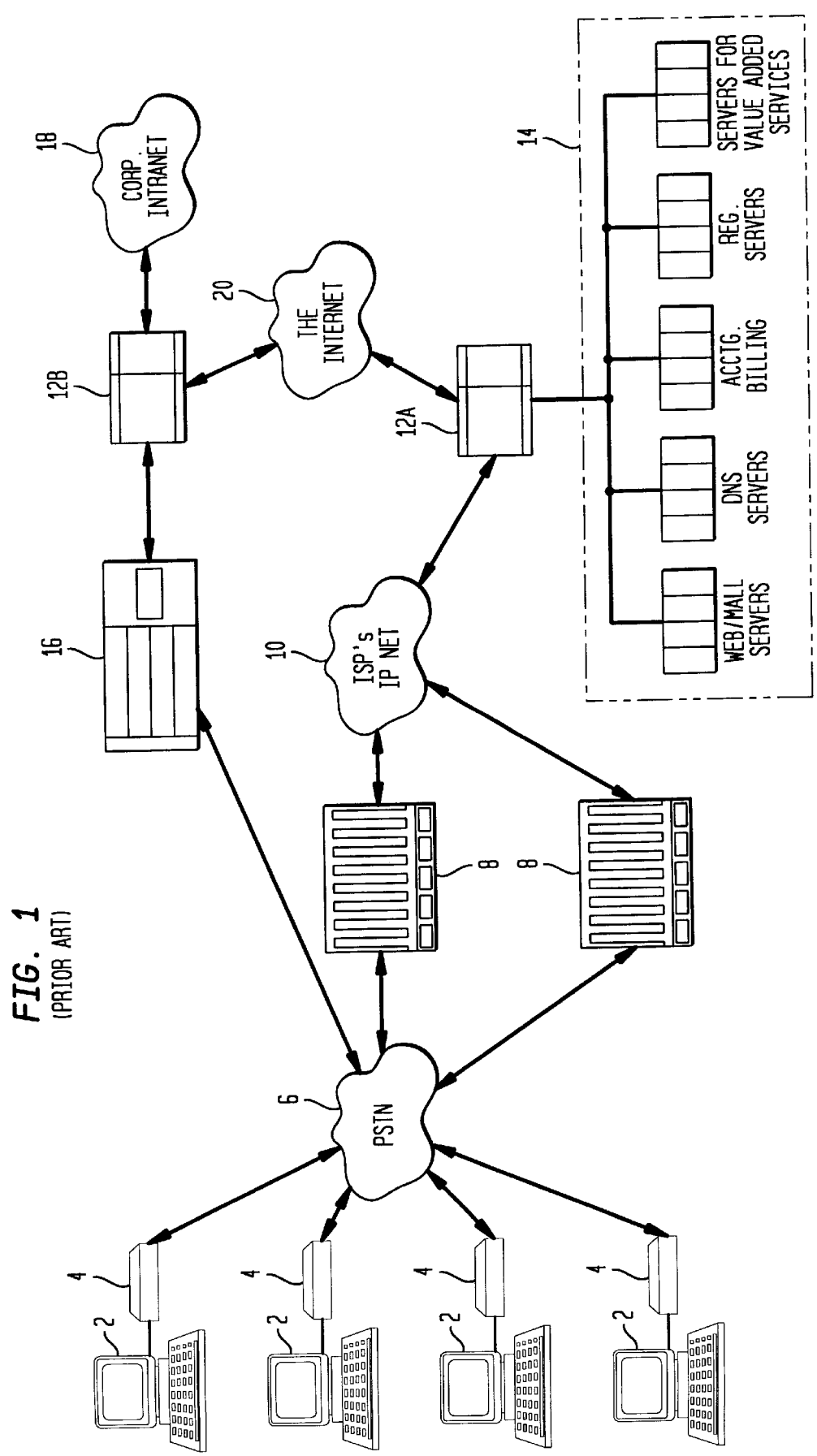
FIG. 1 is a schematic diagram of a prior art network.
Figure 2:
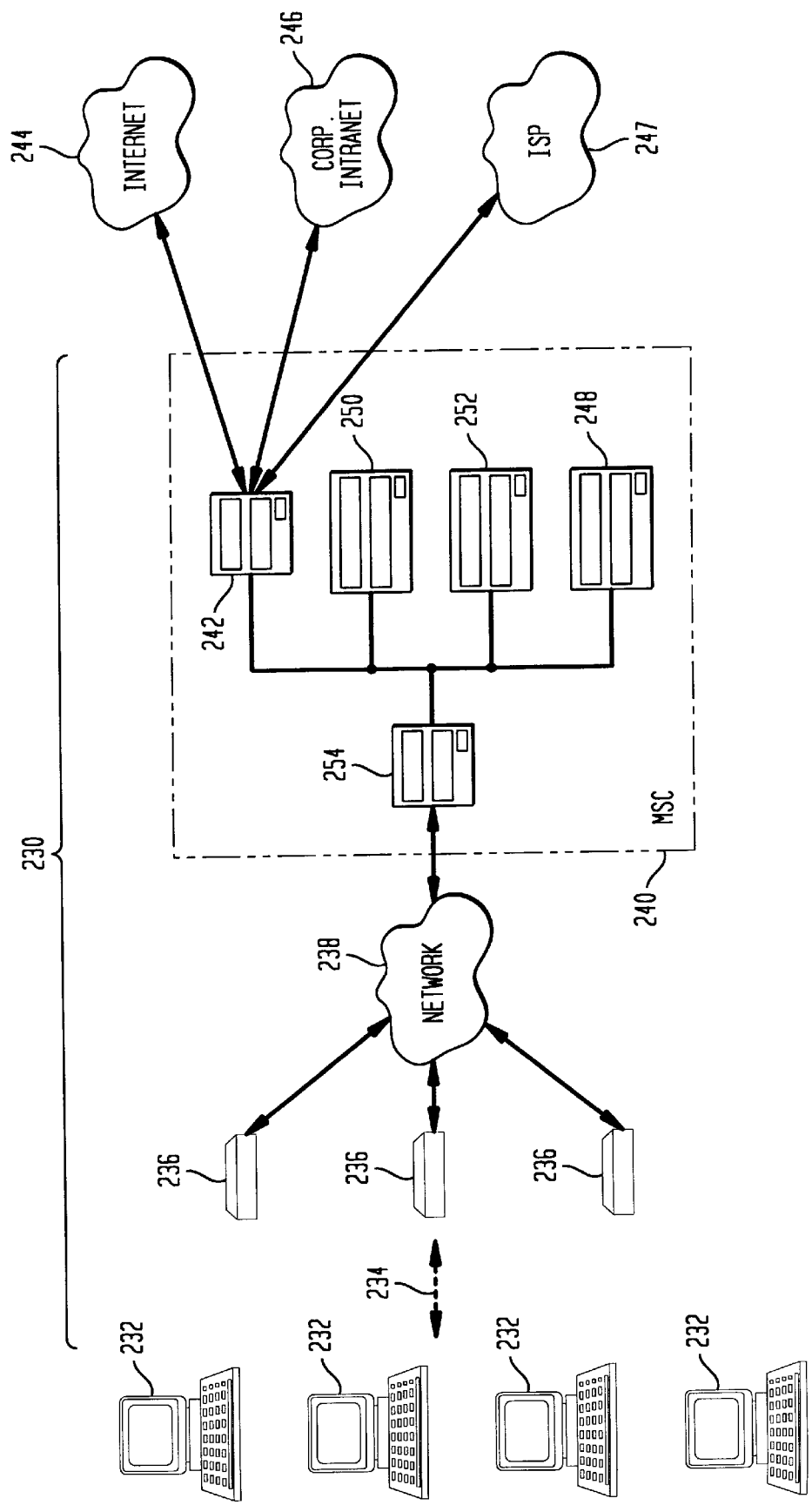
FIG. 2 is a schematic diagram of a network according to an aspect of the present invention.

As seen in the embodiment of a network utilizing the present invention depicted in FIG. 2, end systems (remote hosts) 232 (for example, a portable Windows 95 personal computer) connect to wireless network 230 via external or internal modems. These modems allow end systems 232 to send and receive medium access control (MAC) frames over air link 234. If used, an external modem may be attached to PC or other end system 232 via a wired or wireless link. External modems are generally fixed, and could be co-located with roof top-mounted directional antennae. External modems may be connected to the user's PC using any appropriate linking method, including any of following types of links: universal serial bus, parallel port, infra-red, 802.3, or even an ISM radio link. Internal modems send and receive MAC frames over the air link and are preferably PCMCIA cards that are plugged into the laptop's backplane using a small omni-directional antenna.

Wide-area wireless coverage is provided by base stations (access points) 236. The range of coverage provided by base stations 236 depends on factors like link budget and capacity. Base stations are typically installed in cell sites by personal communication services (PCS) wireless service providers. Base stations 236 multiplex end system traffic from their coverage area to the system's mobile switching center (MSC) 240 over wire line or wireless microwave backhaul network 238.

At mobile switching center 240, packet data interworking function (IWF) 252 terminates the wireless protocols for this network. IP router 242 connects MSC 240 to public internet 244, private intranets 246, or to internet service providers 247. Accounting and directory servers 248 in MSC 240 store accounting data and directory information. Element management server 250 manages the equipment, which includes the base stations, the IWFs, and the accounting/directory servers 248. The accounting server 248 collects accounting data on behalf of users and sends the data to the service provider's billing system. In a preferred embodiment, the interface supported by the accounting server 248 sends the accounting information in American Management Association (AMA) billing record format over a TCP/IP (transport control protocol/internet protocol) transport to a billing system (not shown in FIG. 2).

In the typical wireless network in which the present invention is utilized, each cell has a base station and a number of remote hosts (nodes), with or without additional wired hosts. Remote hosts/nodes can include any device capable of communication with the base station over a wireless link. Fixed-length packets arrive at the remote hosts ("remotes") at either a constant rate (CBR traffic) or according to various bursty random processes. The packets are buffered at the remotes until they are transmitted uplink to the base station, according to the channel access scheme. The base station broadcasts downlink packets that are destined for one or more of the remotes within its cell. Uplink and downlink communications are time-multiplexed on a single frequency channel in order to allow dynamic sharing of uplink and downlink bandwidths. The scheme of the invention can also be used for frequency division half-duplex (FDHD) and frequency division full duplex (FDFD) systems. The base station uses a variant of the Self-Clocked Fair Queuing algorithm of Golestani for scheduling the order of packet transmission from both remote hosts (remote queues) and wired hosts (local queues).

The On-Demand Multiple Access Fair Queuing (ODMAFQ) scheme of the invention is a time-slotted system in which a request access channel and a packet transmission channel are formed on a slot-by-slot basis. Time slot duration is chosen based on the particular system implemented. As an example, this might be equal to the time needed to transmit an ATM cell payload plus radio- and MAC-specific headers. The multiplexing of uplink and downlink traffic is based on time division duplex (TDD) for TDD and FDHD systems. Remotes that have packets to send transmit access requests via the request channel to the base station. The exact manner that each remote makes such a request is dependent on whether the remote's traffic is bursty or constant bit rate.

Transmissions on the request channel are on a multiple access basis. Upon receiving a successful access request, the base station updates appropriate entries in a Request Table. The Request Table contains an entry for every remote and wired host in the cell. Each entry contains the remote/wired host identification tag and an associated field containing the service tag, with a tag value of −1 preferentially being used to indicate that the particular host has no more packets to transmit. Since wired hosts are local to the base station, they do not need to execute the request access process.

The base station schedules transmission of its uplink and downlink traffic and allocates bandwidth dynamically, based on traffic characteristics and QoS requirements as well as the current bandwidth needs of all supported hosts. A service tag is used to schedule the transmission order of the packets from the hosts, with the current queue information of all wired hosts being always known to the base station and the queue information of the remotes being sent to the base station through reservation requests. Reservation requests are either piggybacked on an already-scheduled uplink transmission or sent to the base station via the request access channel in contention mode.

Figure 22:
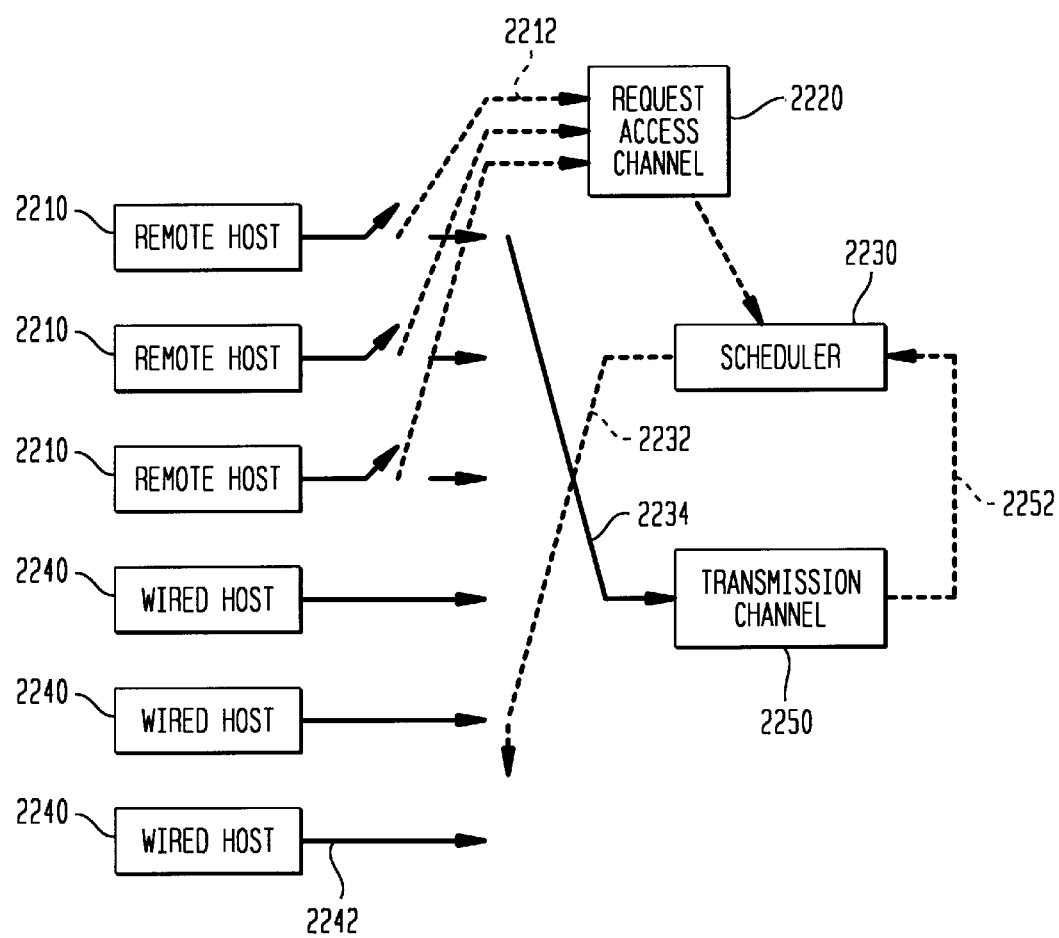
FIG. 22 is a block diagram of the On-Demand Multiple Access Scheme with Fair Queuing of the present invention.

An embodiment of the ODMAFQ scheme is depicted in FIG. 22. Remote hosts 2210 request access to the base station 2212 via the request access channel 2220. Successful requests are sent to the scheduler 2230, which notifies 2232 both the remotes 2210 and the wired hosts 2240 of when it will be their turn to transmit. When the time comes, a particular remote 2210 transmits 2234 a packet via the transmission channel 2250. If the remote has additional packets to be transmitted, it also piggybacks 2252 a reservation request for the next packet on the current packet being transmitted 2234 via the transmission channel 2250, thus avoiding the need to transmit a request 2212 in contention mode via the request access channel 2220 for the next packet.

Figure 23:
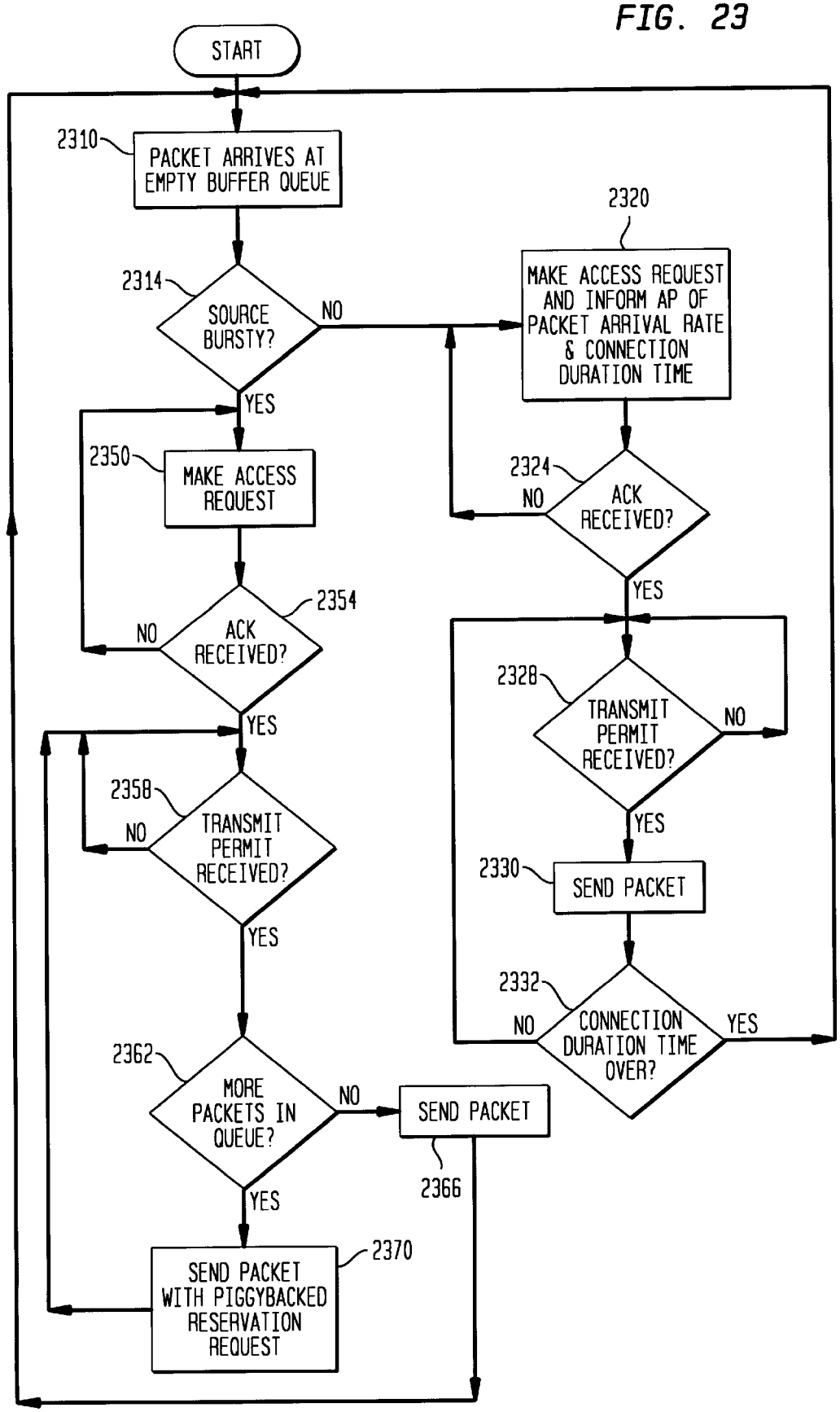
FIG. 23 is a flowchart illustrating the operation of the multiple access scheme of the present invention.

As illustrated in the flowchart of FIG. 23, when a packet arrives at a remote with an empty buffer queue 2310, if the source is not bursty 2314, i.e. provides a relatively continuous flow of packets or other data, the remote makes an access request and informs the base station (access point) of its packet arrival rate and connection duration time 2320. Once an acknowledgment (ACK) 2324 and transmit permit 2328 are received from the base station, the remote sends the first packet 2330 in the timeslot specified by the transmit permit. The base station will continue to provide the remote with transmit permits 2328 until the connection duration time is over 2332. Only one access request is required for the entire duration of the connection.

In contrast, when a packet arrives at a remote with an empty buffer queue 2310 from a bursty source 2314, i.e. a source with a highly discontinuous rate of flow of packets or other data, the remote makes an access request in contention mode 2350 via the uplink request access (RA) channel, which consists of multiple reservation minislots. The access request from a remote includes the remote's identity, which has been assigned at call setup or call handoff. When the base station successfully receives a transmit request from a remote, it updates the corresponding entry in the Request Table to indicate that the remote with that identity has packets to transmit and then broadcasts an acknowledgment over the downlink channel. The remote waits to receive the ACK 2354 and a transmit permit 2358. At the time of packet transmission, the remote determines if there are additional packets remaining in its queue 2362. If there are none, the packet is sent normally 2366. However, if there are additional packets awaiting transmission 2362, the remote piggybacks a bandwidth reservation request for the next packet onto the current packet when it is sent 2370. This piggybacking serves as a contention-free reservation request, thus only packets arriving at a remote with an empty buffer trigger a remote to send an access request.

Described herein, in conjunction with FIGS. 3–9D, are illustrative examples of the frame formats for a medium access control (MAC) scheme for an Internet access system according the principals of the present invention, including extensions for frequency division half-duplex (FDHD) mode and frequency division full-duplex (FDFD) mode. The On-Demand Multiple Access Fair Queuing (ODMAFQ) scheme described in conjunction with FIG. 23 can therefore be used to provide network control in both frequency division half-duplex and full-duplex modes. It is to be understood that the frame formats presented are examples only, and that other frame formats known to one of ordinary skill in the art of the invention and suitable for wireless transmission are contemplated by the inventor.

Figure 3:
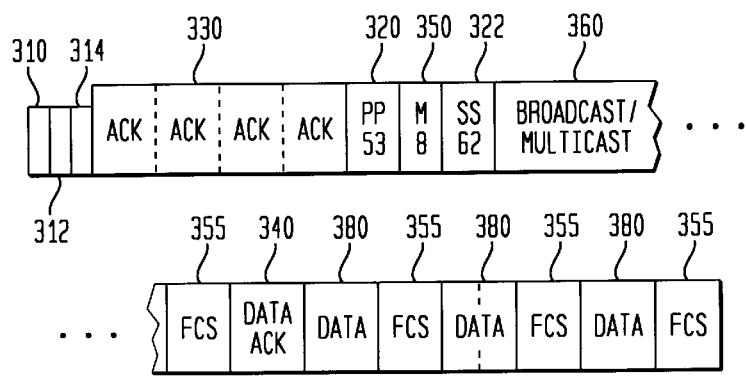
FIGS. 3 and 4 are frame diagrams showing example downlink and uplink frame structures for a frequency division half-duplex embodiment of the invention.
Figure 4:
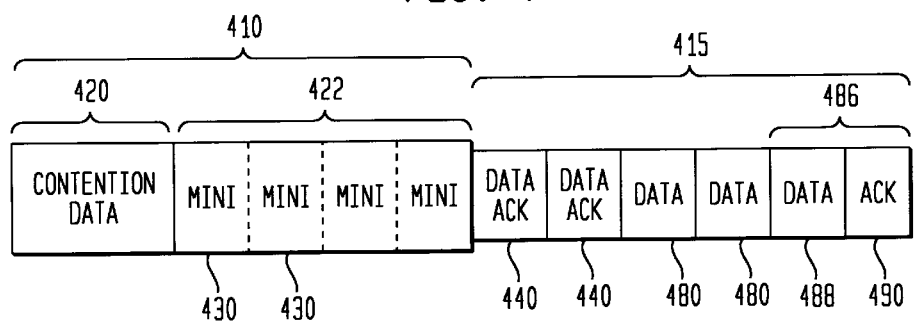

In both FDHD and FDFD modes, the access point (AP) transmits to the remote hosts at a downlink frequency f1 while the remote nodes transmit to the AP at an uplink frequency f2. FIGS. 3 and 4 show the downlink and uplink frame structure, respectively, for the FDHD case. Note that the length of downlink and uplink transmission times need not be the same. For example, if traffic characterization indicates that a 4:1 ratio of downlink to uplink transmission time (downlink transmission being longer than uplink transmission) is optimal, then optimal performance will generally be seen with the allocation of a downlink frame size of 4x ms and an uplink frame size of x ms.

As seen in FIG. 3, the downlink frame for the FDHD scheme of the invention may include physical layer overhead, such as some combination of guard and/or preamble bits 310 (which may be used as synchronizing bits), a medium access control (MAC) header 312, various control messages such as certain types of beacon messages 314, transmit permits 320, minislot information for the next uplink frame 350, and transmit schedules 322, acknowledgments (ACKs) for the reservation of minislots in previous uplink frame 330, acknowledgments for the data sent in the previous uplink frame 340, broadcast/multicast data messages 360, unicast data messages 380, and a frame check sequence (FCS) 355 for each preceding data message. Not all fields and messages are necessarily found in each downlink frame. For example, a downlink frame may consist of just the transmit permits, acknowledgments for reservation minislots, and unicast messages.

Some control messages are preferably part of the broadcast message 360, which may include such things as load metric, information about reservation minislots, flow control information, acknowledgments, and power management parameters. The load metric information can be as simple as the number of remote nodes registered with the AP, or may be more sophisticated, such as the equivalent number of active remote nodes. The load metric can be used for admission control and load-balancing among APs. The minislots information describes the number of reservation minislots present in the next uplink frame, if any, and their locations. The flow control information contains the connection cookie (identity) and an Xon/Xoff indication.

The acknowledgment 340 for uplink unicast traffic can be as simple as acknowledgment bits that are part of the broadcast message, or may be more sophisticated, such as separate unicast messages which specify the connection identity and the sequence number of the message to be acknowledged. In the former case, if the uplink transmission uses a frame structure with N fixed basic slots, then at most only N acknowledgment bits are needed. For the latter case, it is necessary for each message to have a separate frame check sequence (FCS). Note that, due to the "hidden terminal problem," all the frames transmitted need to be acknowledged.

The data slots 380 include transmissions from multiple remote nodes. The transmission from each remote node includes guard bits, preamble bits, frame control bits, acknowledgments, and/or data messages. One of the frame control bits is a "more" bit that is used to indicate that the remote node has more data to transmit. Alternatively, the number of remaining bytes or number of fixed size packets left to be transmitted may be particularly specified, rather than just through use of a "more" bit.

As seen in FIG. 4, the FDHD uplink frame generally will consist of a contention period 410 and a contention-free period 415. The contention period 410 includes one or more contention slots, each of which can be either a contention data slot 420 or a contention reservation slot 422. The contention-free period 415 consists of acknowledgments 440 for previous downlink dataslots and multiple data slots 480 and 486. If desirable, these contention slots 420 and 422 may be spread uniformly across the whole frame rather than clustered together. Each contention reservation slot 422 may be further subdivided into k subslots 430, called reservation minislots. Each minislot 430 is long enough to contain the identity of a remote node, generally around 30 bytes. Contention slots 420 may be utilized as dataslots for transmitting small data packets. The contention-free period 415 may include pure ACK frames 440, pure data frames 480, and/or combination frames 486 having both data 488 and ACK 490 portions.

The number of minislots 430 may be dynamically changed. If, for example, there are k minislots in a contention reservation slot 422 and N total contention slots, N1 of which are reservation slots 422 containing a total of N1*k minislots, then the remaining (N–N1) slots are currently contention data slots. If there are a minimum and maximum number of reservation minislots desired for the system, the number of available reservation minislots can be dynamically changed based on the percentage of idle minislots and the total uplink queue length. Several methods for dynamically changing the number of minislots are described later in conjunction with FIGS. 12A–12D.

In order to assign different priorities to the remote nodes attempting to gain access to the system, the $M_1 = N1*k$ minislots (where N1 is the number of contention reservation slots) may be divided into various groups. For example, a group of remote nodes with MAC addresses within a certain range may only be allowed to randomly access up to $M_2$ minislots (where $M_2 < M_1$), whereas a higher priority group of remote nodes with MAC addresses within another range may be allowed to randomly access up to $M_1$ minislots. Alternatively, priority classes may be assigned to nodes based on connection identity rather than MAC address. A priority assignment feature could be particularly useful, for example, for emergency-response organizations, such as hospital or police staff, and could be achieved through the provision of wireless modems that have a higher priority of access than regular wireless modems. This feature could also be sold as a service class to customers who are willing to pay more for a higher access priority.

Figure 5:
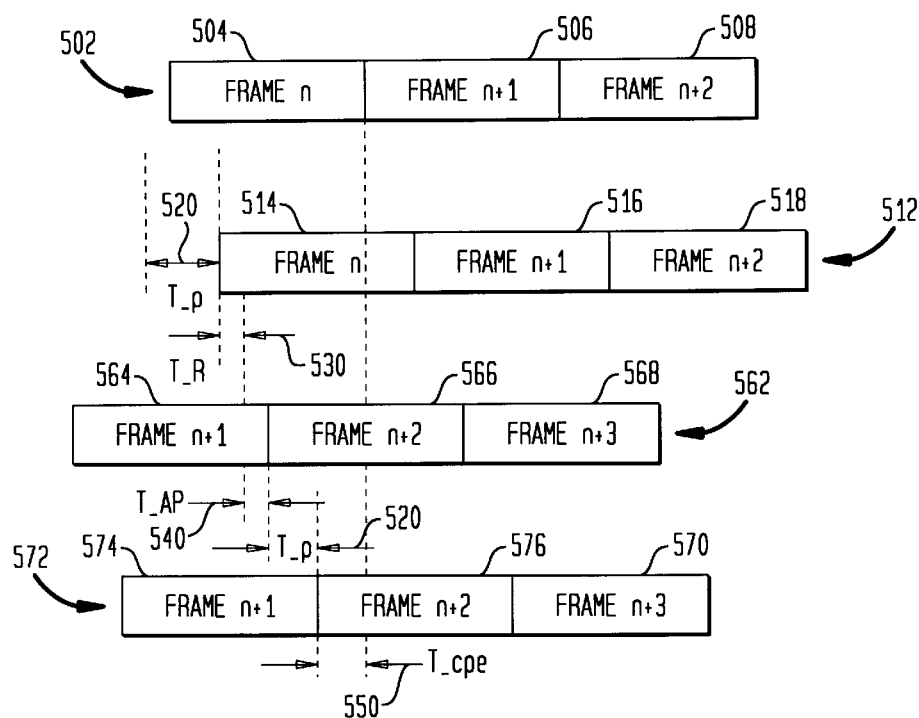
FIG. 5 is a frame diagram of the synchronized downlink and uplink frame structures for a frequency division full-duplex embodiment of the invention.

As depicted in FIG. 5, uplink frames 502 and 512 in Frequency Division Full-Duplex (FDFD) mode are synchronized with the downlink frames 562 and 572. As seen in FIG. 5, uplink frames 502 are shown as viewed from the wireless modem, uplink frames 512 are shown as viewed from the AP, downlink frames 562 are shown as viewed from the AP, and downlink frames 572 are shown as viewed from the wireless modem. In FIG. 5, the AP has previously sent downlink frame n to the wireless modem, which has received it after a propagation delay $T_p$. In response, after end system processing time $T_{cpe}$, the wireless modem sends uplink frame n 504, which is received 514 by the AP at propagation delay $T_p$ 520 later. Meanwhile, the AP has already begun transmission of downlink frame n+1 564.

In order for there to be enough time for the modems at the respective remote nodes to act on information in the transmit permits (for example, after receipt of downlink frame n, in the immediately following uplink frame), an offset of $O_u$ uplink transmission time is specified, where the end system processing time, $T_{cpe}$ 550, in a wireless modem is assumed to be smaller than $O_u$. Uplink frame n+1 506 from the wireless node therefore begins at an $O_u$ transmission time after receipt at the node of the last bit of the (n+1)st downlink frame 574 from the AP. The offset, $O_u$, and frame duration, $fd$, should be chosen so that the modems receive and process the feedback of the contention slots, such as the transmit permits received from the previous downlink frame, before the beginning of the next uplink frame. The frame size, $fd$, is such that $fd \geq 2T_p+T_{AP}+T_{cpe}+T_R$, where $T_p$ 520 is the propagation delay, $T_{AP}$ 540 is the AP processing time, $T_{cpe}$ 550 is the end system processing time, $T_R$ 530 is the transmit permit transmission time, and $O_u \geq T_{cpe}$.

Therefore, in FIG. 5, the AP is already transmitting downlink frame n+1 564 when the wireless modem begins transmission of uplink frame n 504. The wireless modem is already receiving 514 downlink frame n+1 at the time it begins sending uplink frame n 504. The AP receives 544 uplink frame n at a time $T_R$ 530+$T_{AP}$ 540 before it begins transmission of downlink frame n+2 566, which is received 576 at propagation delay $T_p$ 520 later by the wireless modem. The wireless modem transmits uplink frame n+1 506 at end system processing time $T_{cpe}$ 550 later, and it is received 516 at the AP after propagation delay $T_p$ 520. Similar synchronization occurs for the transmission 508 and receipt 518 of uplink frame n+2 and the transmission 568 and receipt 578 of downlink frame n+3.

The basic downlink MAC frame structure is a frame composed of several subframes. A super-frame made up of an integral number of frames can also be defined. The duration of a frame depends on the actual physical transmission rate, for example it might be fixed at 2 ms, and the number of subframes contained in a frame can be varied. If there are no stringent delay requirements, then the subframes can be of variable lengths. Otherwise, to meet the stringent delay requirements of certain sources, it is better to divide each frame into a synchronous transfer region (STR) and an asynchronous transfer region (ATR), so that those sources with such delay requirements can receive a fixed bandwidth during each frame Each of the regions may be further subdivided into basic slots.

Figure 6A:
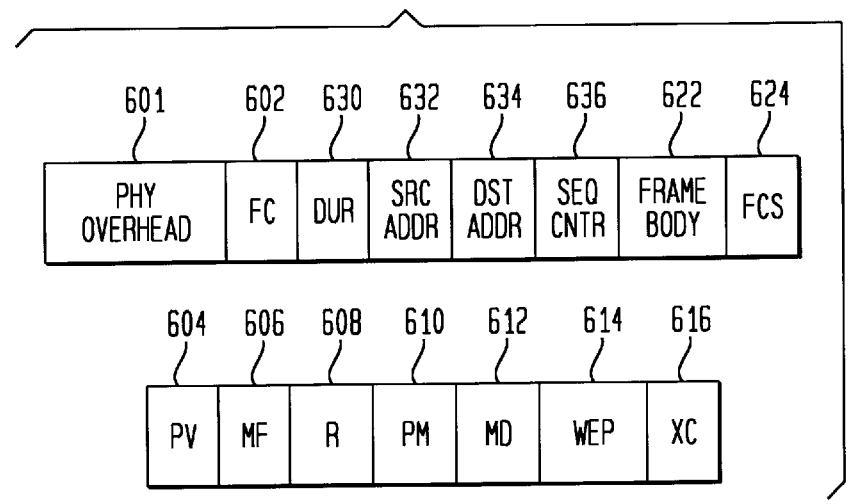
FIG. 6A illustrates a frame having a general MAC layer downlink broadcast subframe, according to an example embodiment of an aspect of the present invention.

FIG. 6A is an illustration of an embodiment of the frame format of a general MAC layer downlink broadcast subframe according to the present invention. This example MAC frame has a 17-byte MAC header 620, a frame body 622, and a 2- or 4-byte frame check sequence (FCS) 624, as well as Physical Layer Overhead 601 (guard and preamble bits). The MAC header 620 typically contains at least frame control bits, source and destination MAC addresses, and frame duration. The MAC header embodiment of FIG. 6A includes a one-byte frame control (FC) field 602, a 2-byte frame duration field 630, a 6-byte source MAC address 632, a 6-byte destination MAC address 634, and a 2-byte sequence control field 636 further subdivided into a 12-bit sequence number and a 4-bit fragment number. Obviously, any other MAC format would be suitable, depending on the type of handoffs required. The frame format will preferably be implemented in whatever manner makes the system most efficient.

The one-byte frame control field 602 of the embodiment of FIG. 6A includes a 2-bit protocol version identifier 604, a one-bit "more fragment" indication 606, a one-bit "retransmission" indication 608, a one-bit Xon/Xoff signal 616, a one-bit encryption on/off flag (WEP) 614, a one-bit "more data" indication 612, and a one-bit flag for power management on/off 610. If all these fields are not needed, any remaining bits may be reserved for future use. Other implementations are of course feasible and contemplated by the inventor.

Figure 6B:
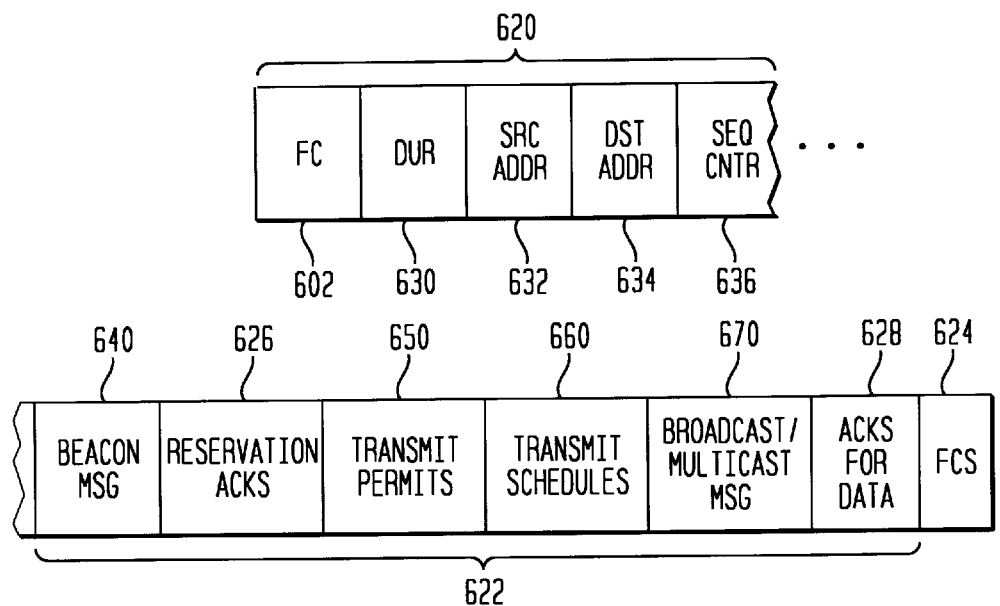
FIG. 6B depicts a broadcast or multicast downlink frame format.

A broadcast or multicast downlink frame format according to the present invention is depicted in FIG. 6B. In the particular embodiment of FIG. 6B, the frame body 622 contains a beacon message 640, acknowledgments for previous uplink reservation minislots 626, transmit permits 650, transmit schedules 660, a broadcast/multicast message 670, and acknowledgments for previous uplink data 628. The frame body 622 is followed by a frame check sequence 624 and preceded by a MAC header 620 comprised of a one-byte frame control (FC) field 602, a 2-byte frame duration field 630, a 6-byte source MAC address 632, a 6-byte destination MAC address 634, and a 2-byte sequence control field 636.

Figure 6C:
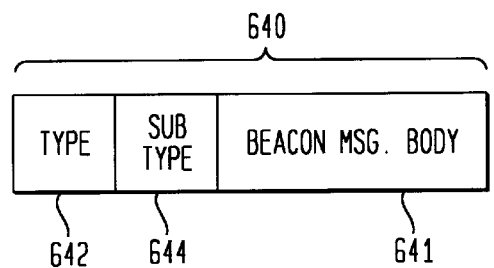
FIG. 6C depicts a beacon message format for the embodiment of FIG. 6B.

FIG. 6C depicts the format of the beacon message 640 of FIG. 6B (314, FIG. 3). The beacon message body 641 generally contains a message length field, the AP identity (referred to as ESS-ID and BSS-ID in Institute of Electrical and Electronics Engineers (IEEE) standard 802.11), the transmit power level, beacon interval, a timestamp, load metric, an optional FCS, and capability information. Beacon message capability information may include such information as the FDFD/FDHD option, the maximum number of admitted users, the maximum payload size, security option (such as whether encryption is being used or what encryption formats are supported), maximum number of retransmissions, ratio of downlink/uplink transmission time, uplink frame size, size of minislot, Quality of Service (QoS) features, etc. Load metric information, if present, generally contains the number of associated remote nodes. The beacon message body 641 is preceded by type 642 "Control" and subtype 644 "Beacon" fields.

Figure 6D:
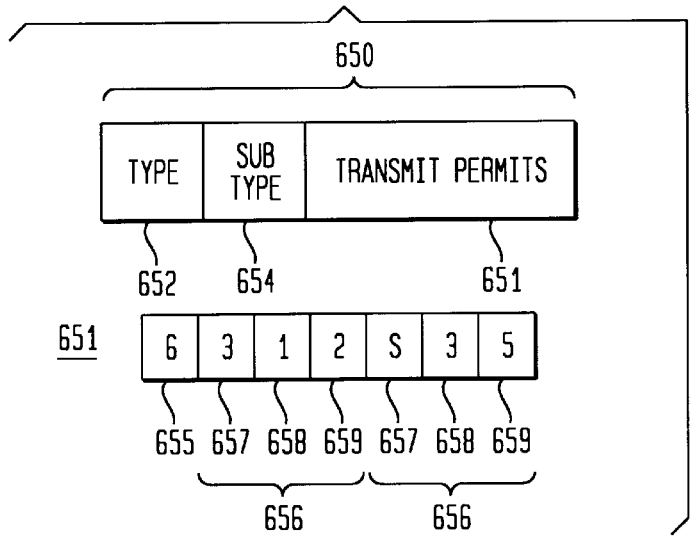
FIG. 6D depicts a transmit permit format for the embodiment of FIG. 6B.

FIG. 6D depicts the transmit permit format 650 (320, FIG. 3) of the embodiment of FIG. 6B. The transmit permit body 651 is preceded by type 652 "Control" and subtype 654 "Transmit Permit" fields. In this embodiment, the transmit permit body 651 contains a message length indicator 655 plus a number of transmit permits 656. Each 3-byte transmit permit 656 contains the identity of the remote node or connection 657, the start time or slot 658, and the duration that the remote node or connection is allowed to transmit 659 (end slot). In the example depicted, the Message Length 655 is 6 bytes, meaning there are two transmit permits 656 following. The first transmit permit 656 is for remote node 657 #3, which may start transmission at start slot 658 #1 and may transmit through end slot 659 #2. The second transmit permit 656 is for remote node 657 #5, which may start transmission at start slot 658 #3 and may transmit through end slot 659 #5. Different "Type" and "Subtype" labels may be used for the transmit permits of those wireless modems to which the AP sends both downlink unicast data and transmit permits. Subframes combining transmit permits and schedules are preferably sent after the pure transmit permits and before any pure transmit schedules.

Figure 6E:
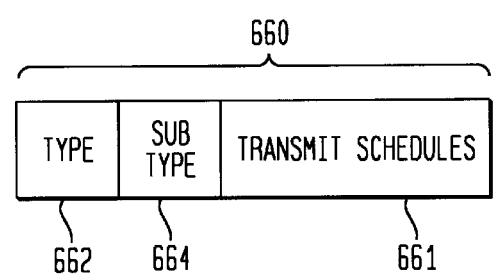
FIG. 6E depicts a transmit schedule format for the embodiment of FIG. 6B.

FIG. 6E depicts the transmit schedule format of the embodiment of FIG. 6B. The optional transmit schedules 661 (322, FIG. 3) allow remote nodes or connections that are associated with the AP to power down if no more data is scheduled to be sent to them. The transmit schedule body 661 is preceded by type 662 "Control" and subtype 664 "Transmit Schedule" fields. The transmit schedules 661 can take one of two forms. The first form is simple, e.g. a bitmap having a "1" to indicate the presence of unicast data for that remote node or connection, so that, for example "011000000010" would indicate that the frame contains unicast data for the second, third, and eleventh of twelve remote nodes. The second possible form is more sophisticated, containing, for example, a remote node or connection ID, the start time, and the duration that the node is allowed to transmit (the same as the data contained in a transmit permit).

Figure 6F:
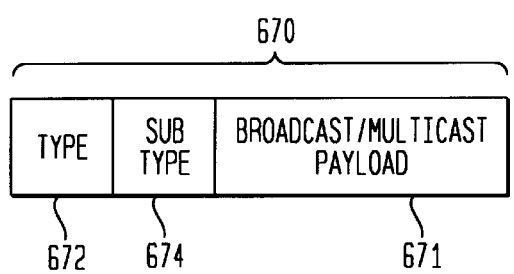
FIG. 6F depicts a broadcast or multicast payload format for the embodiment of FIG. 6B.

FIG. 6F depicts the broadcast or multicast payload format 670 (360, FIG. 3) of the embodiment of FIG. 6B. The payload body 671 can contain a wide variety of data messages or control information and is preceded by a type field 672 and a subtype field 674. These fields will vary according to the content of the payload body 671, for example if the payload body 671 contains the number of contention minislots and their positions, the type 672 is "Control" and the subtype 674 is "Contention Minislot Information," whereas if the payload body 671 contains a broadcast message from a wireless hub, type 672 will be "Data" and subtype 674 will also be "Data."

Figure 7A:
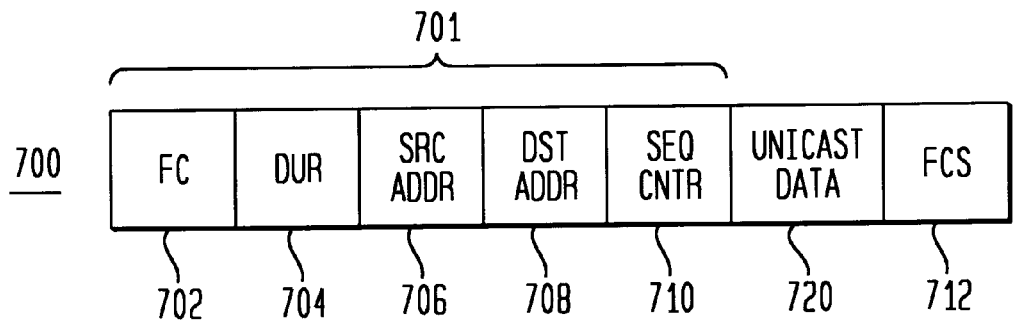
FIG. 7A illustrates a frame having a downlink unicast sub-frame, according to an example embodiment of the present invention.

FIG. 7A depicts an example embodiment of a frame format of a downlink unicast sub-frame 700 according to the present invention. Examples of unicast subframes are control messages, such as association response frames and flow control request frames, and data messages, with acknowledgments and/or "more data" information. The "more data" information can be as simple as one bit in the Frame Control 702 subfield of the MAC header, or may be more particularly expressed as the number of remaining bytes to be transmitted. The example downlink unicast subframe 700 depicted in FIG. 7A has a MAC header 701 having a one-byte Frame Control subfield 702, a 2-byte Frame Duration field 704, a 6-byte Source MAC Address 706, a 6-byte Destination MAC Address 708, and a 2-byte Sequence Control field 710. The remainder of the downlink unicast subframe 700 is comprised of the unicast data body 720 and a frame check sequence (FCS) 712.

Figure 7B:
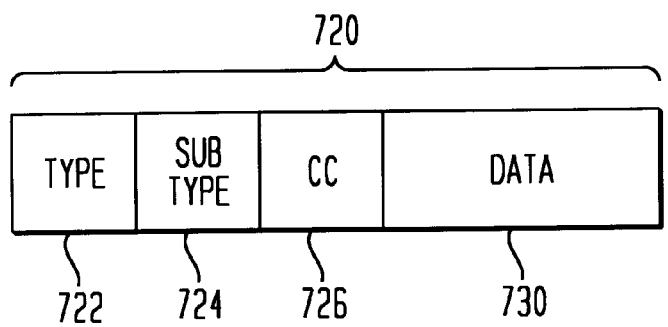
FIG. 7B illustrates a flow control frame format for a downlink unicast data subframe, according to an example embodiment of the present invention.

FIG. 7B depicts an example embodiment of a flow control frame format for a downlink unicast data sub-frame according to the present invention. In the particular embodiment of FIG. 7B, the unicast data body 720 has a Type field 722 "Control" and Subtype field 724 "Flow Control", followed by a Connection Identity (CC) field 726. Data field 730 follows, containing an Xon/Xoff bit.

Figure 7C:
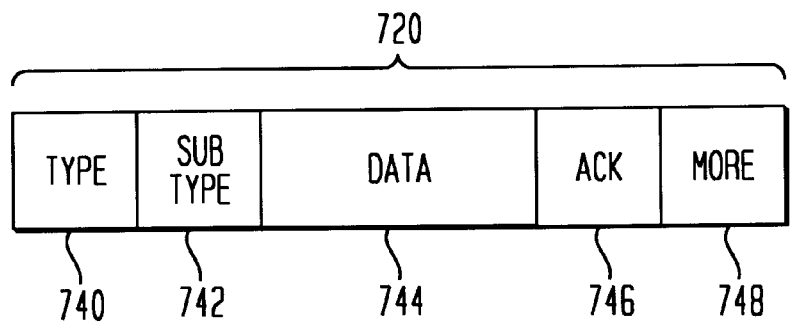
FIG. 7C illustrates a data frame format for a downlink unicast data subframe, according to an example embodiment of the present invention.

FIG. 7C depicts an example embodiment of a data frame format for a downlink unicast data subframe according to the present invention. In the embodiment of FIG. 7C, unicast data body 720 contains one or more of the following fields: Data 744, ACK 746 and "More Data" 748. If present, More Data field 748 can be as simple as a 1-bit flag or may give the remaining number of bytes. ACK field 746, if present, may take the form of a sequence number or a bitmap. Data body 720 starts with a Type field 740 "Data" and a Subtype field 742 that can have the values "Data", "Data+ACK", "Data+ACK+More", or "ACK", depending on the composition of the fields following.

Figure 7D:
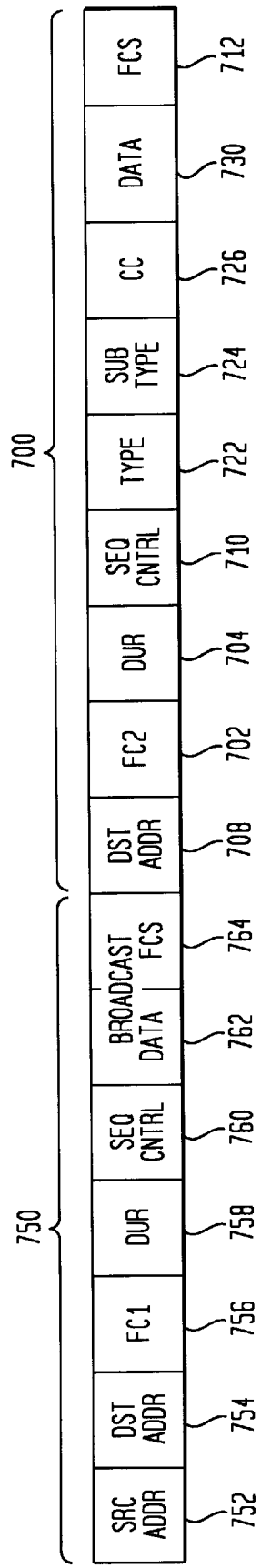
FIG. 7D depicts a unicast sub-frame concatenated to the back of a broadcast sub-frame.

If there is only one connection per wireless modem, then unicast sub-frames may be concatenated so that they are attached to the back of a broadcast subframe without the cost of source MAC address field overhead, as shown in FIG. 7D. The frame of FIG. 7D is comprised of a unicast subframe 700 concatenated with a broadcast subframe 750. Broadcast subframe 750 is comprised of a 6-byte Source MAC Address 752, a 6-byte Destination MAC Address 754, a one-byte Frame Control subfield 756, a 2-byte Frame Duration field 758, a 2-byte Sequence Control field 760, a broadcast data field 762, and a frame check sequence (FCS) 764. Unicast subframe 700 is comprised of a 6-byte Destination MAC Address 708, a one-byte Frame Control subfield 702, a 2-byte Frame Duration field 704, a 2-byte Sequence Control field 710, Type field 722, Subtype field 724, Connection Identity 726, data field 730, and a frame check sequence (FCS) 712. Frame Control field 702 in the unicast subframe 700 is optional, generally being included if the bits in the Frame Control field can be expected to change frequently. If the Frame Control field of the unicast subframe can be expected to be relatively static, it will frequently be omitted except on the specific occasions it is required.

For synchronization purposes, the AP may schedule the downlink broadcast and unicast subframes in such a way that the total broadcast and unicast subframe transmission time falls within an x ms frame structure, where x is generally 2 ms. However, for uplink transmission, uplink communication from the wireless modem is in burst mode and subject to collision in any case where more than one modem transmits in a given time window. Such a collision can be detected only at the AP. Each transmission burst also necessarily involves some physical layer overhead.

Figure 8A:
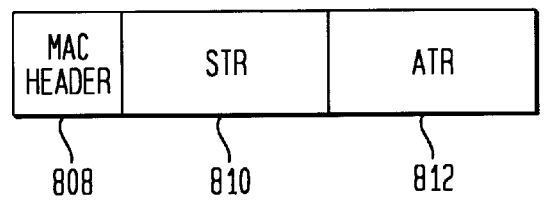
FIG. 8A illustrates a frame format for an uplink transmission frame, according to an example embodiment of the present invention.

To accommodate these factors, as shown in FIG. 8A, a frame structure has been defined for uplink transmission which allows for better synchronization while providing the ability to achieve stringent delay requirements for synchronous traffic. Each uplink frame is of duration x ms, with a 2 ms frame being used in the example presented. Each x ms frame is subdivided into a MAC header 808, a synchronous transfer region (STR) 810, and an asynchronous transfer region (ATR) 812. The synchronous transfer region 810 includes data slots for carrying synchronous CBR-like constant bit rate traffic. Each synchronous data slot in the STR 810 of the example embodiment of FIG. 8A is 27 bytes long with a 16-byte payload field.

Figure 8B:
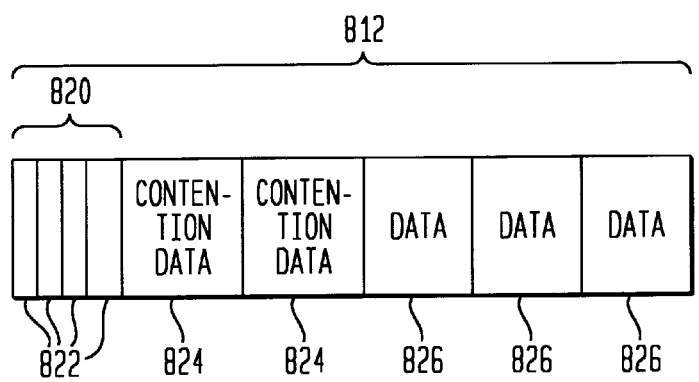
FIG. 8B depicts the asynchronous transfer region of the frame of FIG. 8A.

As shown in FIG. 8B, the asynchronous transfer region 812 is divided into N basic slots, with each basic slot being equivalent to a data slot for transmitting a fixed-size packet, for example, an asynchronous transfer mode (ATM) cell. Each basic slot can be a contention reservation slot 820, in which case it is further subdivided into k minislots 822. For example, a contention reservation slot 820 might consist of 63 bytes with each minislot 822 being 15 bytes. Basic slots can also be contention data slots 824 or reserved data slots 826.

Each uplink frame in the present example has at least C contention slots available for pure contention. Out of these C contention slots, $N_1$ are converted into reservation minislots for bandwidth reservations. The rest of the $C-N_1$ contention slots are data contention slots 824 used for transmitting short bursty messages that do not need a reservation. C and $N_1$ can be varying. The AP may convert unused contention data slots 824 into additional reservation minislots 822. As previously discussed, the number of reservation minislots 822 can be fixed or may be dynamically varying. The reservation minislots can also be clustered in a portion of the frame or spread throughout the frame. The AP broadcasts the number of contention slots available, the number of reservation minislots, and their positions in the next uplink frame in its preceding downlink frame.

The reserved data slots 826 in FIG. 8B are meant either for fixed protocol data units (PDUs), such as ATM PDUs, or for variable length PDUs. The transmission burst for an ATM PDU includes a 53-byte ATM cell, a MAC header, and the physical layer header. One reserved data slot 826 is allocated for the transmission of each ATM PDU. The transmission burst for variable length (VL) PDUs includes a variable length payload, plus the same overhead as required for an ATM PDU. For variable length PDUs, it is desirable to minimize segmentation, so each AP allocates as many contiguous reserved data slots 826 for VL PDUs as possible.

Since contention is wasteful, there will ideally be a field in the reserved transmission burst for requesting additional reserved data slots without going through contention. When a scheduling discipline that makes use of queue length information (e.g., a self-clocked fair queuing discipline) is used, the next packet size or the number of remaining packets of fixed size is specified in order to reserve bandwidth for future data transmissions from that source. When a First Come-First Serve or Round Robin queuing discipline is used, then the "more" bit in the frame control field of the MAC header may be utilized for the same purpose.

Figure 8C:
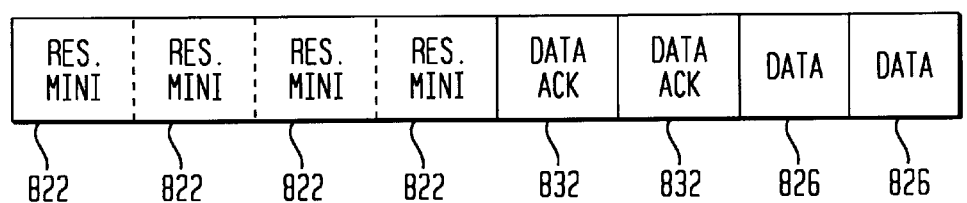
FIG. 8C depicts an uplink frame having reservation minislots according to an embodiment of the present invention.

In an uplink frame, constant bit rate transmission, if any, is in a fixed synchronous transfer region (STR) slot position determined at connection set-up time. For new asynchronous transmissions, the wireless node modem selects one of the available contention minislots 822 randomly, and requests bandwidth for ATM/VL bursts to be sent in a subsequent frame. A "new" asynchronous transmission is defined as the arrival of new packets to a connection with an empty queue. The AP then identifies collisions and notifies the wireless modems of the collision/success status of their reservation requests via the reservation minislot acknowledgment fields in the next downlink frame. A typical uplink frame is shown in FIG. 8C, including reservation minislots 822, ACKs 832 for data received in the previous downlink frame, and uplink reserved data fields 826. The AP schedules the ATM/VL slots for the next uplink frame according to the dictates of the service (queuing) discipline that has been implemented. This information is sent to the modems at the remote nodes via the downlink frame in the transmit permits and schedules (not shown, refer to FIG. 3).

Figure 8D:
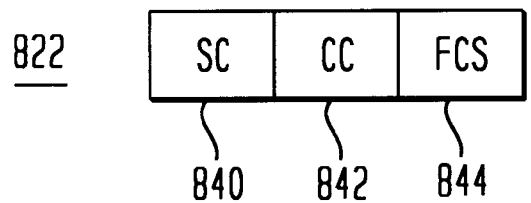
FIG. 8D illustrates a frame format for a reservation minislot, according to an example embodiment of the present invention.

FIG. 8D depicts an example frame format for the uplink frame reservation minislot 822 of FIG. 8C. The frame has a small MAC header 840 that contains only a Source MAC Address and a 2-byte Sequence Control field, followed by a Connection Identity (CC) field 842 and a Frame Check Sequence (FCS) 844.

Figure 8E:
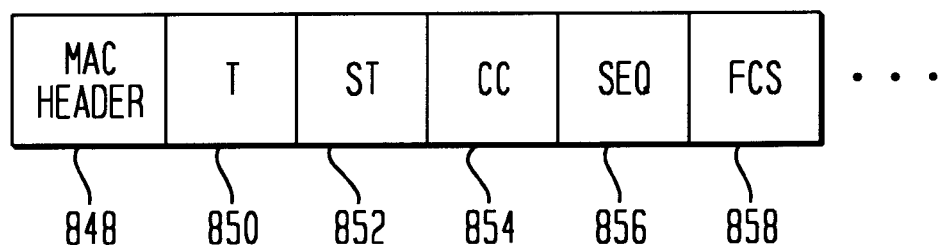
FIG. 8E illustrates a frame format for a pure acknowledgment uplink frame, according to an example embodiment of the present invention.

FIG. 8E depicts an example frame format for a pure acknowledgment uplink frame. In this format, a full MAC header 848 is followed by a Type field 850 "Data" and a Subtype field 852 "ACK", a Connection Identity (CC) field 854, a Sequence Number ACK field 856, and an FCS 858.

Figure 8F:
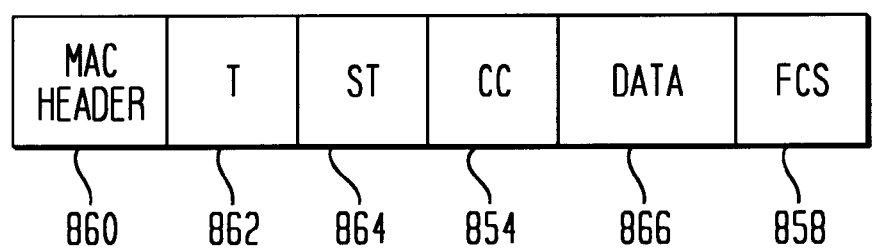
FIG. 8F illustrates a frame format for a pure data uplink unicast frame, according to an example embodiment of the present invention.
Figure 8G:
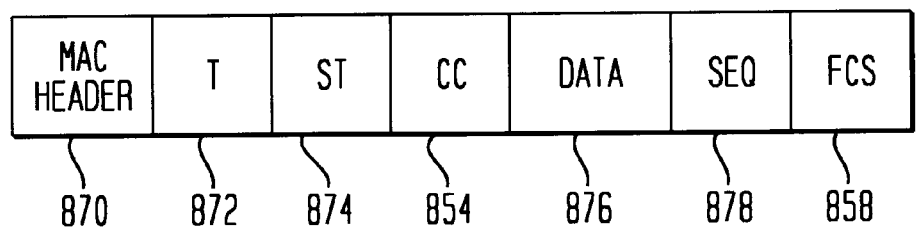
FIG. 8G illustrates a frame format for a combined acknowledgment and data uplink frame, according to an example embodiment of the present invention.
Figure 8H:
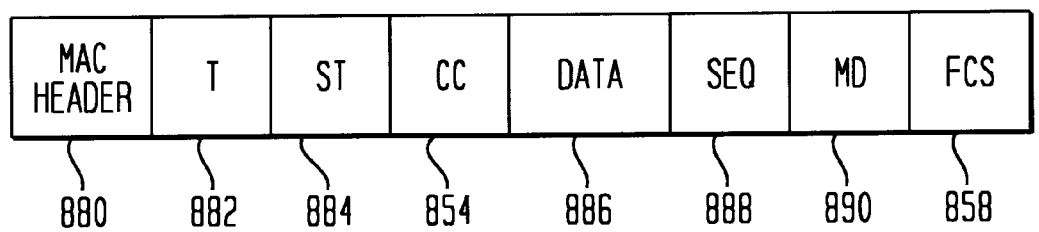
FIG. 8H illustrates a frame format for a combined acknowledgment, data, and "more" uplink frame, according to an example embodiment of the present invention.

FIG. 8F depicts an example frame format for a pure data uplink unicast frame. In this format, a full MAC header 860 is followed by a Type field 862 "Data" and a Subtype field 864 "Data", a Connection Identity (CC) field 854, a data field 866, and an FCS 858. FIG. 8G depicts an example frame format for a combined acknowledgment and data uplink frame. In this format, a full MAC header 870 is followed by a Type field 872 "Data" and a Subtype field 874 "Data+ACK", a Connection Identity (CC) field 854, a data field 876, a Sequence Number ACK field 878, and an FCS 858. FIG. 8H depicts an example frame format for a combined acknowledgment, data, and "more" uplink frame. In this format, a full MAC header 880 is followed by a Type field 882 "Data" and a Subtype field 884 "Data+ACK+More", a Connection Identity (CC) field 854, a data field 886, a Sequence Number ACK field 888, a More Data field 890 and an FCS 858.

The above described embodiments adapt the IEEE 802.14 standard to provide special messages for implementation of access control and admission of the remote nodes into the network. As a specific example, a system with uplink bandwidth 2.56 Mbps has a ramp up time 4 us, preamble of 32 symbols (25.0 us assuming QPSK), and turn-off time 4 us. These parameters lead to the requirements of a guard time of 20 bits at each end of a physical layer PDU and a preamble of 64 bits. In this system, a 2 ms uplink frame corresponds to 640 bytes. Assuming that the frame consists of both an STR and an ATR and that each basic slot in the STR is 27 bytes long, then a frame with one STR slot can also have, for example, 10 reservation minislots (with each basic slot being converted to 5 reservation minislots), 2 data contention slots, and 5 reserved data slots for ATM PDUs or VL PDUs.

Figure 11:
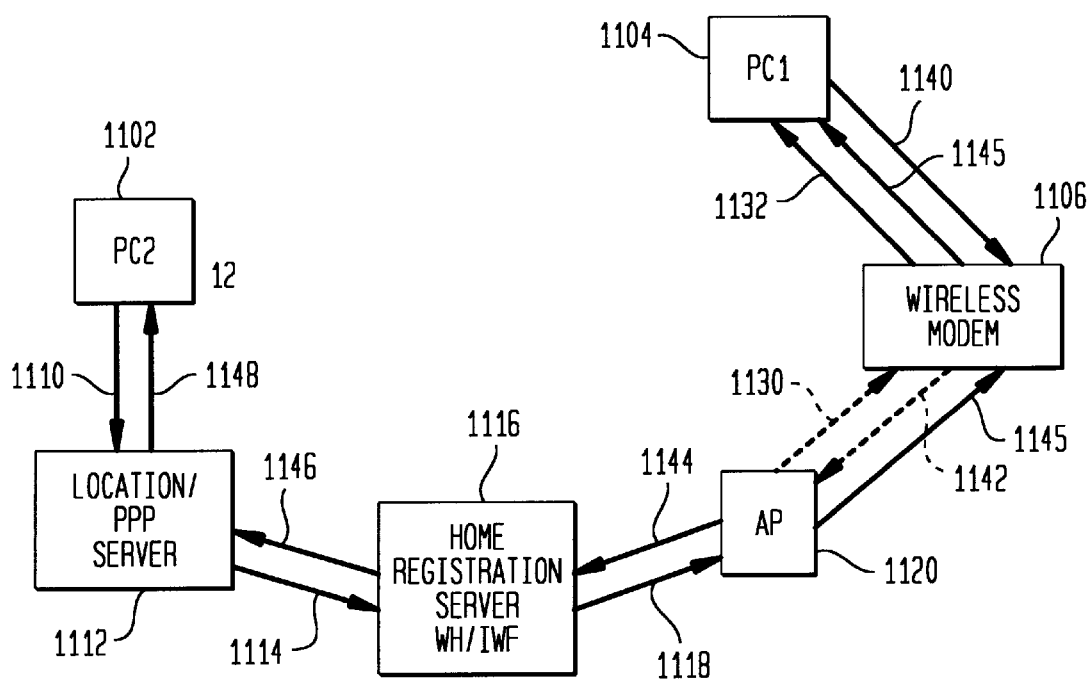
FIG. 11 is a schematic illustration of the operation of the paging capability of one embodiment of the present invention.

As illustrated in FIG. 11, a downlink broadcast/multicast message may be used for paging request messages. The paging request and associated response messages are designed to enable a PC on a wired network to call another PC over the wireless network. Paging request messages are useful for alerting a wireless modem that a wired host or another wireless modem is interested in communicating with it. The wireless modem whose ID is contained in a received paging request message responds with a paging response message, as well as with a connection request if there is currently no connection between the wireless modem and the Access Point. Paging capability requires a location server, which may be co-located with a PPP server if desired. The method would normally be used when the PC accessed via the wireless network has no IP address through which it may be more efficiently accessed.

As illustrated in FIG. 11, in order to allow PC2 1102 to initiate a call to PC1 1104 which is attached to a wireless modem 1106, a paging request message is defined. The initiating PC (PC2) 1102 sends a Call_Initiate message 1110 to a location/PPP server 1112 which identifies the home registration server 1116. The home registration server 1116 then identifies the proper WH/IWF and relays 1118 the Call_Initiate message to the AP 1120. Next, the AP 1120 sends a paging request 1130 to the wireless modem 1106 with which PC1 1104 is associated. Finally, the wireless modem 1106 relays 1132 the Call_Initiate message to PC1 1104.

To accept the call, PC1 1104 sends a Call_Accept message 1140 to the wireless modem 1106, simultaneously with a Connect_Request message. The wireless modem 1106 then sends a paging response 1142 to the AP 1120, which relays 1144 the message to the WH/IWF 1116. The wireless modem 1106 also relays the Connect_Request message to the AP 1120, which similarly relays it to the WH/IWF 1116. The WH/IWF 1116 sends a Connect_Reply message 1145 to PC1 1104 and then relays a Call_Accept message 1146 back to the location server 1112. Finally, the location server 1112 relays 1148 the Call_Accept message to PC2 1102.

The ODMAFQ scheme is capable of providing priority access within the same message stream from each user. Priority access will generally give important control messages a higher priority than data messages. Some important control messages which might be transmitted by a wireless modem in a reservation slot include: (a) Association Request, for requesting association of the wireless modem with an Access Point, (b) Connect Request, for requesting a connection set-up, (c) Paging Response, for responding to a Paging Request, and (d) Bandwidth Request, for requesting bandwidth allocation after having been silent for a while. The various types of possible messages may also be assigned correspondingly different priorities for differing Qualities of Service. In general, Association Request, Connect Request, and Paging Response messages would be expected to have a higher priority than data messages. As an example, if the service provider wishes to admit more users, Bandwidth Request messages should then be given lower priority than Connect Request and Paging Response messages, allowing for faster connection set-ups. Among data messages, voice signals carried over RTP/UDP packets, for example, would generally be given higher priority than tcp/ip data packets.

A fragmentation/reassembly mechanism has been defined in order to allow for fragment retransmission. The AP and wireless modem will generally fragment the MAC layer service data unit (SDU) if it exceeds the maximum payload size or if it exceeds the remaining space available in a downlink or uplink frame. Alternatively, a fragmentation threshold may be defined beyond which the MAC SDU will be fragmented. Each fragment has a sequence control field. All fragments belonging to the same SDU carry the same 12-bit sequence number, but are assigned different fragment numbers. A "More Fragment" bit in the frame control field is then set for all fragments except the last, indicating that there are additional fragments still to follow. The fragments are then sent in order of lowest to highest fragment number.

To meet the in-sequence delivery requirement, both the AP and the wireless modem make sure that all the fragments of the same SDU are transmitted before a new SDU is transmitted. Only those fragments that are lost are retransmitted. To prevent endless transmission delay (with concomitant transmission backlog), a particular source (wireless modem or AP) maintains a MAC SDU transmission timer which is started the moment a MAC SDU is passed to the MAC layer. When the timer exceeds the pre-established MAC SDU lifetime, all remaining fragments will be discarded by the source, and no attempt is made to complete the transmission of the MAC SDU.

To prevent endless waiting for permanently lost fragments, the destination station reconstructs the MAC SDU by combining the fragments in order of the fragment number of the sequence control field. If the destination station receives a fragment with the "more fragment" bit set, it knows that it has not yet received a complete MAC SDU. As soon as the destination station receives a fragment having a clear "more fragment" bit, it will reassemble the MAC SDU and pass it to a higher layer.

The destination station (such as a wireless modem or AP) maintains a receive MAC SDU timer which is initiated upon receiving the first fragment of a MAC SDU. The destination station should preferably have at least 3 timers for receiving three MAC SDUs simultaneously. The destination station then discards all received fragments of any MAC SDU for which a receive timer is not maintained. When the receive MAC SDU timer exceeds the pre-established receive MAC SDU life time, all fragments will be discarded. If additional fragments are received after the receive MAC SDU timer expires, the fragments are acknowledged and then discarded. The destination station also discards any duplicate fragment received, but still sends an acknowledgment in response.

The MAC protocol operation in the multiple access scheme includes the following steps: Uplink transmission power level establishment, uplink initial contention, uplink conflict resolution, uplink bandwidth allocation, AP downlink bandwidth allocation, contention status notification via the downlink control field, and scheduling of uplink transmissions via transmit permits. In particular, for constant rate traffic, each modem informs the AP of the packet arrival rate during connection setup, in order that only one access request is required for the whole duration of the connection.

Figure 13A:
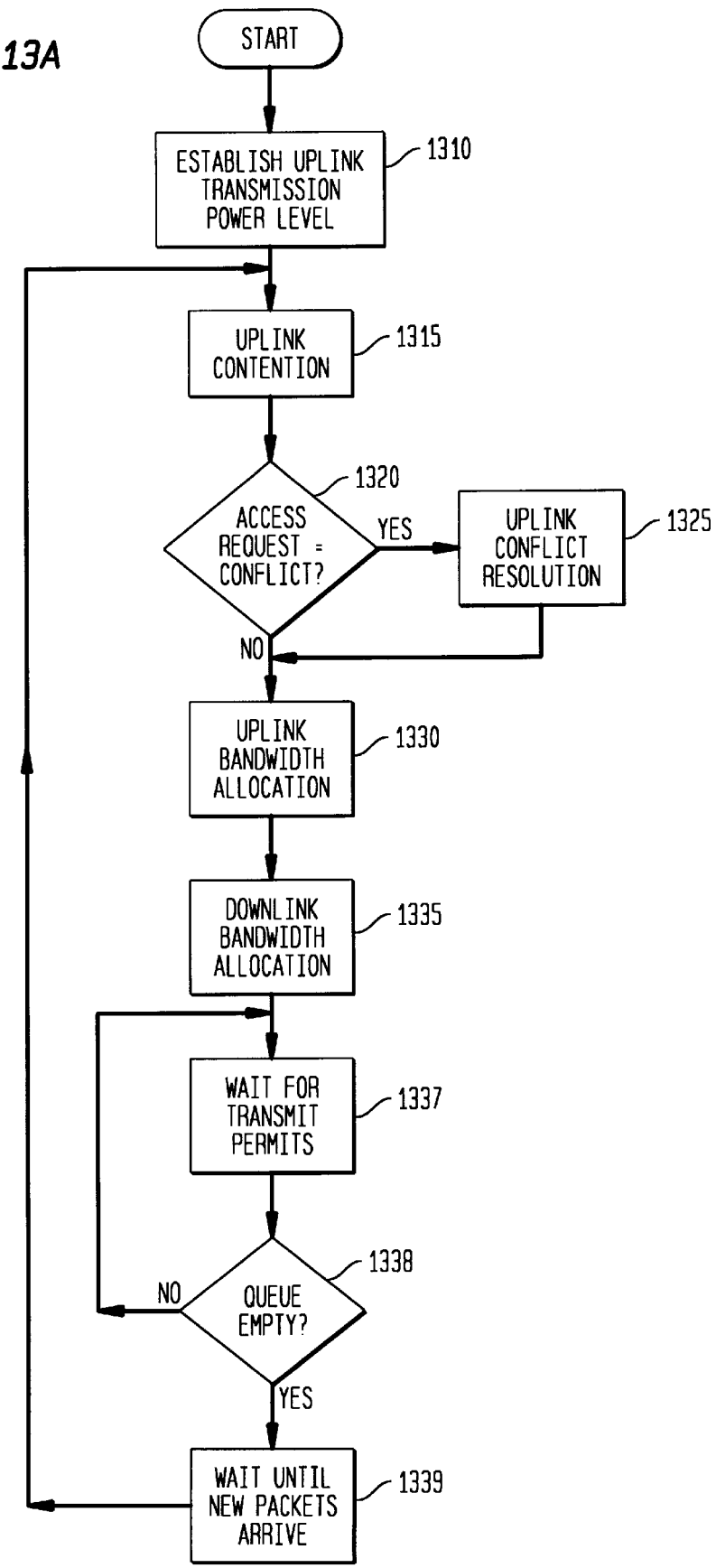
FIG. 13A is a flowchart illustrating the overall MAC protocol operation, as viewed by a remote host, according to one embodiment of the present invention.

The overall ODMAFQ MAC protocol operation is illustrated in the flowcharts of FIGS. 13A and B. As seen from a remote host, FIG. 13A, after establishment of the power level for uplink transmission 1310, the remote hosts participate in uplink initial contention 1315 during which each remote with packets to send requests access to the AP. If some of these access requests collide 1320, in that they are submitted in the same reservation minislot, the colliding remote hosts participate in uplink conflict resolution 1325. Otherwise, the AP proceeds to allocate uplink bandwidth 1330 among the remote hosts requesting access, followed by allocation of bandwidth for its own downlink transmission 1335. Each remote host waits to receive a transmit permit 1337 during a subsequent downlink transmission and, upon receiving one, transmits a waiting packet from its queue. If the queue at a remote is not then empty 1338, the remote returns to waiting for additional transmit permits 1337, otherwise it waits for new packets to arrive 1339.

Figure 13B:
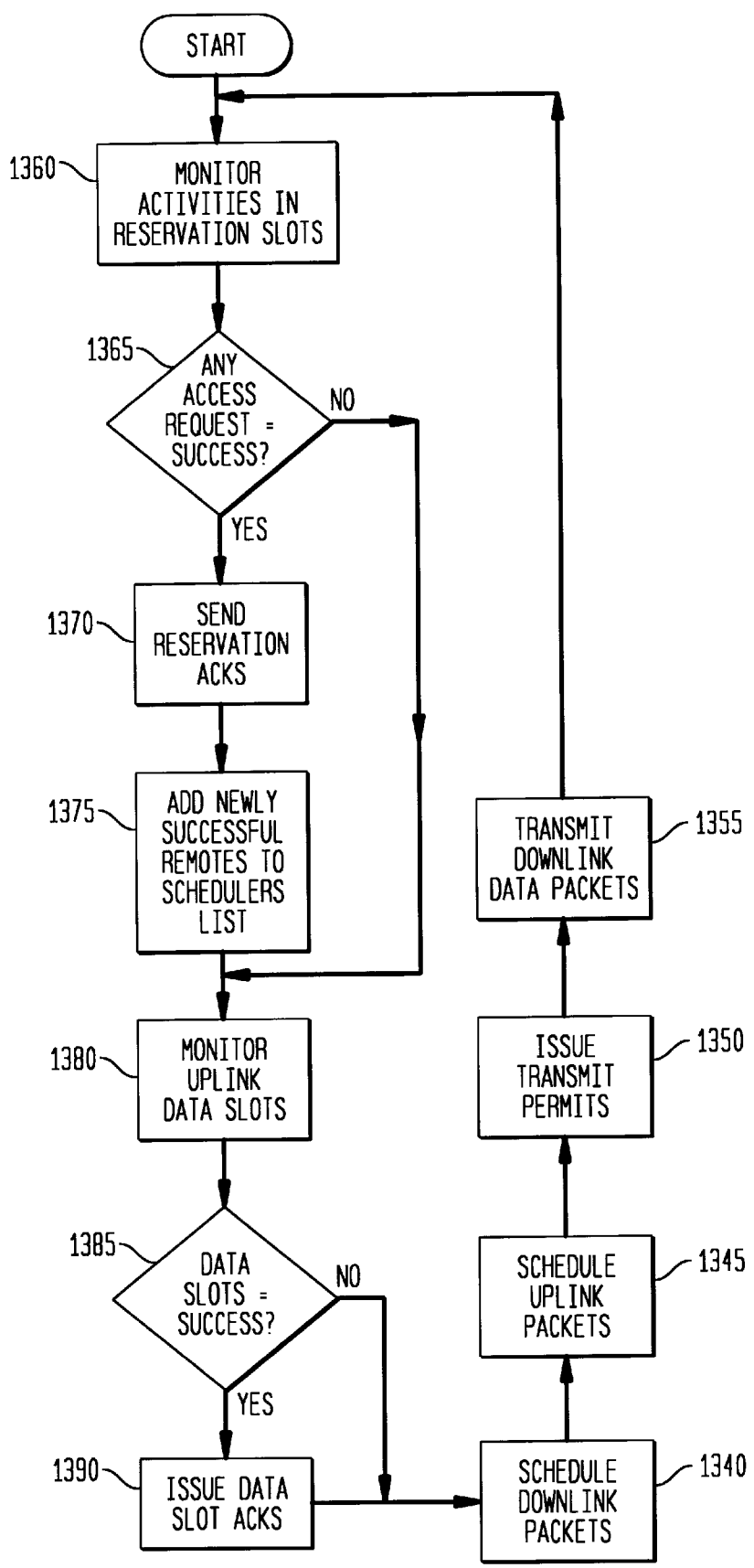
FIG. 13B is a flowchart illustrating the overall MAC protocol operation, as viewed by the base station, according to one embodiment of the present invention.

As illustrated in FIG. 13B, the AP monitors activity in the received contention reservation slots 1360. When it receives a successful access request 1365, the AP sends reservation acknowledgments (ACKs) 1370 and adds the newly successful remotes to the scheduled list 1375. Whether or not there have been new successful access requests 1365, the AP also monitors the uplink dataslots 1380 as long as the scheduled list is not empty, and when it receives a successfully transmitted packet 1385, it replies with a data ACK 1390. The AP then schedules its downlink packets 1340, schedules the uplink transmissions 1345 of the successfully contending remote hosts, issues the associated transmit permits 1350, and then transmits downlink data packets 1355, after which it returns to monitoring activity in the contention reservation slots 1360.

It may be desirable to allow for an optional channel holding feature whereby each queue can remain empty for a short while without the Access Point releasing the bandwidth reservation. This allows high priority users to remain in the base station's reserved bandwidth list for an allotted amount of time before it is released, encouraging low latency of real-time packets (i.e. little or no delay for packets of time-sensitive data such as voice communications) by avoiding all the setup signaling messaging required for channel reservation. Utilizing this feature, when a queue is empty, a timer is triggered at the wireless modem. As long as new packets arrive at the wireless modem before this timer expires, the wireless modem does not need to make a new access request. At the AP, if this feature is turned on, then the AP will still allocate a transmit permit for one data slot to this particular wireless modem every alternate uplink frame, even if the last uplink data transmission from the wireless modem has indicated that the queue is empty. The AP will also start a timer. When the timer expires and the AP has not received new packets from that wireless modem, then the AP will remove the wireless modem from the reserved bandwidth list. This channel holding feature is particularly useful if the bandwidth reservation process takes a while to complete, allowing low latency for real-time packets that, while not arriving back-to-back, are not so far apart as to warrant a separate bandwidth reservation request via contention for each data packet. However, for bursty sources that do not need this channel holding feature, when a packet arrives to find an empty buffer, the modem will still send an access request to the AP via one of the contention minislots.

Figure 17:
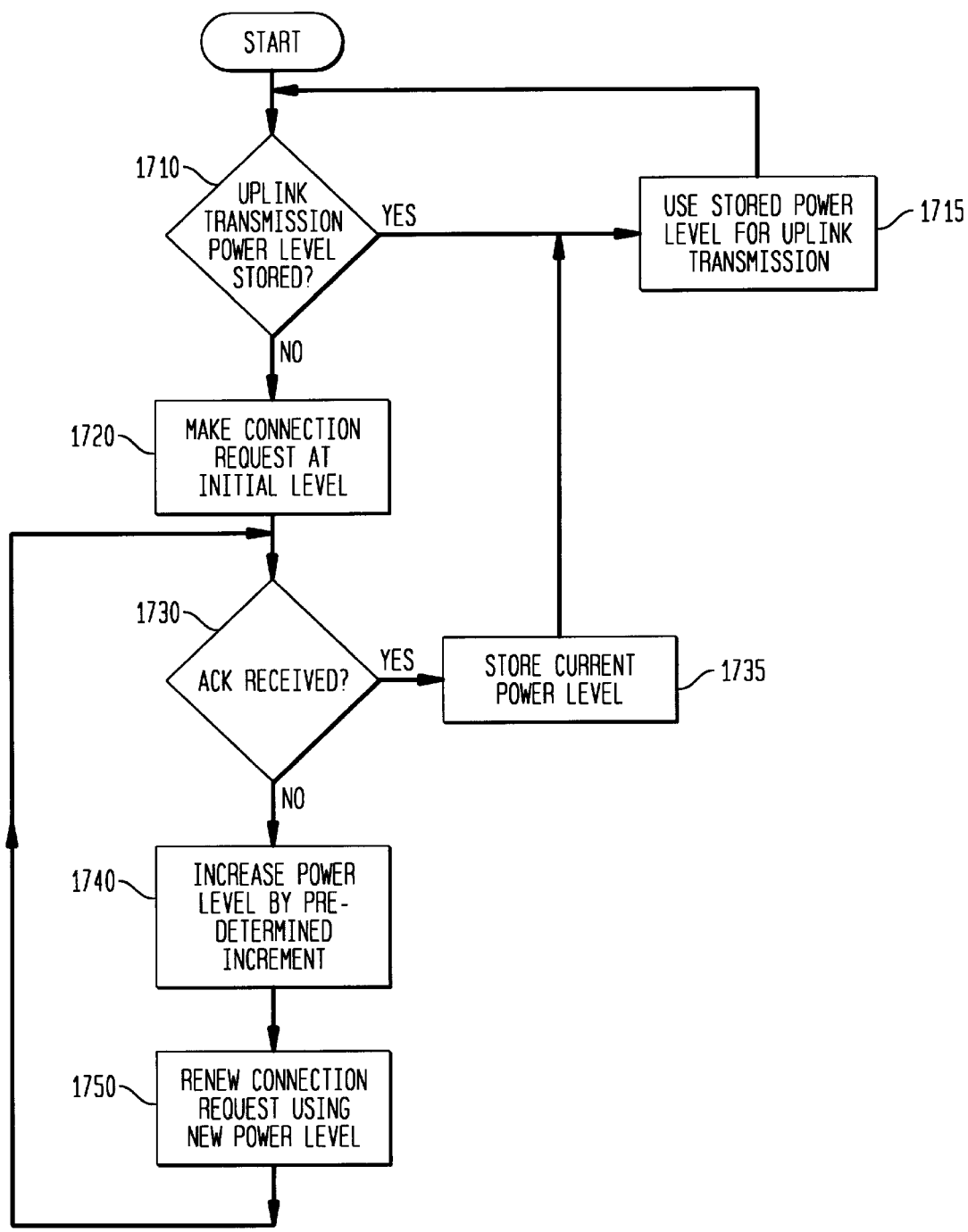
FIG. 17 is a flowchart illustrating establishment of the power level for uplink data transmission according to an aspect of the method of the present invention.

As illustrated in FIG. 17, the uplink power level for data transmission between the base station and several remote hosts in a wireless network employing ODMAFQ may be established during the initial access request message of the remote host. The method used is similar to that used for Code Division Multiple Access (CDMA) International Standard IS95 Channel Power Control. If the uplink transmission power level between a particular remote host and the AP has been stored at a previous time 1710, the stored level is used for uplink data transmission 1715. Otherwise, the remote host first transmits a short connection request message at an initial power level that is set relative to the nominal open loop power level 1720. If the remote host's first transmission is unsuccessful and therefore no acknowledgment is received 1730 from the AP, the power level is incremented by a power increment amount which may be predetermined 1740, the connection request is renewed at the new power level 1750, and the steps of transmitting and incrementing are repeated until the transmission is successful. The power level at which transmission is finally successful is then stored 1735 and used for further data transmission 1715 between that remote host and the base station.

In the preferred embodiment, uplink initial contention utilizes the following scheme. If there are M minislots available for contention in the next uplink frame, then an initial (first time) contention message is transmitted in accordance with the following:

1. A random number, x, is generated at the remote node modem from a uniform distribution over 1 through M, and
2. The initial contention message is transmitted in the xth minislot in the next uplink frame.

If desired, carrier sensing can also be used during initial contention. Before transmission, the channel is sensed. If access priority is implemented, instead of choosing a random number between 1 and M, the wireless modem then chooses between 1 and $I_i$ where $I_i$ is the threshold for users of class i, where a lower value indicates a higher priority, i.e., $I_{i+1} < I_i$. If, however, the contention message is not a contention reservation minislot request message, but rather is a contention data slot message, then the message is transmitted in the next contention data slot.

More than two access priority classes may be offered. As previously discussed, the uplink frame includes $N_1$ minislots. If, for example, if there are p access priority classes, each class having access priority i (where a smaller number means a higher priority) can send contentions in the minislots ranging from 1 to $I_i$, where $I_1 = N_1$, $I_{i+1} \leq I_i$. A strict usage priority can be implemented on top of this access priority scheme, so that when an AP receives a connection request that has a higher usage priority, it can disconnect an existing connection of a lower usage priority by sending a disconnect request frame to the wireless modem that supports the connection.

Collision occurs in a contention slot when two or more wireless modems transmit in the same minislot. Also, if interference causes corruption of data in a contention slot, the slot status is declared to be a COLLISION. As previously described, there are 2 types of contention slots in an uplink frame: (1) a reservation slot containing minislots for bandwidth request messages, and (2) a data slot containing uplink short bursty messages in contention superslots. At the AP, the RF energy in an uplink contention time slot is estimated. If there is no energy present, then the contention slot is declared IDLE. The status of a contention slot is declared to be SUCCESS if all the following hold true: 1) RF energy has been detected in the slot, 2) a preamble in that slot is not corrupted, and 3) a frame check sequence (FCS) in the slot indicates no errors. The status of a contention slot is declared to be COLLISION if RF energy has been detected in the slot, and at least one of the following holds true: 1) the preamble in that slot is corrupted or 2) a frame check sequence (FCS) in the slot indicates error.

Figure 18A:
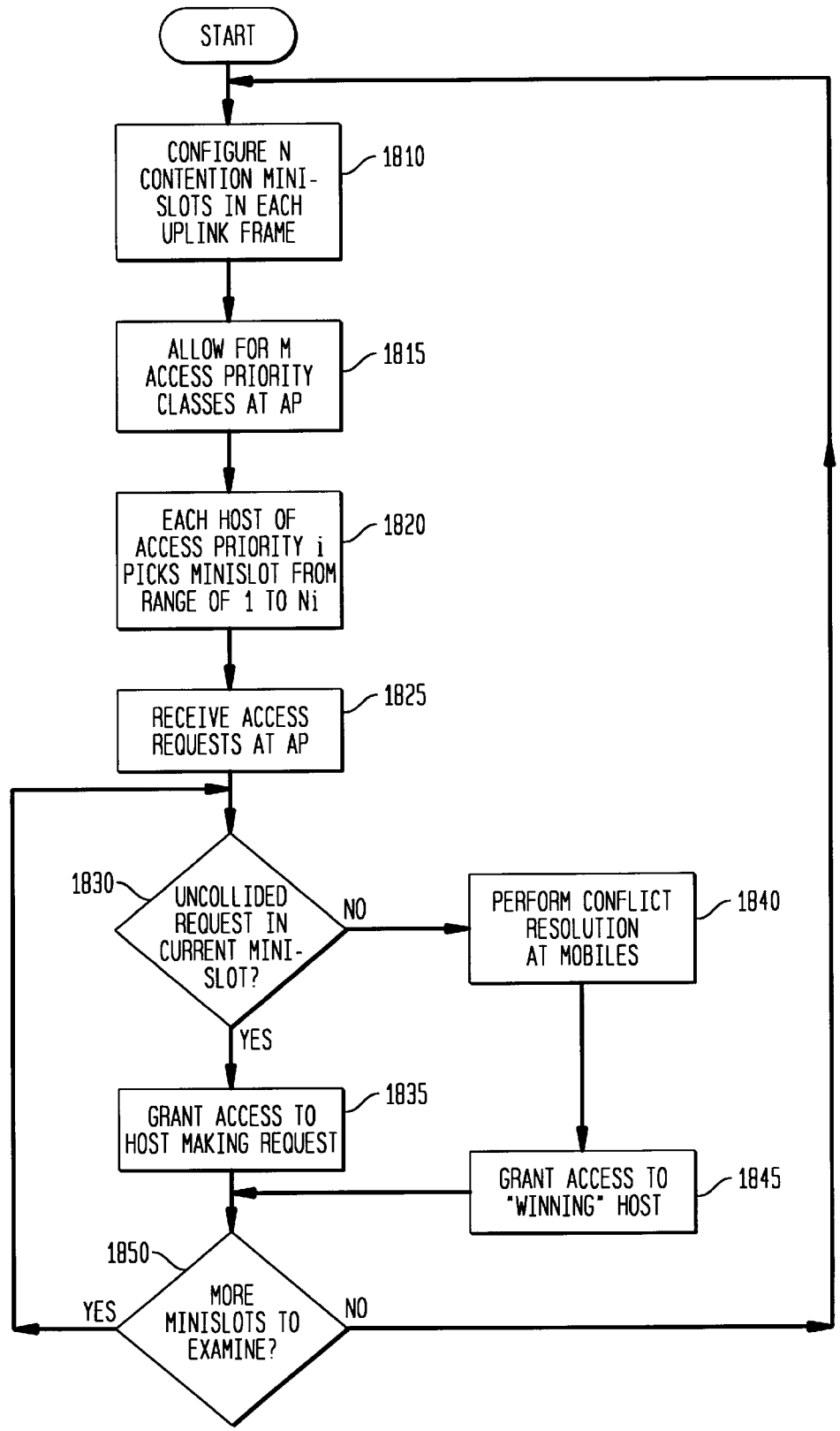
FIG. 18A is a flowchart illustrating an embodiment of a method for access control according to the present invention.

FIG. 18A illustrates is an embodiment of a method for access control according to an aspect of the present invention. N contention reservation minislots are configured in each uplink frame 1810. The N minislots are organized into a plurality of access priority classes, each class having a different priority. The AP is configured to allow m access priority classes 1815. Each remote host of access priority class i, randomly picks 1820 one contention minislot and transmits an access request, the contention minislot picked being in a range from 1 to $N_i$ where $N_{(i+1)} < N_i$ and $N_1 = N$. The base station receives 1825 the access requests and sequentially examines the received contention minislots. If the minislot currently being examined contains an uncollided request 1830, the AP grants access 1835 to the remote host corresponding to the uncollided access request. If the minislot currently being examined contains a collided request 1830, the AP will not send an ACK, causing the affected remote nodes to perform conflict resolution 1840. After the conflict resolution period, the AP grants access to the "winning" remote host 1845. Meanwhile, if more minislots remain to be examined 1850, the AP continues to check minislots for collisions 1830, either granting access to successful requesting hosts 1835 or awaiting the outcome of conflict resolution 1840.

FIG. 18B is a flowchart illustrating an alternate embodiment of a method for access control according to an aspect of the present invention organized into a plurality of access priority classes, each with a different priority. N contention reservation minislots are configured in each uplink frame 1810. The N minislots are organized into a plurality of access priority classes, each class having a different priority. The AP is configured to allow m access priority classes 1815. Each remote host of access priority class i and with a stack level that equals 0, then transmits an access request with a probability $P_i$ where $P_{(i+1)} < P_i$ and $P_1 = 1$ 1860. The base station receives 1825 the access requests and sequentially examines the received contention minislots. If the minislot currently being examined contains an uncollided request 1830, the AP grants access 1835 to the remote host corresponding to the uncollided access request. If the minislot currently being examined contains a collided request 1830, the AP will not send an ACK, causing the affected remote nodes to perform conflict resolution 1840. After the conflict resolution period, the AP grants access to the "winning" remote host 1845. If more minislots remain to be examined 1850, the AP continues to check minislots for collisions 1830, either granting access to successful requesting hosts 1835 or awaiting the outcome of conflict resolution 1840.

IDLE, SUCCESS and COLLISION status information is conveyed back to the wireless modems. The AP places the slot status information in the downlink reservation acknowledgment field. There are three alternative preferred conflict resolution methods that may be used. The first method is suggested in the IEEE 802.14 standard, and is described along with two new methods below. Simulation results show that the second method described provides a better access delay.

In the first conflict resolution method, suggested in IEEE standard 802.14, each wireless node that wishes to transmit randomly picks one of the reservation minislots. if a collision is indicated, a modem that was affected by the collision retransmits based on a random binary-exponential back-off method. This backoff method operates in accordance with the following:

1. The modem generates a random number, I, uniformly distributed between 0 and $2^j-1$, where j is the number of collisions that the modem experienced for the packet it is attempting to transmit. If j is larger than 10, then I is selected from a uniform distribution between 0 and $2^{10}-1$.
2. The modem skips the next I-1 contention slot opportunities of the same kind (either minislot or data contention slot), and then retransmits its previously collided packet in the next immediate contention slot opportunity.

Figure 14A:
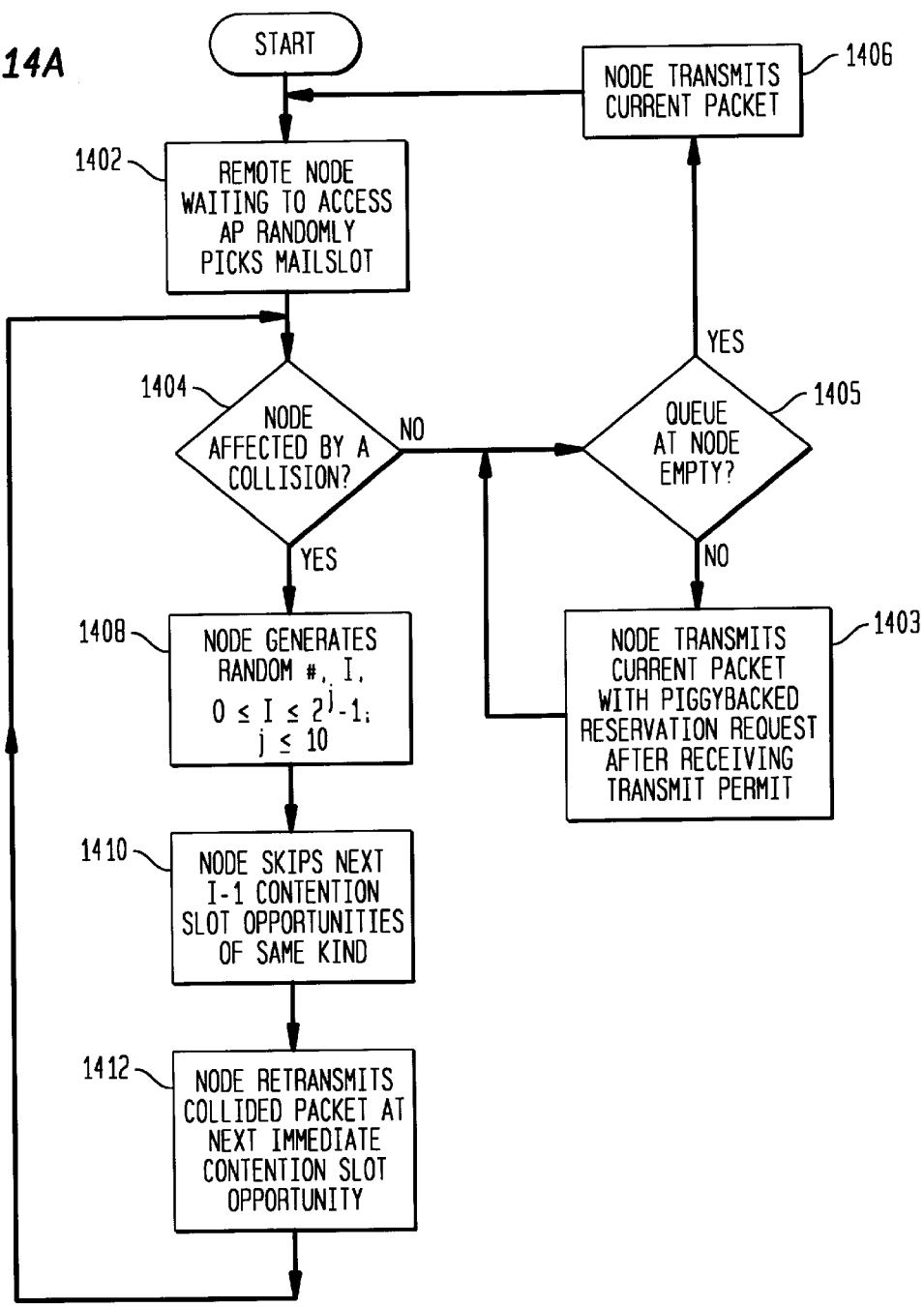
FIGS. 14A–14C are flowcharts illustrating three contention resolution methods according to embodiments of the present invention.

The operation of this method is depicted in FIG. 14A. A wireless node waiting to access the AP randomly picks 1402 a reservation minislot in which to transmit an access request. If the node is affected by a collision 1404, the node generates 1408 the random number I and skips 1410 the next I-1 contention slot opportunities of the same kind. The node than retransmits 1412 the access request for the collided packet at the next immediate contention slot opportunity. If the node is not affected by a collision 1404, then if the queue at the node is empty 1405, the node transmits 1406 the packet and returns to the waiting state 1402. If the queue at the node is not empty 1405, then, after receiving a transmit permit from the AP, the node transmits 1407 the current packet along with a piggybacked reservation request for transmission of the next packet in its queue, continuing to transmit packets with piggybacked reservation requests 1407 after receiving transmit permits until the queue is empty 1405 and the final packet has been transmitted 1406, after which the node returns to the waiting state 1402.

In the second and third methods, the AP broadcasts the outcome of each contention in the reservation minislots to all wireless nodes via a downlink broadcast message. In the second method, the modem in each wireless node is characterized by a stack level, and only wireless nodes with a stack level equal to zero are permitted to transmit access request packets. Modems with a stack level greater than zero are regarded as backlogged. For example, when there are M reservation minislots, each remote node at stack level 0 can randomly pick one of the M minislots. At the end of a timeslot, wireless node i changes stack level based on the outcome of a transmission in that time slot. This method allows newly active wireless nodes to join in with those existing wireless nodes having stack level 0 during a particular conflict resolution period. Each wireless node in a request state increments its stack level by one if it does not transmit an access request packet and receive a negative acknowledgment (e.g., that there was a collision) from the base station (AP). On the other hand, a wireless node decrements its stack level by one if it receives a positive acknowledgment from the base station, indicating successful transmission of an access request. Each wireless node that participates in the access request transmission randomly "flips a coin" to determine whether its stack level stays at level 0 or is incremented by one upon receiving a negative acknowledgment from the base station.

The rules of the second method are:
1. When a wireless node first wishes to gain access to the network or has gained access and wishes to send new data, it is placed in a request state and assigned a stack level of zero.
2. When there are M reservation minislots, each wireless node in a request state randomly picks one of the M reservation minislots to be its assigned minislot in which to transmit an access request packet.
3. When the wireless node is characterized by a stack level equal to zero, it transmits an access request packet; however, when the remote node is characterized by a stack level other than zero, it does not transmit an access request packet.
4. At the end of the time slot, each wireless node changes its stack level based on the outcome (either COLLIDED, IDLE or SUCCESS) of an access request, as reported for its assigned minislot in the reservation acknowledgment field of a downlink message from the access point.
   A. A wireless node that sent an access request and received a SUCCESS outcome will be removed from the request state.
   B. A wireless node that sent an access request and received a COLLIDED outcome will either increment its stack level by one or leave its stack level at zero depending upon the outcome of a random draw.
   C. A wireless node that is in the request state and did not send an access request (i.e., a node backlogged with stack level>0) will increment its stack level by one if the outcome reported in the reservation acknowledgment field for the assigned minislot is COLLIDED.
   D. A wireless node that is in the request state and that did not send an access request (i.e., a node backlogged with stack level>0) will decrement its stack level by one if the outcome reported in the reservation acknowledgment field for the assigned minislot is SUCCESS.

Figure 14B:
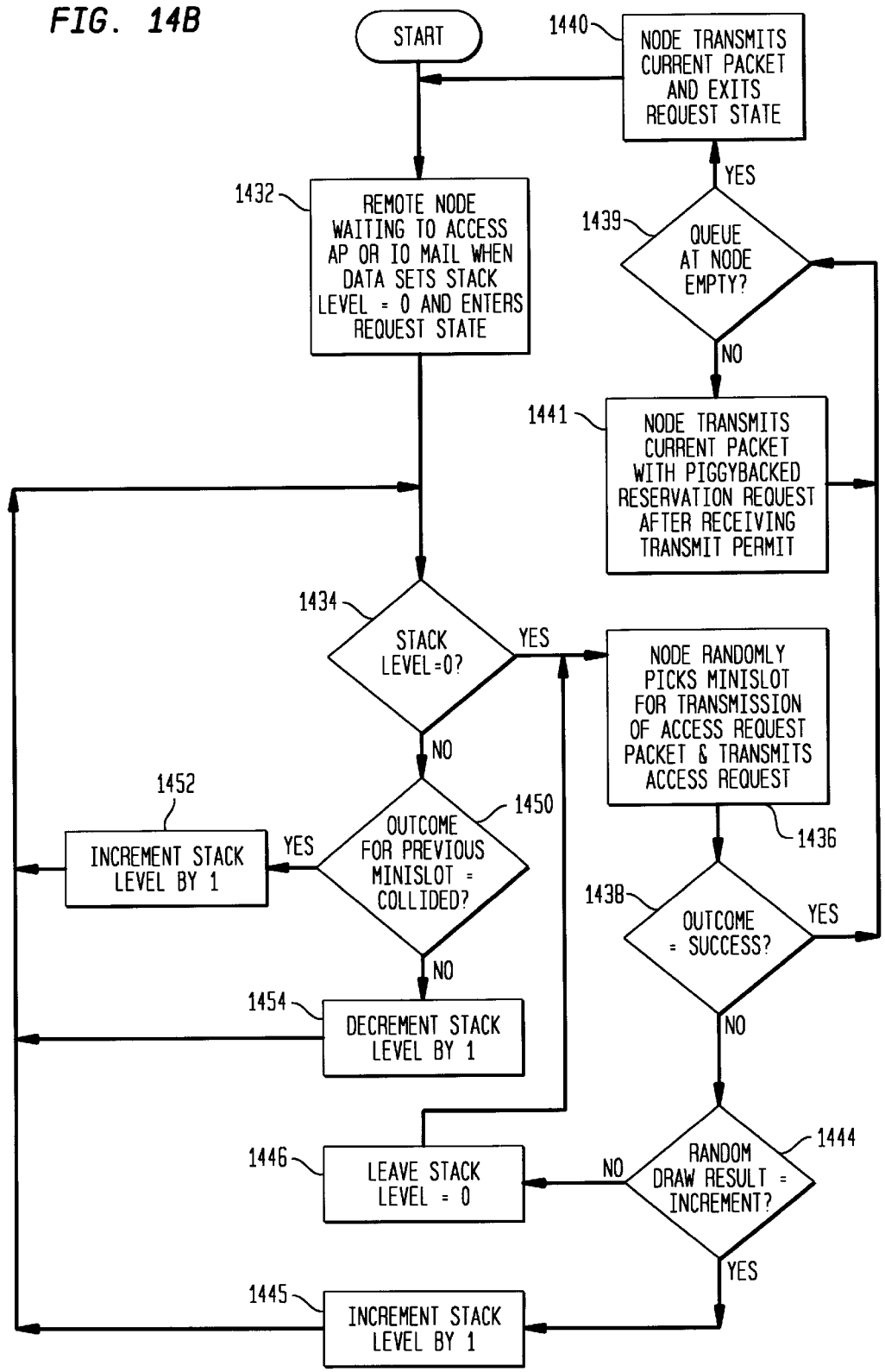

The operation of this method is depicted in FIG. 14B. A wireless node waiting to access the AP or send new data 1432 sets its stack level to 0 and enters the request state. If the stack level of the node is 0 1434, the node randomly picks 1436 a reservation minislot for transmission of an access request and transmits the access request. If the outcome of the request is SUCCESS 1438, and the queue at the node is empty 1439, the node transmits 1440 the current packet and exits the request state, returning to the waiting state 1432. If the queue at the node is not empty 1439, then, after receiving a transmit permit from the AP, the node transmits 1441 the current packet along with a piggybacked reservation request for transmission of the next packet in its queue, continuing to transmit packets with piggybacked reservation requests 1441 after receiving transmit permits until the queue is empty 1439, at which point it transmits the remaining packet 1440, exits the request state, and returns to the waiting state 1402.

If the outcome of the reservation request 1436 was not SUCCESS 1438, the node participates in a random draw 1444 to learn whether to increment 1448 its stack level by 1 or leave 1446 its stack level at 0. If the stack level remains 1446 at 0, the node again randomly picks 1436 a reservation minislot for transmission of an access request and transmits the access request. If the stack level is incremented 1448, the stack level will not be 0 1434. If the stack level of any remote node is not 0 1434 then if the outcome of the previous reservation request was COLLIDED 1450, the node increments 1452 its stack level by 1. If the outcome for the previous reservation request was not COLLIDED 1450, the node decrements 1454 its stack level by 1.

The third conflict resolution method is a modification of the second. In the third conflict resolution method, the modem in each wireless node is again characterized by a stack level, and only wireless nodes with a stack level equal to zero are permitted to transmit access request packets. Modems with stack level greater than zero are regarded as backlogged. The rules of the third method are:

1. When a wireless node first wishes to gain access to the network or has gained access and wishes to send new data, it is placed in a request state and assigned a stack level of zero.
2. When there are M reservation minislots, each wireless node in a request state randomly picks one of the M reservation minislots to be its assigned minislot in which to transmit an access request packet.
3. When the wireless node is characterized by a stack level equal to zero, it transmits an access request packet; however, when the remote node is characterized by a stack level other than zero, it does not transmit an access request packet.
4. At the end of the time slot, each wireless node changes its stack level based on the outcome (either COLLIDED, IDLE or SUCCESS) of all access requests as reported in the reservation acknowledgment fields of a downlink message from the Access Point.
   A. A wireless node that sent an access request and received a SUCCESS outcome will be removed from the request state.
   B. A wireless node that sent an access request and received a COLLIDED outcome will either increment its stack level by one or leave its stack level at zero depending on the outcome of a random draw.
   C. A wireless node that is in the request state and that did not send an access request (i.e., a node backlogged with stack level>0) will decrement its stack level by one if the outcomes of all access requests reported in at least 80% (or some other predefined threshold) of the reservation acknowledgment fields is either SUCCESS or IDLE. Otherwise, the remote node will increment its stack level by one.
   D. When the backlogged modem's stack level is decremented to zero, the modem randomly picks one of the M minislots (or the $I_i$ minislots if access priority is implemented) to resend its request.

Figure 14C:
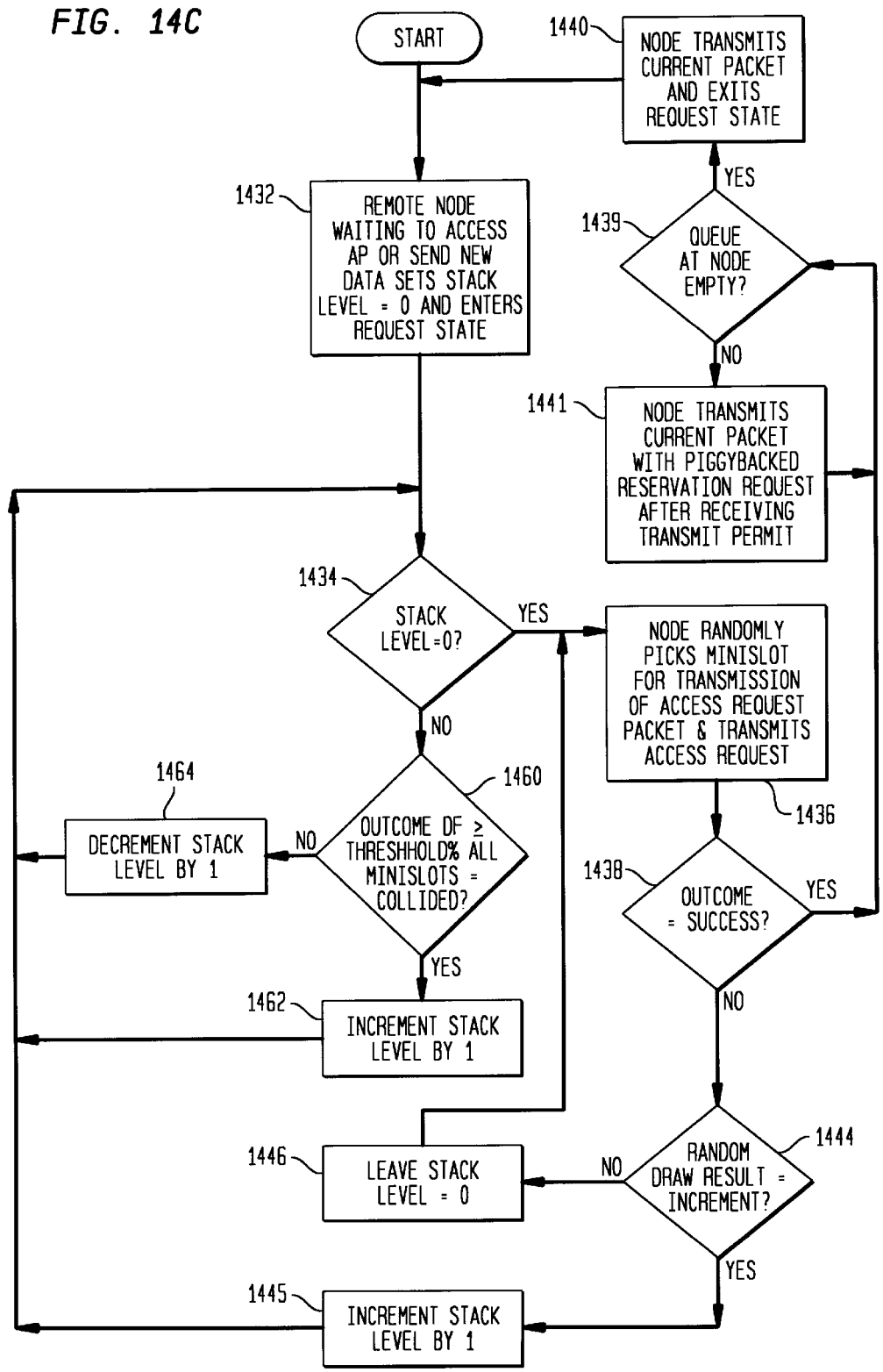

The operation of this method is depicted in FIG. 14C and is similar to that of the method of FIG. 14B. A wireless node waiting to access the AP or send new data 1432 sets its stack level to 0 and enters the request state. If the stack level of the node is 0 1434, the node randomly picks 1436 a reservation minislot for transmission of an access request and transmits the access request. If the outcome of the request is SUCCESS 1438, and the queue at the node is empty 1439, the node transmits 1440 the current packet and exits the request state, returning to the waiting state 1432. If the queue at the node is not empty 1439, then, after receiving a transmit permit from the AP, the node transmits 1441 the current packet along with a piggybacked reservation request for transmission of the next packet in its queue, continuing to transmit packets with piggybacked reservation requests 1441 after receiving transmit permits until the queue is empty 1439 and it has transmitted the remaining packet 1440, after which it exits the request state, and returns to the waiting state 1402.

If the outcome of the reservation request 1436 was not SUCCESS 1438, the node participates in a random draw 1444 to learn whether to increment 1484 its stack level by 1 or leave 1446 its stack level at 0. If the stack level remains 1446 at 0, the node again randomly picks 1436 a reservation minislot for transmission of an access request and transmits the access request. If the stack level is incremented 1848, the stack level will not be 0 1434. If the stack level of any remote node is not 0 1434, then if the outcome of all the reservation requests during the previous cycle was COLLIDED 1460 for greater than or equal to some THRESHOLD percentage, the node increments 1462 its stack level by 1. If the outcome for the previous reservation request was not COLLIDED 1460, the node decrements 1464 its stack level by 1.

Note that, due to the hidden terminal problem, all the frames transmitted need to be acknowledged. Acknowledgment messages should not be sent in contention mode. Transmit schedules and transmit permits are therefore used as a mechanism to acknowledge downlink MAC unicast frames. When a wireless modem receives a downlink broadcast frame, it first interprets the transmit schedules and transmit permits. If it is not that wireless modem's turn to transmit data, and the wireless modem is the recipient of a unicast frame (i.e., the wireless modem's ID is found in the transmit schedules), then the wireless modem schedules an acknowledgment message for the unicast frame in the immediately following uplink frame. All acknowledgment messages are sent first, before any of the data messages allowed by the transmit permits. For those wireless modems that receive both transmit permits and unicast messages in the downlink frame, a different transmit permit is issued to allow these modems to piggyback their acknowledgments onto the back of their uplink data transmissions. In order to acknowledge uplink unicast frames, the AP either schedules a unicast acknowledgment message or piggybacks the acknowledgment message onto the downlink data transmission.

As previously mentioned, the number of reservation minislots available may be dynamically changed. If, for example, there are k minislots in a contention reservation slot and N total slots, N1 of which are reservation slots containing a total of N1*k minislots, then the remaining (N–N1) slots are data slots. If NUM_RA_MIN and NUM_RA_MAX are the minimum and maximum number, respectively, of reservation minislots desired for the system, the number of available reservation minislots can be dynamically changed based on the percentage of idle minislots and the total uplink queue length.

Four methods have been developed for dynamic adjustment of the total number of reservation minislots available to the remote nodes for making access requests. In each of these methods, the total uplink queue length at any time is 'q', the percentage of minislots that are idle at any time is 'idle', the number of minislots in a frame at any time is 'no_mini', and the number of noncontention data slots in a frame at any time is 'no_slots'. The base station (AP) is the arbiter of how quickly the number of available minislots is changed. At every iteration of the decision process, the base station broadcasts the number of available reservation minislots to the remote nodes. The base station's decision is based on the results of one of these methods. For each method, the assumption is made that the remote nodes have piggybacked uplink queue length information to the base station during their uplink data transmissions.

A software implementation of method 1 for the dynamic adjustment of the number of reservation minislots is given below and is also illustrated pictorially in the flowchart of FIG. 12A.

```
If((q > HIGH_THRESH) && (idle > IDLE_THRESH1)) {
        If(State!=1) {
            no_mini=no_mini-k;
            no_slots=no_slots+1;
            State=1
        }
    }
    If((q < LOW_THRESHOLD) && (idle < IDLE_THRESH2)){
        If(State==1) {
            no_mini=no_mini+k;
            no_slots=no_slots-1;
            State=0
        }
    }
```

Figure 12A:
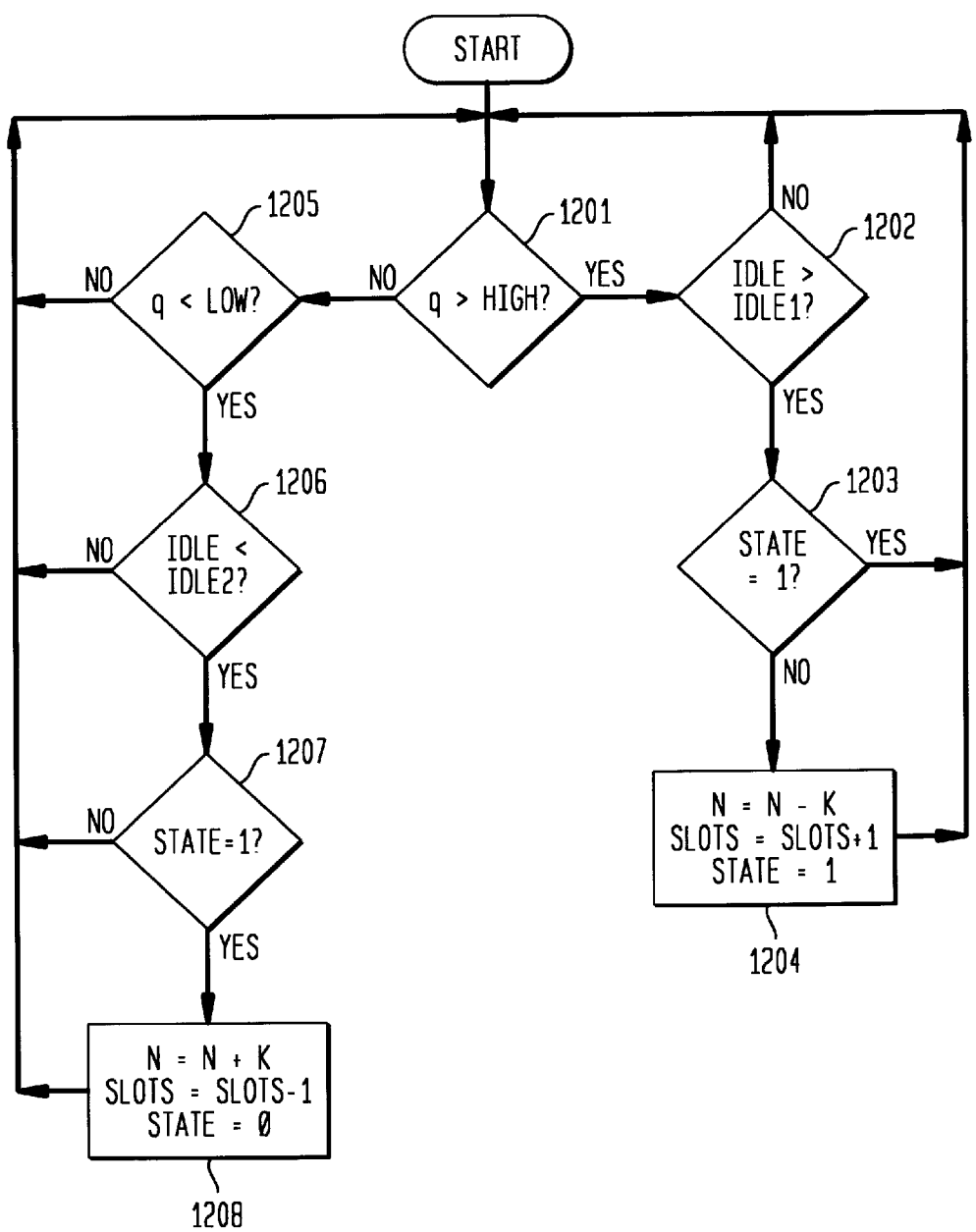

As shown in FIG. 12A, if the total uplink queue length is greater than a high threshold (HIGH) 1201, then if the percentage of idle minislots (IDLE) is not greater than a first idle threshold (IDLE1) 1202, the number of minislots (N) is left unchanged. If, however, the percentage of idle minislots is greater than the first idle threshold 1202, and the state is not "1" 1203 (meaning that the number of minislots was not just decreased), the number of minislots in the frame is decreased 1204 by some k, the number of dataslots (SLOTS) in the frame is increased by 1, and the state is set to "1". If the total uplink queue length is not greater than the high threshold 1201, then if the total uplink queue length is less than a low threshold (LOW) 1205, and the percentage of idle minislots is not less than a second idle threshold (IDLE2) 1206, the number of minislots is left unchanged. If, however, the percentage of idle minislots is less than the second idle threshold 1206, and the state is "1" 1207 (meaning that the number of minislots was just decreased), the number of minislots in the frame is increased 1204 by k, the number of dataslots in the frame is decreased by 1, and the state is set to "0". In all four methods, the threshold values and the value of k may be prespecified if desired.

A software implementation of method 2 for the dynamic adjustment of the number of reservation minislots is given below and is also illustrated pictorially in the flowchart of FIG. 12B. In the methods of FIGS. 12B and 12D, HIGH2>HIGH1 and LOW2>LOW1.

```
If((q > HIGH2) && (idle > IDLE_THRSH1)) {
        If(State==0) {
            no_mini=no_mini-2k;
            no_slots=no_slots+2;
            State=2
        }
        else if(State==1) {
            no_mini=no_mini-k;
            no_slots=no_slots+1;
            State=2
        }
    }
    else if((q > HIGH1) && (idle > IDLE_THRSH1)) {
        If(State==0) {
            no_mini=no_mini-k;
            no_slots=no_slots+1;
            State=1
        }
    }
If((q < LOW1) && (idle < IDLE_THRESH2)) {
        If(State>0) {
            If(State=1) {
                no_mini=no_mini+k;
                no_slots=no_slots+1;
                State=0;
            }
            else {
                no_mini=no_mini+2k;
                no_slots=no_slots-2;
                State=0;
            }
        }
    }
    else if((q < LOW2) && (idle < IDLE_THRESH2)) {
        If(State==2) {
            no_mini=no mini+k;
            no_slots=no_slots-1;
            State=1
        }
    }
```

As shown in FIG. 12B, if the total uplink queue length is greater than a first high threshold HIGH2)1210, then if the percentage of idle minislots is not greater than a first idle threshold 1211, the number of minislots is left unchanged. If, however, the percentage of idle minislots is greater than the first idle threshold 1211, and the state is "0" 1212 (meaning that the number of minislots was just increased), the number of minislots in the frame is decreased 1213 by 2k, the number of dataslots in the frame is increased by 2, and the state is set to "2". If the state is "1" 1214, the number of minislots in the frame is decreased 1215 by k, the number of dataslots in the frame is increased by 1, and the state is set to "2".

In the method of FIG. 12B, if the total uplink queue length is not greater than the first high threshold 1210, then if the the total uplink queue length is greater than a second high threshold (HIGH) 1220, and the percentage of idle minislots is not greater than the first idle threshold 1217, the number of minislots is left unchanged. If, however, the percentage of idle minislots is greater than the first idle threshold 1217, and the state is "0" 1218, the number of minislots in the frame is decreased 1219 by k, the number of dataslots in the frame is increased by 1, and the state is set to "1".

If the total uplink queue length is not greater than the first high threshold 1210 and the second high threshold 1220, but is also not lower than both a first (LOW1) 1221 and second (LOW2) 1222 low threshold, the number of minislots is left unchanged. If, however, the total uplink queue length is not greater than the second high threshold 1220, is not lower than the first low threshold 1221, but is lower than the second 1222 low threshold, then if the percentage of idle minislots is less than a second idle threshold 1223, and the state is "2" 1224 (meaning that the number of minislots was just decreased), the number of minislots in the frame is increased 1225 by k, the number of dataslots in the frame is decreased by 1, and the state is set to "1".

If the total uplink queue length is not greater than the second high threshold 1220 and is lower than the first low threshold 1221, then if the percentage of idle minislots is less than the second idle threshold 1226, and the state is not "0" 1224, then if the state is "1 " 1228, the number of minislots in the frame is increased 1230 by k, the number of dataslots in the frame is decreased by 1, and the state is set to "0", while if the state is "2", the number of minislots in the frame is increased 1229 by 2k, the number of dataslots in the frame is decreased by 2, and the state is set to "0".

A software implementation of method 3 for the dynamic adjustment of the number of reservation minislots is given below and is also illustrated pictorially in the flowchart of FIG. 12C.

```
If((q > HIGH_THRESH) && (idle > IDLE_THRESH1)) {
        If(no_mini > NUM_MINI_MIN) {
            no_mini=no_mini-k,
            no_slots=no_slots+1;
        }
    }
If((q < LOW_THRESHOLD) && (idle < IDLE_THRESH2)) {
        If(no_mini < NUM_MINI_MAX) {
            no_mini=no_mini+k,
            no_slots=no_slots-1,
        }
    }
```

Figure 12C:
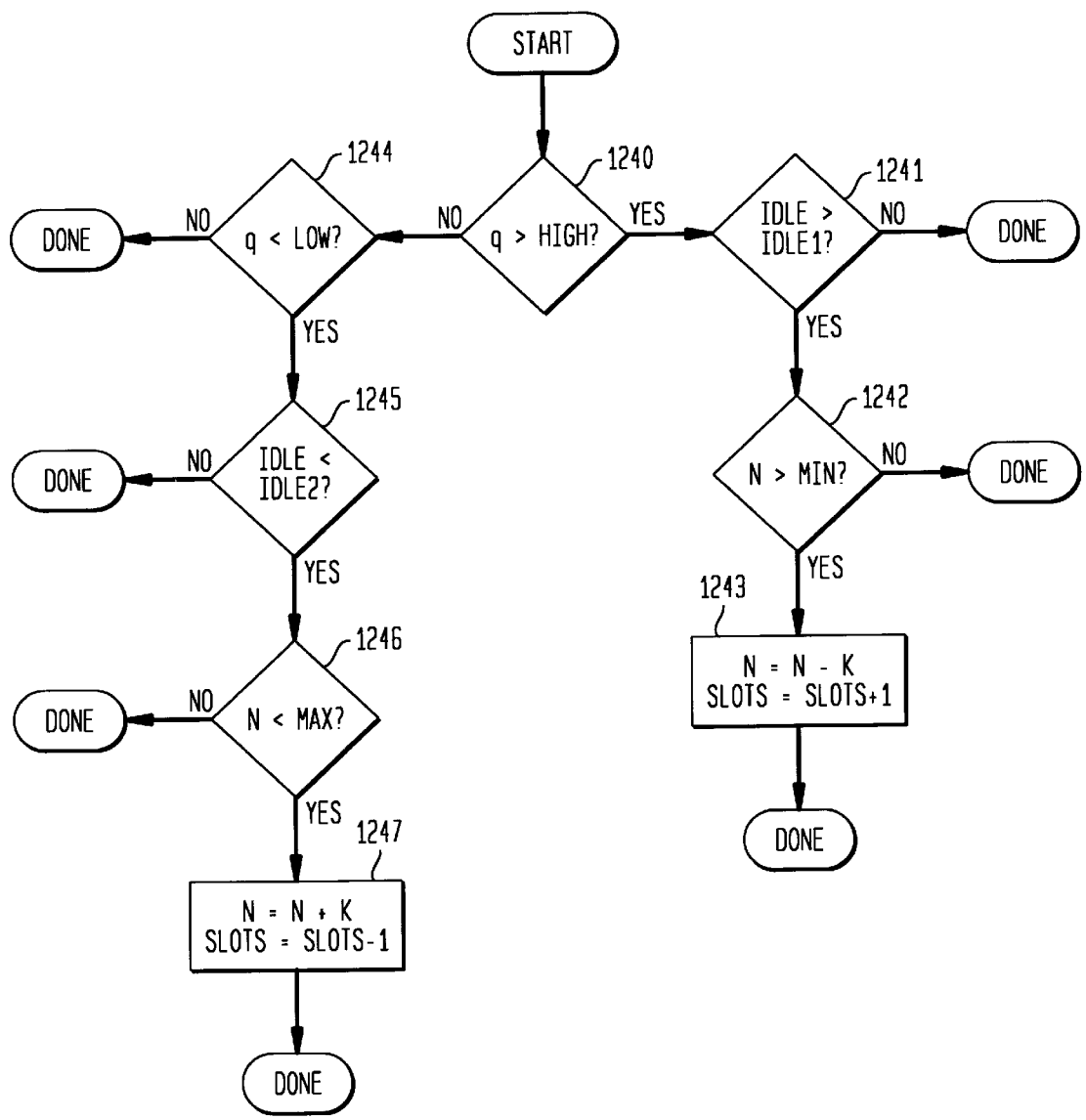
Figure 12D:
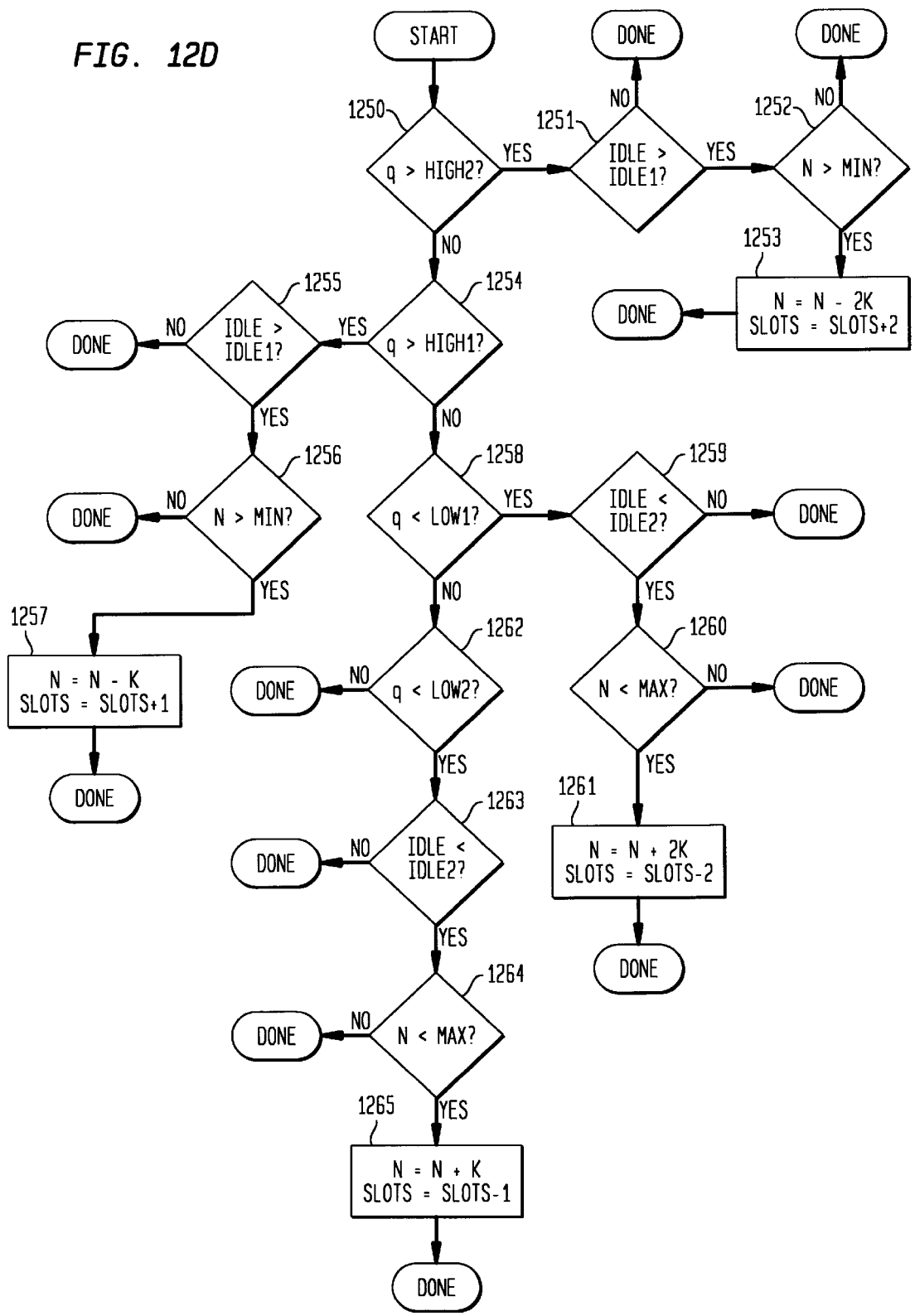

As shown in FIG. 12C, if the total uplink queue length is greater than a high threshold 1240, then if the percentage of idle minislots is not greater than a first idle threshold 1241, the number of minislots is left unchanged. If, however, the percentage of idle minislots is greater than the first idle threshold 1241, then if the number of minislots is greater than the minimum number of minislots allowed (MIN) 1242, the number of minislots in the frame is decreased 1243 by k and the number of dataslots in the frame is increased by 1. If the total uplink queue length is not greater than a high threshold 1240, then if the the total uplink queue length is less than a low threshold 1244, and the percentage of idle minislots is not less than a second idle threshold 1245, the number of minislots is left unchanged. If, however, the percentage of idle minislots is less than the second idle threshold 1245, and the number of minislots is less than the maximum number of minislots allowed (MAX) 1246, the number of minislots in the frame is increased 1247 by k and the number of dataslots in the frame is decreased by 1.

A software implementation of method 4 for the dynamic adjustment of the number of reservation minislots is given below and is also illustrated pictorially in the flowchart of FIG. 12D.

```
If((q > HIGH2) && (idle > IDLE_THRESH1)) {
        If(no_mini > NUM_MINI_MIN) {
            no_mini=no_mini-2k,
            no_slots=no_slots+2;
        }
    }
    else if((q > HIGH1) && (idle > IDLE_THRESH1)) {
        If(no_mini > NUM_MINI_MIN) {
            no_mini=no_mini-k,
            no_slots=no_slots+1,
        }
    }
If((q < LOW1) && (idle < IDLE_THRESH2)) {
        If(no_mini < NUM_MINI_MAX) {
            no_mini=no_mini+2k;
            no_slots=no_slots-2;
        }
    }
    else if((q < LOW2) && (idle < IDLE_THRESH2)){
        If(no_mini < NUM_MINI_MAX) {
            no_mini=no_mini+k;
            no_slots=no_slots-1;
        }
    }
```

As shown in FIG. 12D, if the total uplink queue length is greater than a first high threshold 1250, then if the percentage of idle minislots is not greater than a first idle threshold 1251, the number of minislots is left unchanged. If, however, the percentage of idle minislots is greater than the first idle threshold 1251, and the number of minislots is greater than a minimum number of minislots allowed 1252, the number of minislots in the frame is decreased 1253 by 2k and the number of dataslots in the frame is increased by 2. If the total uplink queue length is not greater than the first high threshold 1250, then if the the total uplink queue length is greater than a second high threshold 1254, and the percentage of idle minislots is not greater than the first idle threshold 1255, the number of minislots is left unchanged. If, however, the percentage of idle minislots is greater than the first idle threshold 1255, and the number of minislots is greater than the minimum number of minislots allowed 1256, the number of minislots in the frame is decreased 1257 by k and the number of dataslots in the frame is increased by 1.

In the method of FIG. 12D, if the total uplink queue length is not greater than the first high threshold 1250 and the second high threshold 1254, but is also not lower than both a first 1258 and second 1262 low threshold, the number of minislots is left unchanged. If, however, the total uplink queue length is not greater than the second high threshold 1254, is not lower than the first low threshold 1258, but is lower than the second 1262 low threshold, then if the percentage of idle minislots is less than a second idle threshold 1263, and the number of minislots is less than the maximum number allowed 1264, the number of minislots in the frame is increased 1265 by k and the number of dataslots in the frame is decreased by 1.

If the total uplink queue length is not greater than the second high threshold 1254 and is lower than the first low threshold 1258, then if the percentage of idle minislots is less than the second idle threshold 1259, and the number of minislots is less than the maximum number allowed 1260, the number of minislots in the frame is increased 1261 by 2k and the number of dataslots in the frame is decreased by 2.

The role of the AP in responding to uplink bandwidth requests from modems, whether they arrive in pure reservation minislots or in piggybacked form, is to control uplink transmission in order to achieve a balance between high bandwidth efficiency and excellent quality of service (QoS) management. While QoS requirements for constant bit rate CBR traffic are extremely important and stringent, they are relatively liberal for traditional data traffic. One goal of the bandwidth allocation scheme in the AP is therefore to take advantage of these diverse QoS requirements in order to achieve a high degree of statistical multiplexing. In order to determine how the AP should transmit downlink traffic from various connections, the AP requires a downlink scheduling system. Similarly, in order to coordinate the uplink transmissions from associated wireless modems, the AP requires a system for scheduling the uplink transmission opportunity of each wireless modem. The scheduling systems can be as simple as round-robin, strict priority, or a first come-first serve algorithm, or may alternatively be more complex, such as a fair queuing algorithm. As discussed previously, a number of schedulers which are all variations on fair queuing have been proposed.

The uplink scheduling system is not required to be the same as the downlink scheduling system, however, for a simple embodiment, one may elect that they be the same. Obviously, a scheduling system is desired that provides Quality of Service to end users. As in ATM networks, different service classes can be defined to cater to the diverse QoS needs of different applications. The possible service classes include: constant bit rate (CBR), real-time and non-real-time variable bit rate (RT VBR, NRT VBR), unspecified bit rate (UBR), and available bit rate (ABR). In order to meet the QoS requirements of different service classes, there needs to be a method for allocation of bandwidth and buffer resources that does not require statically prioritizing one over the other.

In order for the AP to perform downlink and uplink scheduling in the case where the wireless modems are geographically distributed, a mechanism is needed for the wireless modems to pass relevant information to the base station, which is the only location that has a complete view of all transmission queues (i.e., transmission queues for both wired and wireless hosts). There are at least two alternative ways to compute the service tags for all hosts associated with the access point. In these methods, the wired hosts, with which the associated wireless modems are communicating, are assumed to be permanently associated with the access point. In one method, the base station can broadcast the system virtual time and the assigned shares of service classes to each of the wireless modems. Then, each wireless modem computes its own service tag and informs the base station of it via a request access packet or by piggybacking on the data transmission. Alternatively, the wireless modem can simply inform the base station of its queue size (again via a request access packet or by piggybacking on data transmission), and the base station can compute the service tag for each wireless modem as well as for the wired hosts. The second method is more efficient in terms of downlink bandwidth utilization, since the base station does not have to transmit the assigned service shares (which may be dynamically varying) to each wireless modem.

Figure 15A:
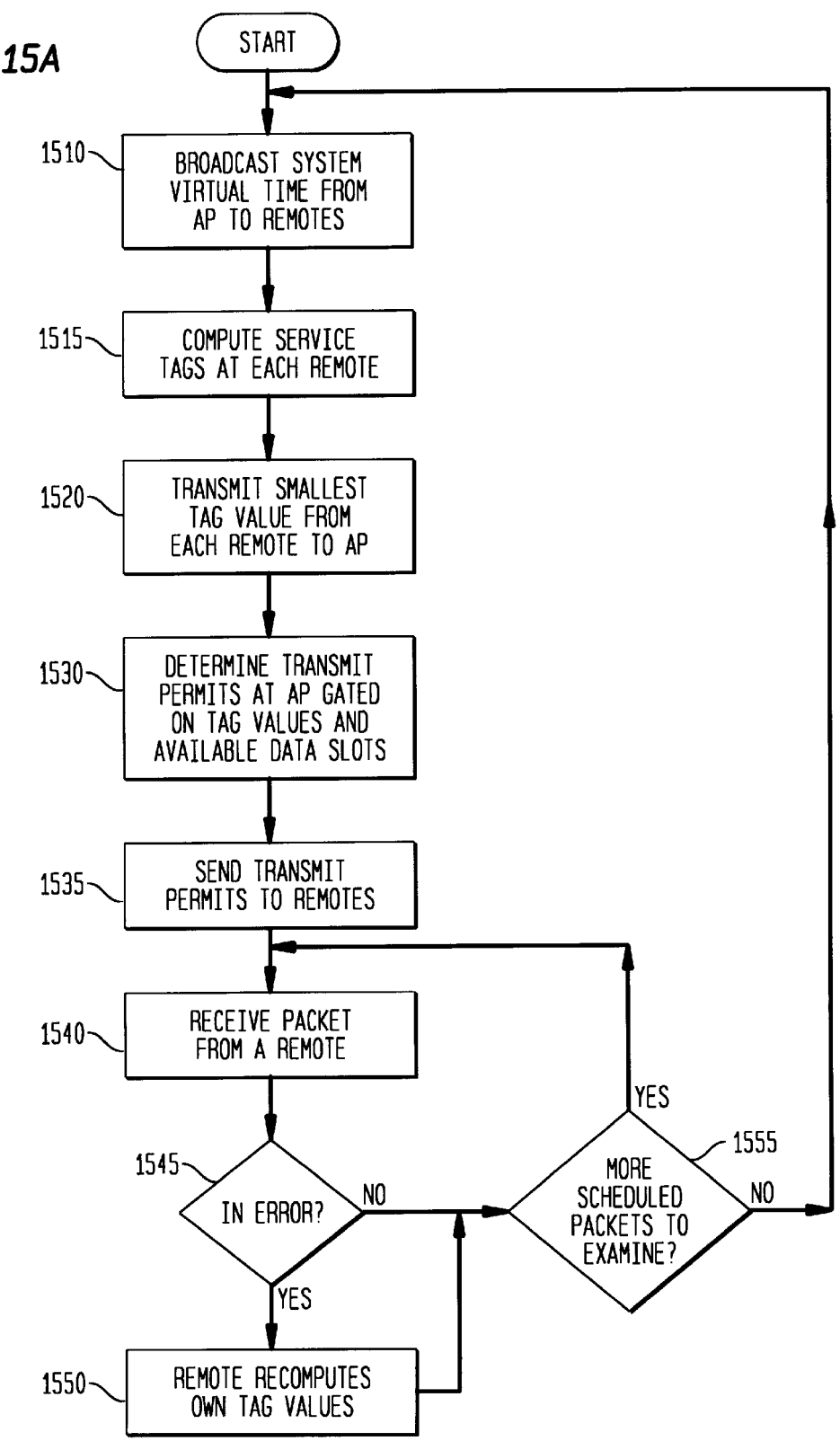
FIG. 15A is a flowchart illustrating an embodiment of the method for sharing bandwidth of the present invention.

An embodiment of the first method is illustrated in FIG. 15A. The base station broadcasts a system virtual time 1510 to the remote hosts. Each remote host computes a service tag value 1515 for each of its newly arrived packets, then transmits 1520 the smallest tag value to the base station. Transmit permits are then assigned 1530 at the base station based on the service tag values received from the remote hosts and the available data slots. The transmit permits are broadcast to the remote hosts 1540, and then packets are received from the remotes 1540 in the order specified by the transmit permits. If a packet is lost or is received having errors 1545, the sending remote is made aware of this problem either through notification by the AP or through failure to receive an ACK from the AP in response. The sending remote then recomputes the service tag values of all its queued packets 1550, including the packet whose transmission failed. This procedure continues until all the scheduled packets have been examined 1555, after which the system again broadcasts the current virtual time 1510.

Figure 15B:
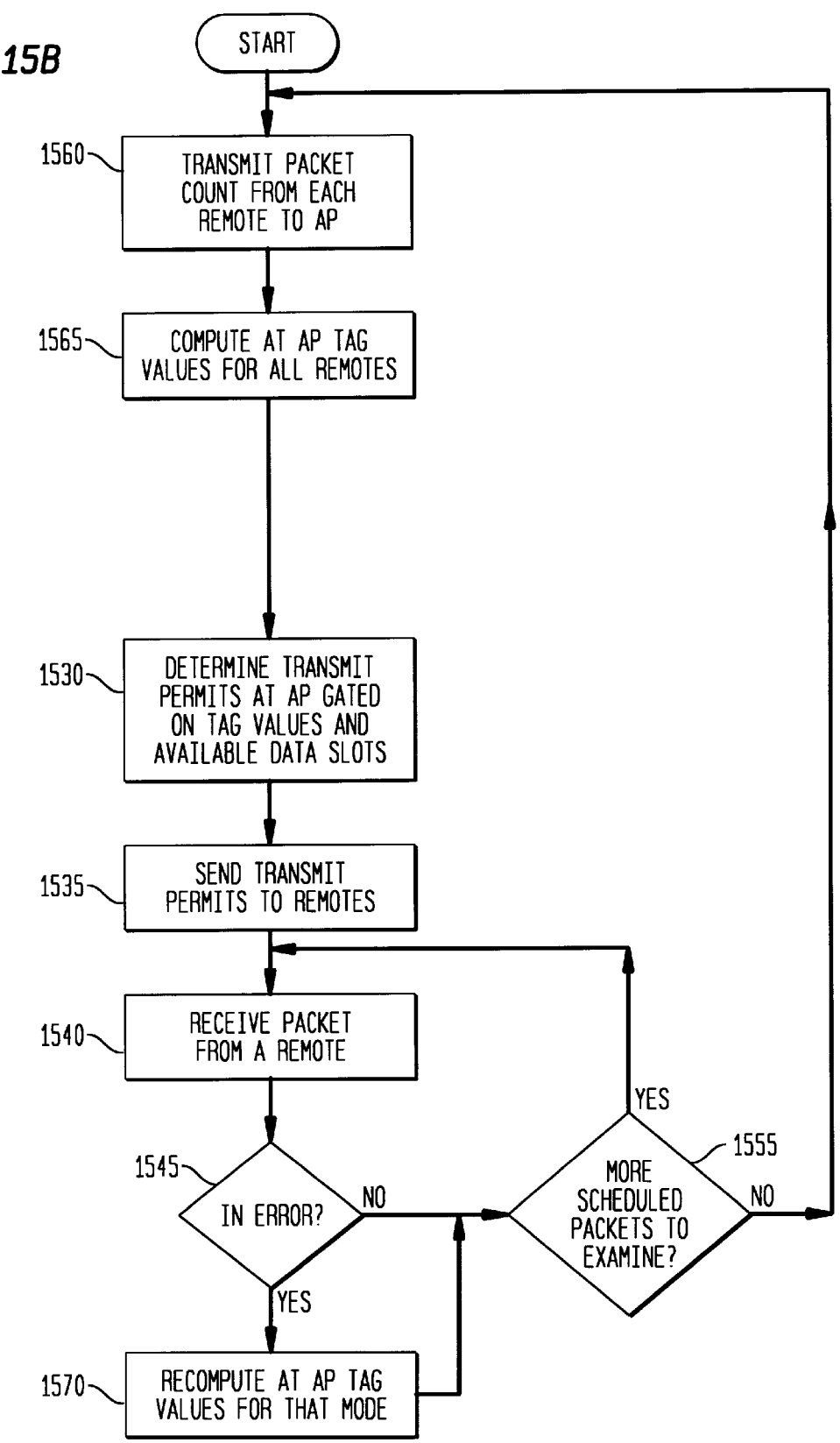
FIG. 15B is a flowchart illustrating an alternate embodiment of the method for sharing bandwidth of the present invention.

An embodiment of the second method is illustrated in FIG. 15B. A packet count is transmitted 1560 from each remote host to the base station, each packet count representing either the number of fixed-sized packets or the length of a variable-length packet to be transmitted from the remote host to the base station. The base station computes 1565 the service tag values for each remote host; assigns transmit permits 1530 based on the service tags of the remote hosts and the available data slots, and broadcasts the transmit permits to the remotes 1535. Packets are received from the remotes 1540 in the order specified by the transmit permits. If a packet is lost or received having errors 1545, the AP recomputes the service tag values for that remote host 1570. This procedure continues until all the scheduled packets have been examined 1555, after which the remote hosts again transmit their packet counts 1560 to the base station.

In the methods of FIGS. 15 A and B, should transmitted packets be lost, the base station (access point) or wireless modem recomputes new service tag values for all queued packets based on the current system virtual time. In an alternative embodiment, the AP or wireless node maintains a packet queue and a head-of-line tag. In this scheme, if a packet is lost, only the head-of-line tag needs to be changed. Once the head-of-line packet has been transmitted successfully, the rest of the queued packets will automatically receive the correct tag (the recomputed head-of-line tag plus appropriate increments). This alternative embodiment has the advantage of using less cpu. Retransmitting in a polling system is discussed generally in R. Kautz "A Distributed Self-Clocked Fair Queuing Architecture For Wireless ATM Networks", 1997 International Symposium on Personal Indoor and Mobile Radio Communications. Kautz does not, however, discuss the technique of the present invention for recomputing tag values when packets are lost.

A method for recomputing service tags after loss of a packet is clearly of great importance in a wireless system, where such losses are commonplace. For the half-duplex case, both the uplink and downlink queues at the access points are managed as if they are sharing the same bandwidth, i.e., as if there is only one system virtual time. For the full-duplex case, separate system virtual times for the uplink and the downlink traffic may be used. It might also be desirable to have remote hosts divided into one or more separate groups for purposes of downlink transmission, with each group having a different priority and receiving a different system virtual time. Once a modem receives an acknowledgment to its initial access request, it waits until it receives a transmit permit from the AP. Each time the modem transmits a packet, it also indicates whether it has more packets in its buffer. This piggybacking then serves as a contention-free bandwidth reservation request for the modem.

Figure 16:
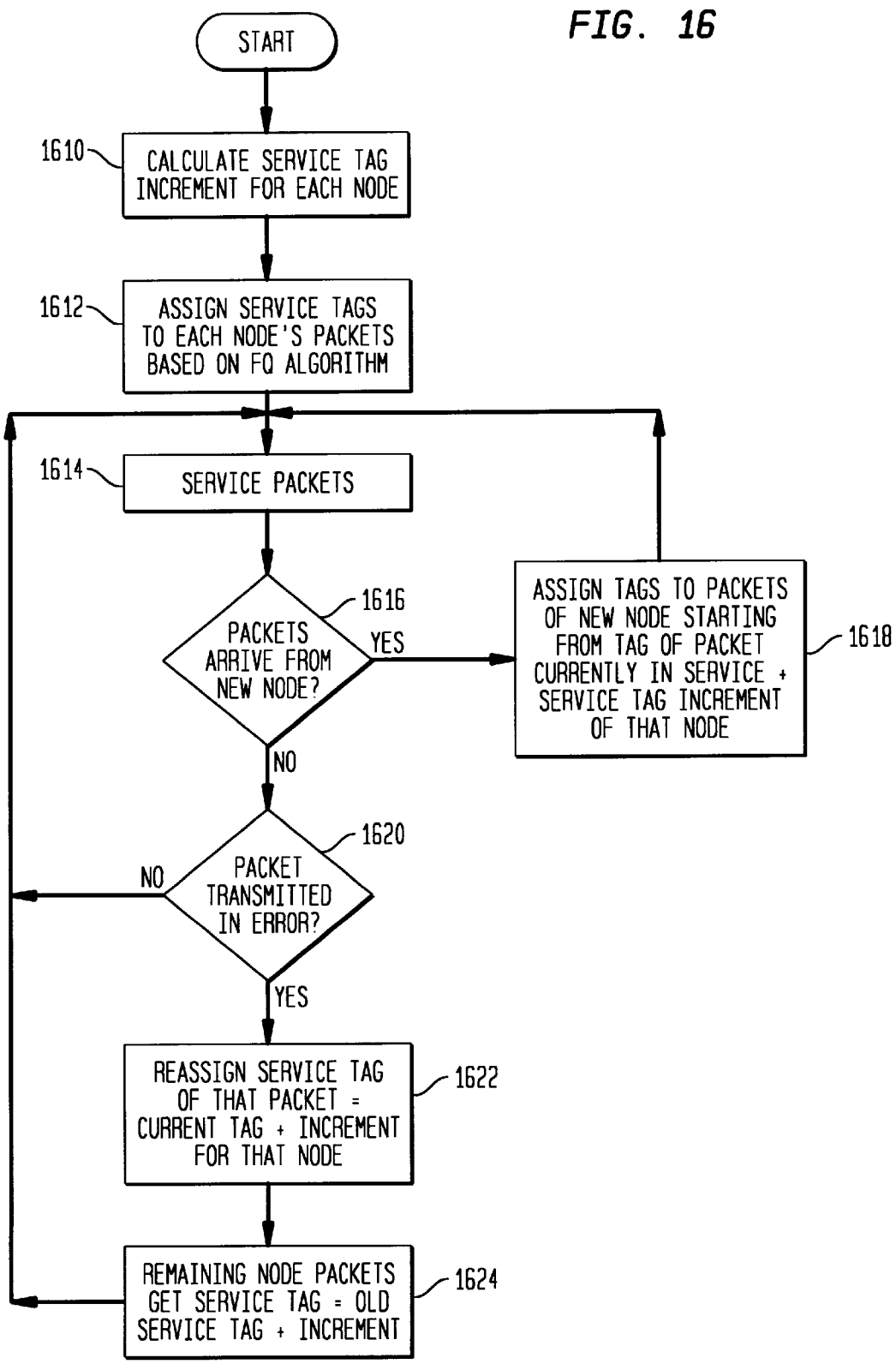
FIG. 16 is a flowchart illustrating assignment of packet service tags according to one embodiment of the present invention.

Calculation of service tags is illustrated in FIG. 16. First the AP calculates the service tag increment 1610 for each remote node based on each nodes assigned service share. Each nodes packets are then assigned service tags 1612 according to the applicable fair queuing algorithm. Packets are then serviced 1614 according to the order of the assigned service tags. If packets arrive from a node that previously had an empty queue 1516, the packets of the newly transmitting node are assigned service tags 1618 starting from the tag of the packet currently in service plus the service tag increment of that node. If an error occurs in the transmission of a packet 1620, the service tag of that packet is reassigned 1622 to be the current tag plus the service tag increment for that node. The remaining packets for that node will then receive new service tags 1622 that will be the previous service tag plus the node's service tag increment. This can be performed either through direct recomputation of all the service tags for that node, or through the recomputation of the head-of-line tag, if present. In the head-of-line tag case, once the head-of-line packet is transmitted successfully, the rest of the queued packets for that node will then automatically receive the correct tag. Note that the service tags of all the other nodes will remain unaffected by the retransmission of a packet for this node, meaning that the QoS experienced by the other nodes will not suffer.

In the preferred embodiment of an aspect of the invention, the order in which the access point sends transmit permits to all associated wireless modems is based on the self-clocked fair queuing algorithm described above. The order in which the access point serves the various downlink connections is also based on the self-clocked fair queuing algorithm. For example, a system may have a capacity of 16 units and 3 sessions with session-ids 1, 2, 3, and session shares $r_1=1$, $r_2=2$, and $r_3=3$, respectively. If, for computation simplicity, the length of the packets of any session is always L=8, each packet will take 0.5 time units to be transmitted. The service tag increment:

$$\frac{L}{r_i}$$

is then 8, 4, and 2 for sessions 1, 2, and 3, respectively. If, at time t, session 1 has 4 packets, session 2 has 8 packets, and session 3 does not become backlogged until t=3, then, according to equation (1), the packets of session 1 receive the service tags 8, 16, 24, and 32. Similarly, the packets of session 2 receive the service tags 4, 8, 12, 16, 20, 24, 28, and 32.

Figure 9A:
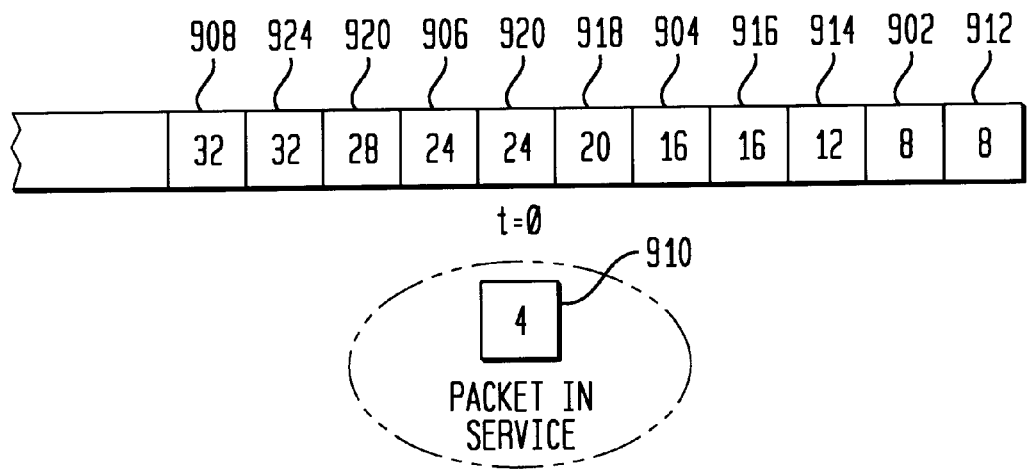
FIG. 9A depicts a time line showing the tags of packets at time t=0 in an example embodiment of the present invention.

FIG. 9A shows the service tags of the packets of this example at time t=0. The packets of session 1 with service tag 8 902, service tag 16 904, service tag 24 906, and service tag 32 908 are interleaved with packets 912, 914, 916, 918, 920, 922, and 924 from session 2. Packet 910 from session 2, having service tag 4, is currently in service.

Figure 9B:
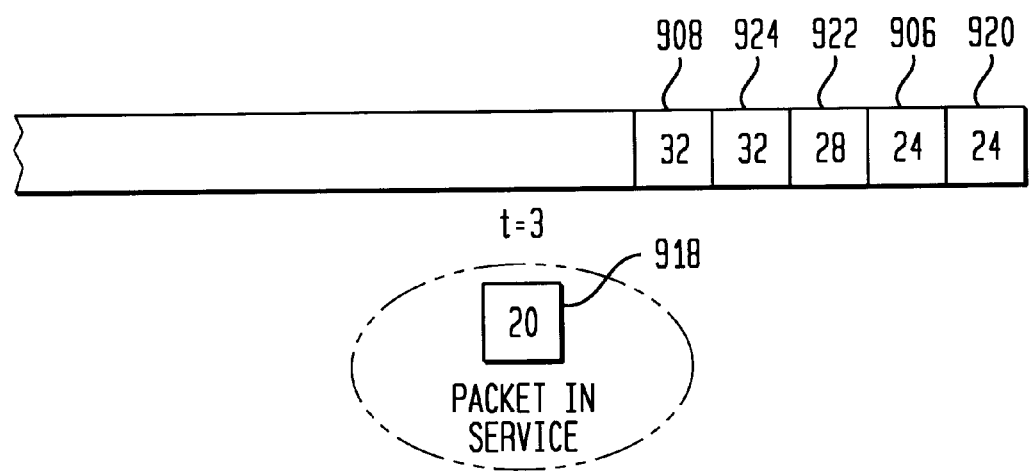
FIG. 9B depicts a time line showing the tags of packets at time t=3 just before the packets from session 3 arrive in the example of FIG. 9A.
Figure 9C:
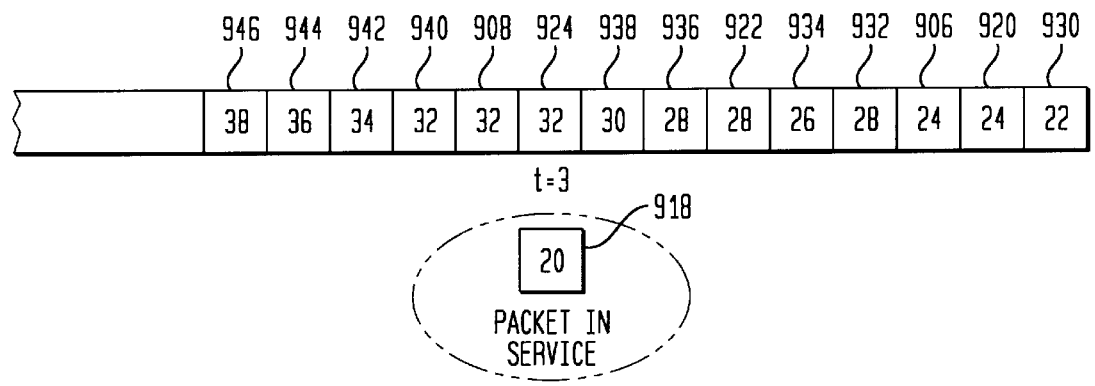
FIG. 9C depicts a time line showing the tags of packets at time t=3 just after the nine packets from session 3 arrive in the example of FIG. 9A.

FIG. 9B shows the service tags of the remaining queued packets at time t=3, just before the packets from session 3 arrive. Packet 918 from session 2, having service tag 20, is currently in service. FIG. 9C shows the service tags of the packets at time t=3, just after the 9 packets 930, 932, 934, 936, 938, 940, 942, 944 and 946 from session 3 arrive. Note that the service tag for the first packet 930 of session 3 starts at 22 because, when the packets arrive, the service tag of the packet currently being served was 20. Thus, for a service tag increment of 2, the first packet 930 from session 3 will receive service tag 22. Subsequent packets from session 3 then have service tags of 24, 26, 28, etc.

Figure 9D:
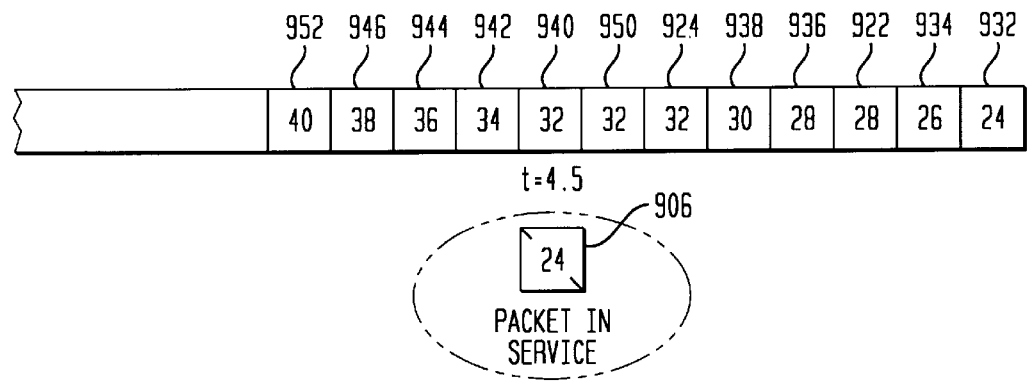
FIG. 9D depicts a time line showing the tags of packets at time t=4.5 in the example of FIG. 9A.

FIG. 9D shows the service tags of the remaining queued packets at time t=4.5. The transmission of the packet 906 with service tag 24 from session 1 has errors. The access point therefore recomputes a new service tag of 32 for this packet 950, which needs to be retransmitted. The access point also recomputes the service tags of the remaining packets from session 1, which in this case only affects one other packet 952 (908 in FIG. 9C), which receives a new service tag of 40. In this way, the retransmission of a packet from a particular session does not affect the Quality of Service of other sessions.

When the remote host PC wants data services, it sends a connect message to the wireless modem. Upon receiving this message, the wireless modem monitors the broadcast frame that is being continuously sent by the AP. The beacon message is part of this broadcast frame and provides timing information, the ESS-ID of the Network, the BSS-ID of the AP, information about the contention slots, the load metric of the AP, etc. The wireless modem then chooses the AP with which it wants to associate and sends a MAC layer associate request frame. Since association request frames are sent in contention mode, collisions may occur. A wireless modem needs to retransmit the association request frame if it does not receive an association response frame from the AP. After a maximum number of retries, the wireless modem will send a connect fail message to the remote host PC, indicating that the wireless modem cannot associate with an AP at this time.

Upon receiving an associate request frame from a wireless modem, after the AP has successfully authenticated the wireless modem, it sends an association response frame with a status code "successful" to the modem. Authentication is performed at the network layer. When a user requests a connection via the wireless modem, the connection request is forwarded by the access point to the wireless hub. The wireless hub then authenticates the user. If the user is successfully authenticated, a unique connection cookie is provided by the wireless hub to the access point. If it is desirable to provide different QoSs to different connections from the same user, then different connection cookies are assigned to the same user; similarly, if it is desirable to provide different QoSs to different users (albeit potentially from the same wireless modem), then each user is given a different connection identity.

If the wireless modem cannot be successfully authenticated, then an association response frame with an appropriate reason code will be sent. Different reason codes can be defined to cover each of the possible different reasons for the failure to associate. If it is desired to combine the MAC layer registration with the network layer registration, the association request frame should contain sufficient login information to enable the AP to send a network layer registration packet to the requesting wireless hub. In this case, the AP will not send the association response frame until it receives a further response from the wireless hub.

If the MAC layer registration is not combined with the network layer registration, then the AP can relay the MAC layer registration to the wireless hub before sending the association response frame. The separation of MAC layer registration and network layer registration is useful if it is desired that the network software be reusable for other physical implementations. Also, if different users are using the same wireless modem to make different connection requests, then the wireless modem may need to make only one MAC layer registration, but may still need to make multiple network layer registrations. If there is only one user for each wireless modem, then combination of MAC layer with network layer registration helps to reduce the number of airlink frames during the registration process.

Upon receipt of a reconnect message from the remote host PC, a wireless modem reassociates with an access point via the following procedure:

1. The wireless modem transmits a reassociation request frame to the access point;
2. If the reassociation response frame is received with a status code of "successful", the wireless modem transmits a reconnect success message to the PC;
3. If the reassociation response frame is received with a status code other than "successful", the wireless modem transmits a reconnect fail message to the PC.

The access point operates as follows in order to support the reassociation of stations:

1. Whenever a reassociate request frame is received from a station and the station is authenticated, the access point transmits a reassociation response with a status value indicating "successful";
2. If the status value is "successful", the connection cookie assigned to the station is included in the response;
3. When the reassociation is successful, the access point updates its MAC filter table appropriately. The access point also informs the wireless hub of this reassociation;
4. If the reassociation request is not successful, the access point transmits a reassociation response with an appropriate reason code to the wireless modem.

It for some reason, either the PC or the access point wants to disassociate with the other, a disconnect request frame is sent. The PC sends a disconnect message to the wireless modem, triggering the wireless modem to send a disconnect request frame to the access point. The access point responds with a disconnect response frame that indicates the success or failure of the disconnect effort initiated by the PC. The wireless modem relays this response back to the PC via a disconnect response message.

In some circumstances, such as overloading or when higher priority is given to other users, an access point may need to disassociate a particular wireless modem that had previously been associated with that access point. In that case, the access point sends a disassociate request message to the wireless modem. The wireless modem responds to the access point with a disassociation response frame and then relays the disassociation message to all PCs attached to the wireless modem. An access point can also disconnect a particular connection using via a disconnect request message which is relayed to the PC via the wireless modem. For wireless modems that support more than one PC, a disassociation request message is not used unless it is desired to disable the whole wireless modem.

Based on a list of access points with which the wireless modem can communicate, the modem decides which AP to associate with by choosing the AP that best meets the following criteria (in decreasing priority order):

1. best signal to interference ratio, RSSI and SNR.
2. least loaded (i.e. having the smallest number of equivalent associated users).
3. requires the least power to communicate with.

The uplink/downlink transmission time ratio can be dynamically adjustable. A way to implement this utilizes a "more" bit or uplink queue size information that is piggy-backed on the uplink data transmission. The access point, upon receiving this information from all remote nodes currently active within the cell/sector, will then have complete information on the total uplink/downlink queue size and can use this information to dynamically adjust the uplink/downlink ratio based on the total uplink/downlink queue size information. One simple way to do this is to use a threshold-based technique: when the total uplink/downlink queue size ratio drops below k1, the Access Point sets the uplink/downlink ratio to s1; when the total uplink/downlink queue size ratio increases beyond k2 (k2>k1), the Access Point sets the uplink/downlink ratio to s2 (s2>s1). At the present time, traffic characterization seems to suggest that a ratio of 4:1 is appropriate.

Figure 10:
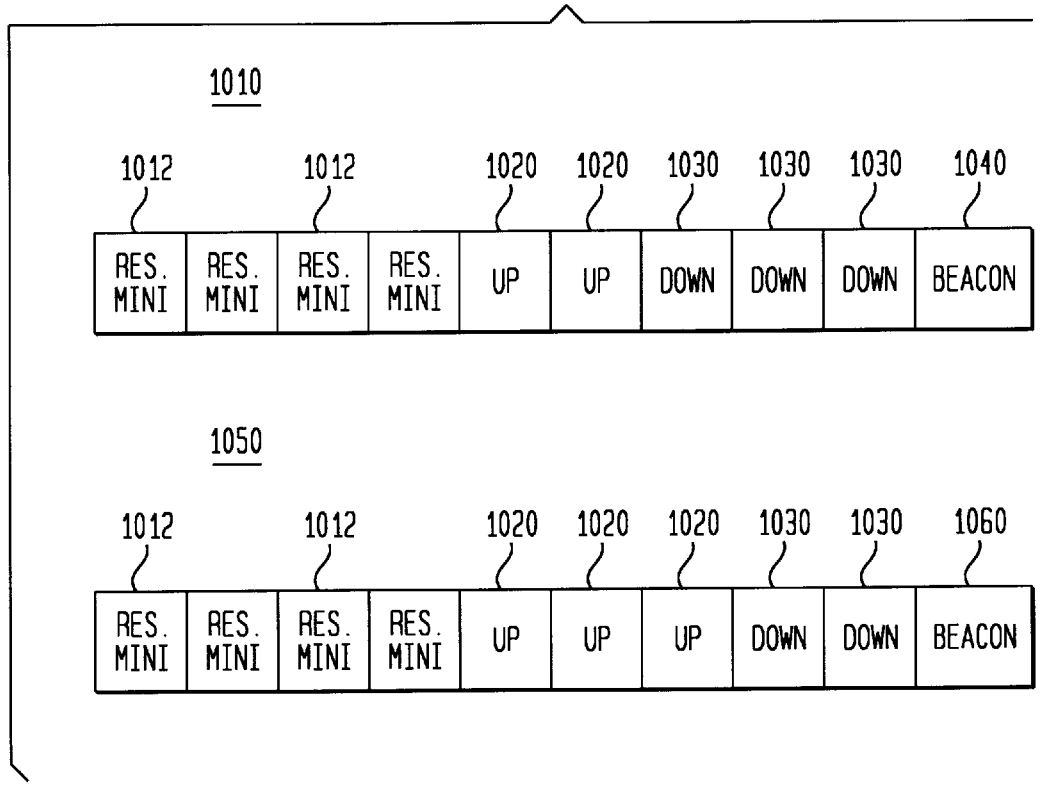
FIG. 10 is an illustration of dynamic adjustment of the uplink/downlink ratio, according to one embodiment of the present invention.

As seen in FIG. 10, frame 1010 has four reservation minislots 1012, two uplink slots 1020, 3 downlink slots 1030, and beacon message 1040. Beacon message 1040 contains information specifying the total number of slots and the number of downlink slots that will be present in the next frame 1050. Frame 1050 reflects this information, having the same number of reservation minislots 1012 (4), but 3 uplink slots 1020, and 2 downlink slots 1030, plus a new beacon message 1060 which specifies the uplink/downlink transmission time ratio for the next frame, etc.

For the PCs flow control, the wireless modem sets high and low buffer occupancy thresholds for each direction (uplink/downlink) and monitors the buffer occupancy. When the buffer occupancy for the uplink traffic hits the high threshold, a flow control signal (Xoff) is sent to the PC from the wireless modem. When the buffer occupancy for the uplink traffic drops below the low threshold (after previously exceeding the high threshold), the wireless modem will send an 'Xon' signal to the PC. When the buffer occupancy for the downlink traffic hits the high threshold, the wireless modem sets the Xon/Xoff bit in the frame control field to "on" at the time it sends a message to the access point. A zero-length message will be sent if there is no uplink frame to be sent. Such a frame will be considered a high priority control frame.

For the Frequency Division Half-Duplex version, both the wireless modem and the access point maintain a memory for buffering both uplink and downlink messages. For the Frequency Division Full-Duplex version, the AP maintains a buffer for both uplink and downlink messages. Typical buffer sizes would be 100 Kbytes at both the modem and the AP for FDHD and 200 Kbytes at the AP for FDFD. The buffers of the wireless modem are typically partitioned into a ratio of $k_1$:1 between the downlink and uplink traffic.

The access point buffers are also partitioned into a $k_2$:1 ratio of downlink to uplink traffic. Again, traffic characterization seems to suggest that a ratio of 4:1 (downlink capacity being 4 times greater than uplink capacity) is appropriate. When the downlink buffer occupancy hits the high threshold, the access point sends an 'Xoff' message to the wireless hub. When the downlink buffer occupancy hits the low threshold (after previously exceeding the high threshold), it sends an 'Xon' message to the wireless hub. When the uplink buffer occupancy hits the high threshold, the access point sets the 'Xon' bit in the frame control field at the time it sends the next broadcast frame to all associated wireless modems. When the uplink buffer occupancy hits the low threshold (after previously exceeding the high threshold), the access point will clear the 'Xoff' bit in the frame control field at the time it sends the next broadcast frame. In addition, a more sophisticated flow control scheme is used by the access point to keep track of the buffer occupancy of each wireless modem (in either direction) and to send an Xon/Xoff MAC frame to a specific wireless modem for a high uplink buffer threshold violation or inform the wireless hub of the appropriate connection ID for a high downlink buffer threshold violation.

An aspect of the invention is capable of supporting admission control. When a PC user submits a connection request via the wireless modem, the connection request is converted into a network layer registration message that is transmitted across the airlink to the AP. The AP needs to make a decision as to whether to admit this new connection request. The admission control technique can be simple, such as admitting any new connection request if the total number of connections admitted is less than a maximum number. A simple admission control technique cannot guarantee quality of service to all admitted users, however, and may not result in high bandwidth utilization.

Other admission control techniques may therefore be better than the simple scheme. A specific admission control program may even utilize a combination of several techniques. For example, where each connection request specifies a delay requirement, a bandwidth requirement, and a traffic descriptor, the AP may first compute various performance metrics (e.g. total bandwidth consumed, average delay) in order to determine whether admission of the new connection could cause a failure to meet the Quality of Service of those admitted connections. If the Quality of Service of all admitted connections can be maintained with the admission of the new connection, the new connection will be admitted. Otherwise, the new connection request will be denied. The equivalent bandwidth-based admission technique described by K. M. Rege in "Equivalent Bandwidth and Related Admission Criteria for ATM Systems—A Performance Study," International Journal of Communication Systems, Vol. 2, pp. 181–197 (1994) may be used with minor modifications for handling this problem in a wireless environment. For example, Rege assumes there is only one bandwidth requirement and set of QoS requirements. Here, the method of Rege is extended to support multiple bandwidth requirements and different QoS requirements for uplink/downlink. Adjustment to the bandwidth requirement based on the radio distance (and hence the potential FER that may be experienced) between the wireless modem and the AP is also supported.

In another example, each connection request specifies the average bit rate required and a traffic burstiness factor. The AP collects information about the number of bytes sent by each connection in either direction for a certain period of time. The AP also measures a burstiness factor for the connection traffic in either direction. Based on this measured information, the AP is able to determine the potential average connection bit rate in either direction (uplink/downlink) and the burstiness factor of each connection. The AP then computes an equivalent number of admitted connections. When a new connection request arrives, the AP calculates whether the new equivalent number of admitted connections exceeds a specified threshold. If the threshold is exceeded, the connection request is denied. Otherwise, it is accepted.

Figure 20:
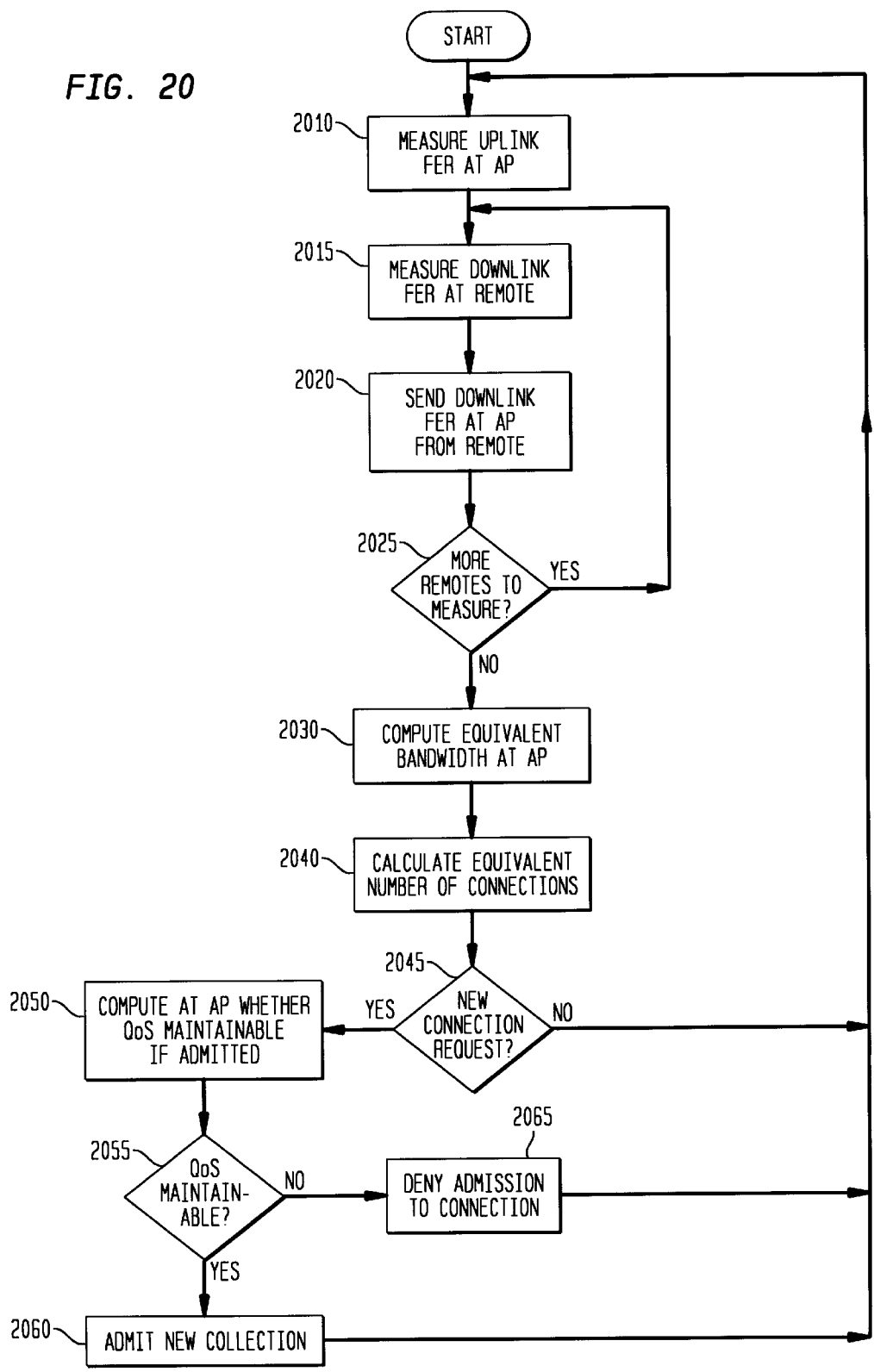
FIG. 20 is a flowchart illustrating an embodiment of a method for admission of new connections based on measured quantities according to an aspect of the present invention.

The measured quantities can be various metrics related to interference. If this is an interference limited system rather than a bandwidth limited system, then, in order to see if the new connection should be admitted, the AP continuously measures a Frame Error Rate (FER) metric for each remote host based on the interference measured. An implementation of this method for admitting new connections based measured quantities in a wireless network is illustrated in FIG. 20. An uplink Frame Error Rate, an average uplink bit rate, a burstiness factor of the uplink traffic, and a packet loss rate are measured 2010 at the base station for each remote host. A downlink Frame Error Rate, an average downlink bit rate, a burstiness factor of the downlink traffic, and a packet loss rate are measured at each admitted remote host 2015, and then the downlink FER is sent 2020 to the base station. This procedure is continuous 2025, allowing all remote hosts currently admitted to send their measured FER to the base station. The reporting process may be either periodic or triggered. In an alternate embodiment, each remote also sends the measured average downlink bit rate, traffic burstiness factor, and packet loss rate to the base station.

An equivalent bandwidth based on average and peak bit rates of the connection, the burstiness factor of the traffic, and the packet loss rate of each connection is computed 2030 at the base station for each remote host. These computations are continuously updated from new information received from the remote hosts and are used by the base station to compute an equivalent number of connections 2040 already admitted. If a new connection is requested 2045, the base station considers the effect of the average rate and packet loss rate requested by the requested connection and, based on the equivalent bandwidth, computes 2050 whether Quality of Service of all admitted connections can be maintained even if the new connection is admitted. If QoS is maintainable 2055, the new connection will be admitted 2060; if not, the new connection will be denied admission 2065.

A strict usage priority admission criterion can also be implemented. For example, if there are two user priority classes, class 1 and class 2, the system might admit at most $K_1$ users of lower priority class 2 and a total number of users $M (M \geq K_1)$. When an AP receives a connection request from a new user of class 1, it makes a decision based on the current total number of associated users, $k_m$. If $k_m \leq M$, it admits the new user of class 1. Otherwise, it checks to see if it can disconnect any class 2 users. If it can, then it disconnect a class 2 user and admits the new class 1 user.

In this usage priority admission scheme, there are two ways of admitting lower priority users. If the system performance requirement is such that it is appropriate to disconnect lower priority users after they are admitted, then lower priority users are admitted as long as the total number of associated users is less than M. However, if a new class 1 user appears, the AP will send a disconnect message to one of the admitted class 2 users in order to admit the new class 1 user. In one embodiment, a "least recently used" technique is used to identify the admitted class 2 user that the AP will disconnect.

If the system performance requirement is such that it is inappropriate to disconnect lower priority users after they are admitted, then the AP admits class 2 users in the following manner: If $k_m < M$ and the new user is of class 2, then the AP determines if the number of associated users of class 2, $I_m$, is such that $I_m < K_2$. If $I_m < K_2$, then the new user of class 2 will be admitted. Otherwise, the new user of class 2 will not be admitted. This approach can be extended to multiple priority classes.

Figure 19:
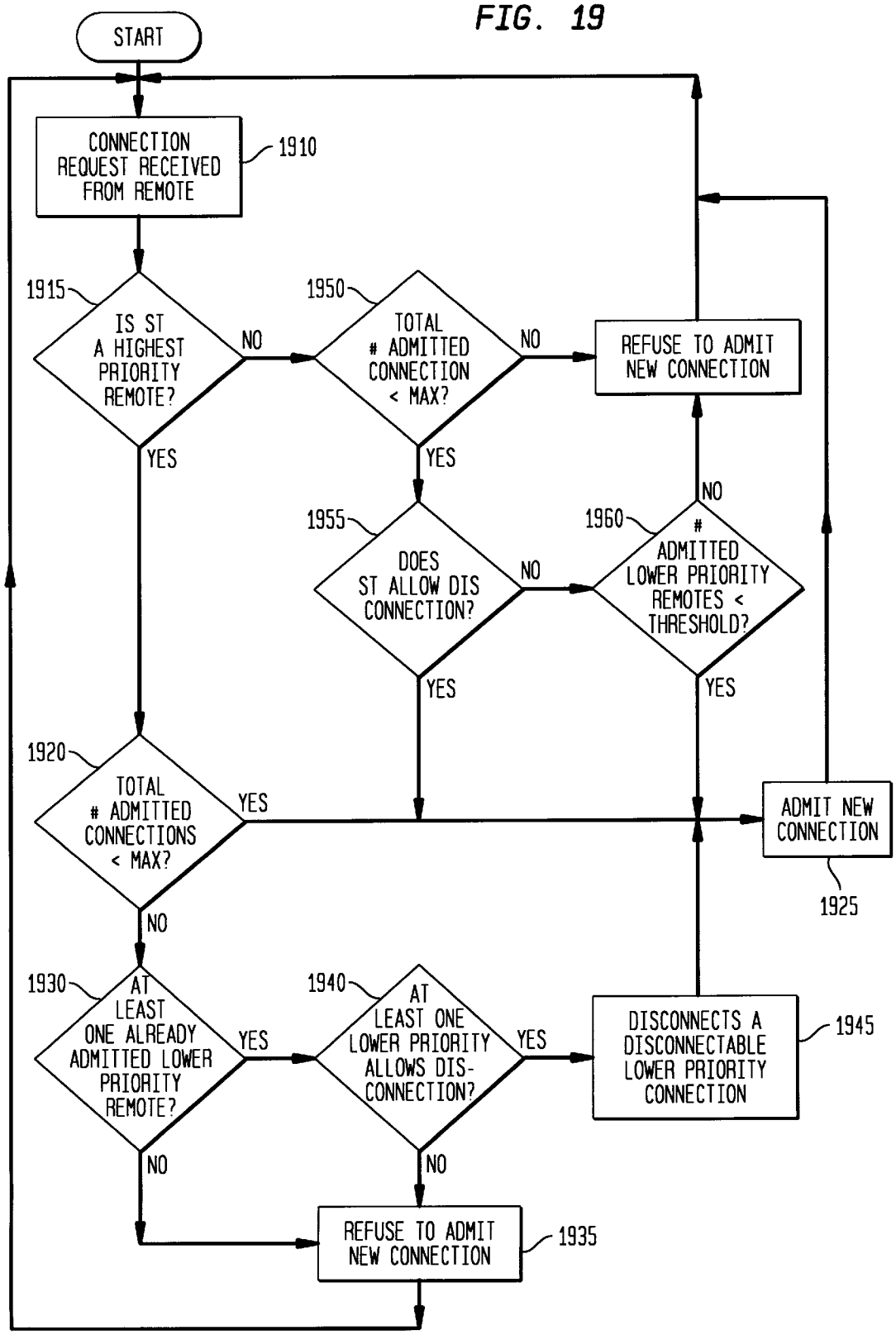
FIG. 19 is a flowchart illustrating an embodiment of a method for control of admission of remote hosts according to the present invention.

FIG. 19 is a flowchart illustrating this embodiment of a method for control of admission of remote hosts according to an aspect of the present invention. The network of the embodiment of FIG. 19 supports at least two priority classes of remote hosts, and has both a maximum total number of admitted remote hosts, and a maximum number of admitted lower priority remotes. When the base station receives 1910 a connection request from an unadmitted remote host, it determines 1915 whether the host belongs to the higher priority class. If so, then if the total number of admitted remote hosts is less than the maximum total number of remote hosts 1920, the unadmitted higher priority host will be admitted 1925. If the total number of admitted remote hosts is not less than the maximum total number of remote hosts 1920, then if none of the already admitted remote hosts is of the lower priority class 1930, the requesting host will be refused admission 1935. If one of the already admitted hosts is of the lower priority class 1930, and it has indicated at the time it was admitted that it may be disconnected 1940, the lower priority class remote host will be disconnected 1945 so that the requesting remote host from the higher priority class may be admitted 1925. In one embodiment, the least recently used remote host of the lower priority class, will be the one preferentially disconnected. If the connection request received at the base station 1910 is from an unadmitted remote host belonging to a lower priority class 1915, then if the total number of admitted remote hosts is less than the maximum allowable 1950, and the requesting lower priority remote host indicates that it can be disconnected prematurely 1955, the lower priority host will be admitted 1925. If the total number of admitted remote hosts is less than the maximum 1950, and the unadmitted lower priority remote host indicates that premature disconnection is inappropriate 1955, then the lower priority remote host will only be admitted 1925 if the number of already admitted lower priority hosts is less than some threshold 1960, otherwise the requesting lower priority host will be refused admission 1935, just as if the total number of admitted users was not less than the maximum allowable 1950.

In an alternate embodiment of this admission control technique, lower priority class users (e.g. class 2 users) are admitted if the total number of currently associated users of all classes is less than a second threshold, normally lower than the threshold for higher priority users, rather than being based partially (as a second threshold) on the number of currently associated users of that lower priority class. In this embodiment, if the total number of currently associated users is less than $Q_p$ (with $Q_{i+1} < Q_i$ and $Q_i = M$), then the new user from priority class i will be admitted.

In one embodiment, the AP collects the following information for each connection: (i) the average rate used, (ii) the last time the connection used the network, (iii) frame error rate, and (iv) packet loss rate. Overload control methods then allow this AP to disconnect users of a lower priority during congestion. Alternatively, instead of disconnecting users of a lower priority, they may be redirected to other nearby APs that have a lower load.

If the downlink/uplink buffer occupancy has exceeded the high threshold, the access point will, in a preferred embodiment, determine if this is caused by a specific connection or a group of connections. If it is caused by a specific connection, the access point will send a flow control signal to the connection to prevent it from sending more data. In addition, the access point may reduce the bandwidth shares allocated to any users who have indicated during the connection set-up that they can tolerate a variable allocated bandwidth.

If the measured downlink frame error rates for many connections are seen to be increasing, then the AP may be experiencing an increased interference level from other access points. All admitted users may generally be classified into two categories: those which allow service interruptions and those which do not. When there is congestion due to an increased interference level, the access point may elect to disconnect the class of admitted users that permit service interruption in order that more bandwidth may be allocated to the remaining users (more bandwidth being available providing a consequently greater number of opportunities for retransmission).

If only a specific connection is experiencing a high downlink frame error rate, then the access point may elect to disconnect other connections if the connection experiencing bad performance is of a higher priority. For example, when a specific high priority connection is experiencing a high uplink frame error rate, the access point may disconnect other users in order to give more bandwidth to the higher priority connection. If a majority of all associated connections experience high uplink frame error rates, the AP may instead send a congested signal to a wireless hub which can coordinate the actions of other access points, such as by sending signals to these access points to inhibit them from admitting new users and dropping lower priority users.

There may also be occasions when there is a sudden increase in short bursty messages. Short packets queued up for so long, in either the uplink or downlink queue at the access point, that they exceed the time-to-live value allocated for them will be thrown away, resulting in an increase in packet loss rate due to the processing bottleneck at the access point. Under such an overload situation, the access point may elect to temporarily disconnect some users of a lower priority. Other combinations of the possible actions discussed would also be suitable, the exact combination being decided by the base station depending on the particular congestion conditions observed in the network.

Figure 21:
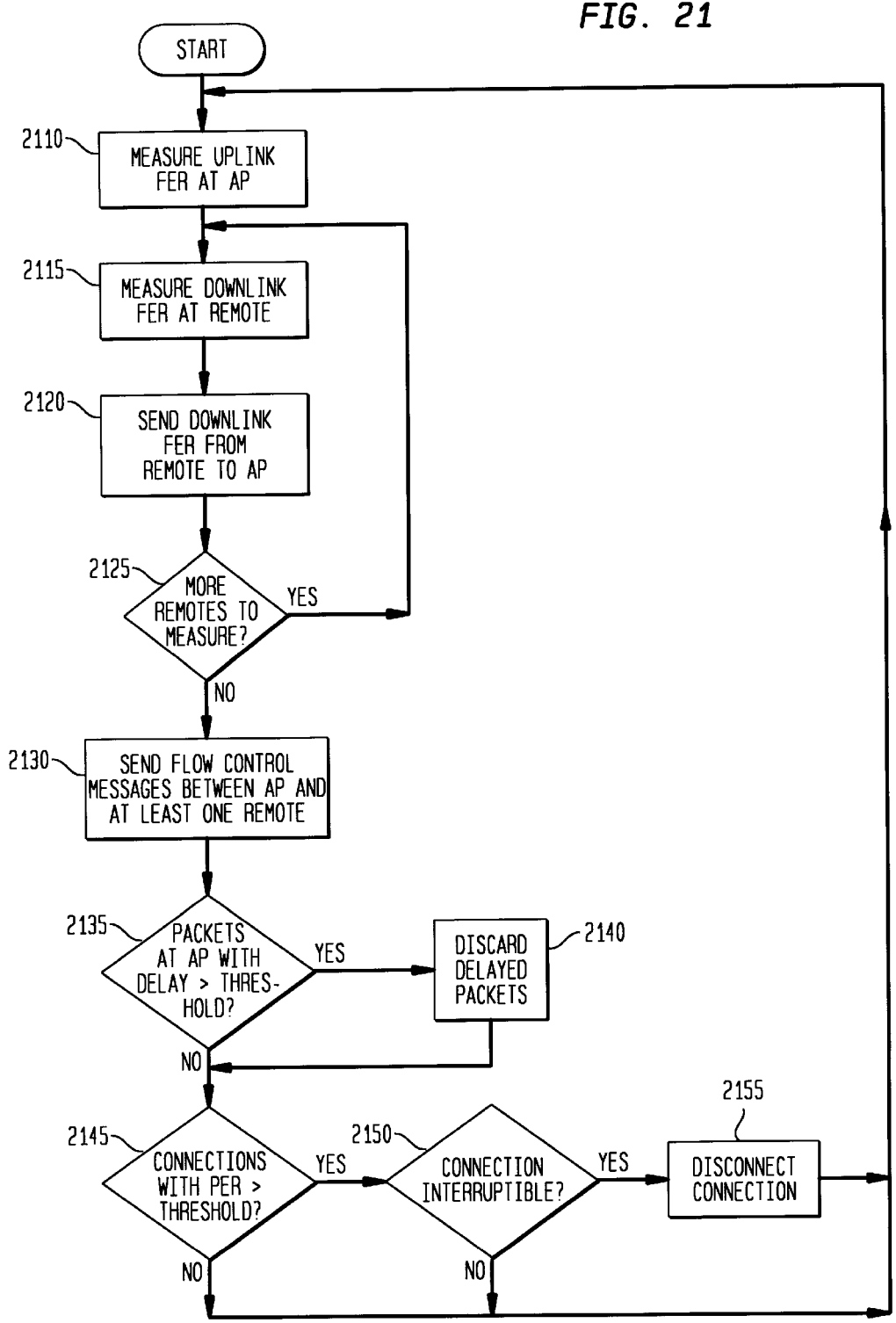
FIG. 21 is a flowchart illustrating an embodiment of a method for overload control in a network according to an aspect of the present invention.

A particular embodiment of a method for overload control is illustrated in the flowchart of FIG. 21. As seen in FIG. 21, an uplink Frame Error Rate is continuously measured 2110 at the base station for each remote host based on an average uplink bit rate, a burstiness factor of uplink traffic, and a packet loss rate. Similarly, a downlink Frame Error Rate is measured at each remote host 2115 based on the average downlink bit rate, the burstiness factor of the downlink traffic, and the packet loss rate and then each FER is sent 2120 to the base station. This procedure is continuous 2125, allowing all remote hosts currently admitted to send their FER to the base station. If an overload condition exits, flow-control messages are sent between at least one of the remote hosts and the base station in order to control data flow 2130. Packets at the base station having a delay exceeding a time-to-live threshold 2135 are then discarded 2140, and connections with a Frame Error Rates that has exceeded a frame error rate threshold for a specified time 2145 and that have indicated that their connections can be interrupted 2150 are disconnected 2155.

To obtain a particular quality of service, each connection request contains the following information: bandwidth requirement, delay requirement, a "loss tolerable/nontolerable" flag, a "service interruption allowed" flag, acceptable packet loss rate, and a traffic descriptor which consists of peak data rate, average data rate, and a potential burstiness factor for each direction, uplink and downlink. For example, a connection that specifies a delay requirement of 20 ms and "loss tolerant" will have its packet thrown away if the message it sends or is supposed to receive sits in the queue at the wireless modem or the access point for more than 20 ms. If the user specifies a delay requirement but classifies itself as "loss non-tolerant", then packets intended for that user will not be thrown away until there is a buffer overflow. The bandwidth requirement, delay requirement, packet loss rate, and the traffic descriptor are all used in the admission control technique.

A data security feature can be implemented using any of the methods known in the art. One example would be to adapt the Institute of Electrical and Electronics Engineers (IEEE) standard 802.11 wired Local Area Network (LAN) equivalent approach. The wired equivalent privacy (WEP) feature is defined in the 802.11 standard to protect authorized users of a wireless LAN casual eavesdropping. Payload encryption is not be turned on unless the WEP option is turned on. Each service provider assigns a shared key to all users, in addition to a user-unique key. The keys are periodically modified, with the effectiveness of the security feature depending on the length of the key chosen and the frequency with which the key is changed.

Although preferred embodiments of novel access control, admission control and conflict resolution schemes are described above, these embodiments are intended to be illustrative only and therefore not limiting. Modifications and variations may be made by persons skilled in the art in light of the above teachings and it is therefore to be understood that such changes made in the particular embodiments of the invention disclosed are within the scope and spirit of the invention as defined by the appended claims. Having thus described the invention with the details and particularity required by the patent laws, what is claimed and desired to be protected by Letters Patent is set forth in the appended claims.

What is claimed is:

1. A method for conflict resolution among remote hosts in a wireless communications network, said network having a base station and a plurality of remote hosts, said base station and said remote hosts exchanging data via downlink and uplink frames respectively, each of said remote hosts having a respective uplink queue and being characterized by a stack level value indicative of whether or not said remote host has data in said queue for transmission to said base station, the method comprising the steps, in combination, of:

configuring at least one of said uplink frames to include at least one reservation minislot for sending an access request for permission for uplink data transmission from a requesting one of said remote hosts to said base station;

assigning a stack level of "0" to each of said remote hosts that has received data for transmission to said base station at said respective uplink queue if said uplink queue was empty at the last time of uplink access request transmission and putting said remote host into a request state;

at any of said remote hosts that are in a request state, have a respective stack level value equal to "0", and did not transmit data during the last uplink data transmission, randomly picking a respective one of said reservation minislots;

transmitting an access request to said base station in said respective picked one of said reservation minislots from each respective one of said remote hosts;

determining at said base station a transmit status for each of said reservation minislots, said transmit status for a particular one of said reservation minislots being SUCCESS, IDLE, or COLLIDED depending respectively on whether said particular reservation minislot contained a successful access request, no access request, or an access request that was corrupted or in error;

transmitting from said base station a downlink acknowledgment message indicating the transmit status of each of said reservation minislots;

receiving at said plurality of remote hosts said acknowledgment message;

for each of said remote hosts that transmitted one of said access requests, randomly setting said respective stack level value of said remote host to one of "1" or "0" when said transmit status for said respective picked one of said reservation minislots received in said acknowledgment message indicates COLLIDED; and for each of said remote hosts that transmitted one of said access requests, removing said remote host from said request state if said transmit status for said respective picked one of said reservation minislots received in said acknowledgment message indicates SUCCESS and said uplink queue at said remote host will be empty after the next uplink data transmission;

at each of said remote hosts having a respective stack level value greater than "0", inspecting said received acknowledgment message and counting the total number of said reservation minislot transmit statuses that indicate SUCCESS;

at each of said remote hosts having a respective stack level value greater than "0", decrementing said respective stack level value if said total number of reservation minislot transmit statuses equaling SUCCESS or IDLE is greater than or equal to a threshold value; and at each of said remote hosts having a respective stack level greater than "0", incrementing said respective stack level value if said total number of reservation minislot transmit statuses equaling SUCCESS or IDLE is less than a threshold value.

2. The method of claim 1, wherein the total number of said reservation minislots in any of said uplink frames is dynamically adjustable based on the percentage of IDLE ones of said reservation minislots and the total of said uplink queue lengths at all of said remote hosts.

3. The method of claim 1, further including the steps of:

piggybacking a reservation request on the next uplink data transmission from each of said remote hosts that transmitted one of said access requests, if said transmit status of said respective picked one of said reservation minislots received in said acknowledgment message indicates SUCCESS and said uplink queue at said remote host will not be empty after the next uplink data transmission from said remote host; and continuing to piggyback a reservation request on all subsequent uplink data transmissions from any of said remote hosts that previously piggybacked a reservation request until said uplink queue at said remote host will be empty after the next uplink data transmission from said remote host.

4. A method for conflict resolution among remote hosts in a wireless communications network, said network having a base station and a plurality of remote hosts, said base station and said remote hosts exchanging data via downlink and uplink frames respectively, each of said remote hosts having a respective uplink queue and being characterized by a stack level value indicative of whether or not said remote host has data in said queue for transmission to said base station, the method comprising the steps, in combination, of configuring at least one of said uplink frames to include at least one reservation minislot for sending an access request for permission for uplink data transmission from a requesting one of said remote hosts to said base station;

assigning a stack level of "0" to each of said remote hosts that has received data for transmission to said base station at said respective uplink queue if said uplink queue was empty at the last time of uplink access request transmission and putting said remote host into a request state;

at any of said remote hosts that are in a request state, have a respective stack level value equal to "0", and did not transmit data during the last uplink data transmission, randomly picking a respective one of said reservation minislots;

transmitting an access request to said base station in said respective picked one of said reservation minislots from each respective one of said remote hosts;

determining at said base station a transmit status for each of said reservation minislots, said transmit status for a particular one of said reservation minislots being SUCCESS, IDLE, or COLLIDED depending respectively on whether said particular reservation minislot contained a successful access request, no access request, or an access request that was corrupted or in error;

transmitting from said base station a downlink acknowledgment message indicating the transmit status of each of said reservation minislots;

receiving at said plurality of remote hosts said acknowledgment message;

for each of said remote hosts that transmitted one of said access requests, randomly setting said respective stack level value of said remote host to one of "1" or "0" when said transmit status for said respective picked one of said reservation minislots received in said acknowledgment message indicates COLLIDED;

for each of said remote hosts that transmitted one of said access requests, removing said remote host from said request state if said transmit status for said respective picked one of said reservation minislots received in said acknowledgment message indicates SUCCESS and said uplink queue at said remote host will be empty after the next uplink data transmission;

at each of said remote hosts having a respective stack level value greater than "0", inspecting said received acknowledgment message for the one of said transmit statuses corresponding to the one of said reservation minislots which said remote host most recently picked and used to make an access request;

at each of said remote hosts having a respective stack level value greater than "0", decrementing said respective stack level value when said most recently picked reservation minislot transmit status indicates SUCCESS or IDLE; and at each of said remote hosts having a respective stack level greater than "0", incrementing said respective stack level if said reservation minislot transmit status indicates COLLIDED.

5. The method of claim 4, wherein the total number of said reservation minislots in any of said uplink frames is dynamically adjustable based on the percentage of IDLE ones of said reservation minislots and the total of said uplink queue lengths at all of said remote hosts.

6. The method of claim 4, further including the steps of:

piggybacking a reservation request on the next uplink data transmission from each of said remote hosts that transmitted one of said access requests, if said transmit status of said respective picked one of said reservation minislots received in said acknowledgment message indicates SUCCESS and said uplink queue at said remote host will not be empty after the next uplink data transmission from said remote host; and continuing to piggyback a reservation request on all subsequent uplink data transmissions from any of said remote hosts that previously piggybacked a reservation request until said uplink queue at said remote host will be empty after the next uplink data transmission from said remote host.

7. A method for conflict resolution among remote hosts in a wireless communications network, said network having a base station and a plurality of remote hosts, said base station and said remote hosts exchanging data via downlink and uplink frames respectively, each of said remote hosts having a respective uplink queue and being characterized by a stack level value indicative of whether or not said remote host has data in said queue for transmission to said base station, the method comprising the steps, in combination, of:

configuring at least one of said uplink frames at at least one of said remote hosts to include at least one reservation minislot for sending an access request for permission for uplink data transmission from said remote host to said base station;

assigning a stack level of "0" at any of said remote hosts that has received data for transmission to said base station at said respective uplink queue if said uplink queue was empty at the last time of uplink access request transmission and putting said remote host into a request state;

at at least one of said remote hosts that is in a request state, has a respective stack level value equal to "0", and did not transmit data during the last uplink data transmission, randomly picking one of said reservation minislots;

transmitting an access request to said base station in said picked one of said reservation minislots from said remote host for determination at said base station of a transmit status for each of said reservation minislots, said transmit status for a particular one of said reservation minislots being SUCCESS, IDLE, or COLLIDED depending respectively on whether said particular reservation minislot contained a successful access request, no access request, or an access request that was corrupted or in error;

receiving at said remote host a downlink acknowledgment message from said base station indicating the transmit status of each of said reservation minislots;

at any of said remote hosts that transmitted one of said access requests, randomly setting said respective stack level value of said remote host at one of "1" or "0" when said transmit status for said picked one of said reservation minislots received in said acknowledgment message indicates COLLIDED;

at any of said remote hosts that transmitted one of said access requests, removing said remote host from said request state if said transmit status for said picked one of said reservation minislots received in said acknowledgment message indicates SUCCESS and said uplink queue at said remote host will be empty after the next uplink data transmission;

at any of said remote hosts having a stack level value greater than "0", decrementing said stack level value if the total number of reservation minislot transmit statuses equaling SUCCESS or IDLE is greater than or equal to a threshold value; and at any of said remote hosts having a stack level value greater than "0", incrementing said stack level value if said total number of reservation minislot transmit statuses equaling SUCCESS or IDLE is less than a threshold value.

8. A method for conflict resolution among remote hosts in a wireless communications network, said network having a base station and a plurality of remote hosts, said base station and said remote hosts exchanging data via downlink and uplink frames respectively, each of said remote hosts having a respective uplink queue and being characterized by a stack level value indicative of whether or not said remote host has data in said queue for transmission to said base station, the method comprising the steps, in combination, of:

receiving an access request for permission for uplink data transmission at said base station from any of said remote hosts that has received data for transission to said base station at said respective uplink queue, has a stack level of "0", is in a request state, and did not transmit data during the last uplink data transmission, said access request being received in a randomly picked one of a plurality of reservation minislots configured in one of said uplink frames;

determining at said base station a transmit status for each of said reservation minislots, said transmit status for a particular one of said reservation minislots being SUCCESS, IDLE, or COLLIDED depending respectively on whether said particular reservation minislot contained a successful access request, no access request, or an access request that was corrupted or in error; and transmitting from said base station a downlink acknowledgment message indicating the transmit status of each of said reservation minislots, said downlink acknowledgment message being received and responded to at said plurality of remote hosts in the following manner;

for any of said remote hosts that transmitted one of said access requests, said stack level value of said remote host is randomly set to one of "1" or "0" when said transmit status for said picked one of said reservation minislots received in said acknowledgment message indicates COLLIDED;

for any of said remote hosts that transmitted one of said access requests, said remote host is removed from said request state if said transmit status for said picked one of said reservation minislots received in said acknowledgment message indicates SUCCESS and said uplink queue at said remote host will be empty after the next uplink data transmission;

for any of said remote hosts having a stack level value greater than "0", said stack level value is decremented if the total number of reservation minislot transmit statuses equaling SUCCESS or IDLE is greater than or equal to a threshold value; and for any of said remote hosts having a stack level value greater than "0", said stack level value is incremented if said total number of reservation minislot transmit statuses equaling SUCCESS or IDLE is less than a threshold value.

9. A method for conflict resolution among remote hosts in a wireless communications network, said network having a base station and a plurality of remote hosts, said base station and said remote hosts exchanging data via downlink and uplink frames respectively, each of said remote hosts having a respective uplink queue and being characterized by a stack level value indicative of whether or not said remote host has data in said queue for transmission to said base station, the method comprising the steps, in combination, of:

configuring at least one of said uplink frames at at least one of said remote hosts to include at least one reservation minislot for sending an access request for permission for uplink data transmission from said remote host to said base station;

assigning a stack level of "0" at any of said remote hosts that has received data for transmission to said base station at said respective uplink queue if said uplink queue was empty at the last time of uplink access request transmission and putting said remote host into a request state;

at at least one of said remote hosts that is in a request state, has a respective stack level value equal to "0", and did not transmit data during the last uplink data transmission, randomly picking one of said reservation minislots;

transmitting an access request to said base station in said picked one of said reservation minislots from said remote host for determination at said base station of a transmit status for each of said reservation minislots, said transmit status for a particular one of said reservation minislots being SUCCESS, IDLE, or COLLIDED depending respectively on whether said particular reservation minislot contained a successful access request, no access request, or an access request that was corrupted or in error;

receiving at said remote host a downlink acknowledgment message from said base station indicating the transmit status of each of said reservation minislots;

at any of said remote hosts that transmitted one of said access requests, randomly setting said stack level value of said remote host at one of "1" or "0" when said transmit status for said picked one of said reservation minislots received in said acknowledgment message indicates COLLIDED;

at any of said remote hosts that transmitted one of said access requests, removing said remote host from said request state if said transmit status for said picked one of said reservation minislots received in said acknowledgment message indicates SUCCESS and said uplink queue at said remote host will be empty after the next uplink data transmission;

at any of said remote hosts having a stack level value greater than "0", inspecting said received acknowledgment message for the one of said transmit statuses corresponding to the one of said reservation minislots which said remote host most recently picked and used to make an access request;

at any of said remote hosts having a stack level value greater than "0", decrementing said stack level value when said most recently picked reservation minislot transmit status indicates SUCCESS or IDLE; and at any of said remote hosts having a stack level value greater than "0", incrementing said stack level value if said reservation minislot transmit status indicates COLLIDED.

10. A method for conflict resolution among remote hosts in a wireless communications network, said network having a base station and a plurality of remote hosts, said base station and said remote hosts exchanging data via downlink and uplink frames respectively, each of said remote hosts having a respective uplink queue and being characterized by a stack level value indicative of whether or not said remote host has data in said queue for transmission to said base station, the method comprising the steps, in combination, of:

receiving an access request for permission for uplink data transmission at said base station from any of said remote hosts that has received data for transmission to said base station at said respective uplink queue, has a stack level of "0", is in a request state, and did not transmit data during the last uplink data transmission, said access request being received in a randomly picked one of a plurality of reservation minislots configured in one of said uplink frames;

determining at said base station a transmit status for each of said reservation minislots, said transmit status for a particular one of said reservation minislots being SUCCESS, IDLE, or COLLIDED depending respectively on whether said particular reservation minislot contained a successful access request, no access request, or an access request that was corrupted or in error; and transmitting from said base station a downlink acknowledgment message indicating the transmit status of each of said reservation minislots, said downlink acknowledgment message being received and responded to at said plurality of remote hosts in the following manner:

for any of said remote hosts that transmitted one of said access requests, said stack level value of said remote host is set at one of "1" or "0" when said transmit status for said respective picked one of said reservation minislots received in said acknowledgment message indicates COLLIDED;

for any of said remote hosts that transmitted one of said access requests, said remote host is removed from said request state if said transmit status for said respective picked one of said reservation minislots received in said acknowledgment message indicates SUCCESS and said uplink queue at said remote host will be empty after the next uplink data transmission;

for any of said remote hosts having a stack level value greater than "0", said received acknowledgment message is inspected for the one of said transmit statuses corresponding to the one of said reservation minislots which said remote host most recently picked and used to make an access request;

for any of said remote hosts having a stack level value greater than "0", said stack level value is decremented when said most recently picked reservation minislot transmit status indicates SUCCESS or IDLE; and for any of said remote hosts having a stack level value greater than "0", said stack level value is incremented if said reservation minislot transmit status indicates COLLIDED.

* * * * *